US012479085B2

(12) United States Patent
Hosek

(10) Patent No.: US 12,479,085 B2
(45) Date of Patent: Nov. 25, 2025

(54) MATERIAL-HANDLING ROBOT WITH MULTIPLE SEMI-INDEPENDENT ARMS

(71) Applicant: Persimmon Technologies Corporation, Wakefield, MA (US)

(72) Inventor: Martin Hosek, Salem, NH (US)

(73) Assignee: Persimmon Technologies Corporation, Wakefield, MA (US)

( * ) Notice: Subject to any disclaimer, the term of this patent is extended or adjusted under 35 U.S.C. 154(b) by 0 days.

(21) Appl. No.: 17/369,245

(22) Filed: Jul. 7, 2021

(65) Prior Publication Data
US 2022/0009083 A1    Jan. 13, 2022

Related U.S. Application Data

(60) Provisional application No. 63/060,815, filed on Aug. 4, 2020, provisional application No. 63/048,822, filed on Jul. 7, 2020.

(51) Int. Cl.
| | |
|---|---|
| *B25J 9/04* | (2006.01) |
| *B25J 9/00* | (2006.01) |
| *B25J 9/12* | (2006.01) |
| *B25J 11/00* | (2006.01) |
| *B25J 18/00* | (2006.01) |

(52) U.S. Cl.
CPC ............ *B25J 9/043* (2013.01); *B25J 9/0009* (2013.01); *B25J 9/126* (2013.01); *B25J 11/0095* (2013.01); *B25J 18/00* (2013.01)

(58) Field of Classification Search
CPC ......... H01L 21/67742; H01L 21/67766; H01L 21/6838; H01L 21/68707; B25J 9/043; B25J 9/042; B25J 9/0009; B25J 11/0095
See application file for complete search history.

(56) References Cited

U.S. PATENT DOCUMENTS

| | | | |
|---|---|---|---|
| 5,765,444 A | 6/1998 | Bacchi et al. | |
| 5,908,281 A * | 6/1999 | Kiley | H01L 21/67781 |
| | | | 414/744.5 |
| 9,149,936 B2 | 10/2015 | Hosek et al. | |
| 10,224,232 B2 | 3/2019 | Hosek | |
| 10,363,665 B2 | 7/2019 | Hosek et al. | |
| 10,424,498 B2 | 9/2019 | Hofmeister et al. | |
| 10,543,596 B2 | 1/2020 | Hosek et al. | |
| 10,569,430 B2 | 2/2020 | Hosek et al. | |
| 10,580,682 B2 | 3/2020 | Hosek et al. | |
| 10,596,710 B2 | 3/2020 | Hosek et al. | |
| 10,742,070 B2 | 8/2020 | Hosek et al. | |
| 2010/0178147 A1* | 7/2010 | Kremerman | B25J 9/042 |
| | | | 414/800 |

(Continued)

FOREIGN PATENT DOCUMENTS

| | | |
|---|---|---|
| JP | 2007210757 A | 8/2007 |
| JP | 2016505219 A | 2/2016 |
| WO | WO-2014113364 A1 | 7/2014 |

*Primary Examiner* — Gerald McClain
(74) *Attorney, Agent, or Firm* — McCarter & English, LLP

(57) ABSTRACT

An apparatus including a drive unit; and an arm assembly connected to the drive unit. The arm assembly includes an upper arm connected to a first drive shaft of the drive unit; a first set of forearms connected to a first end of the upper arm; a second set of forearms connected to a second end of the upper arm, where the second set has a different number of forearms than the first set; and a respective end effector connected to the forearms.

23 Claims, 44 Drawing Sheets

(56) References Cited

U.S. PATENT DOCUMENTS

| | | |
|---|---|---|
| 2016/0027676 A1 | 1/2016 | Blank et al. |
| 2018/0056509 A1* | 3/2018 | Hosek .................. B25J 15/0052 |
| 2018/0233397 A1* | 8/2018 | Hosek ..................... B25J 9/043 |
| 2019/0355603 A1 | 11/2019 | Hudgens et al. |
| 2020/0262660 A1 | 8/2020 | Hosek et al. |
| 2022/0005726 A1* | 1/2022 | Hudgens ........... H01L 21/67754 |

* cited by examiner

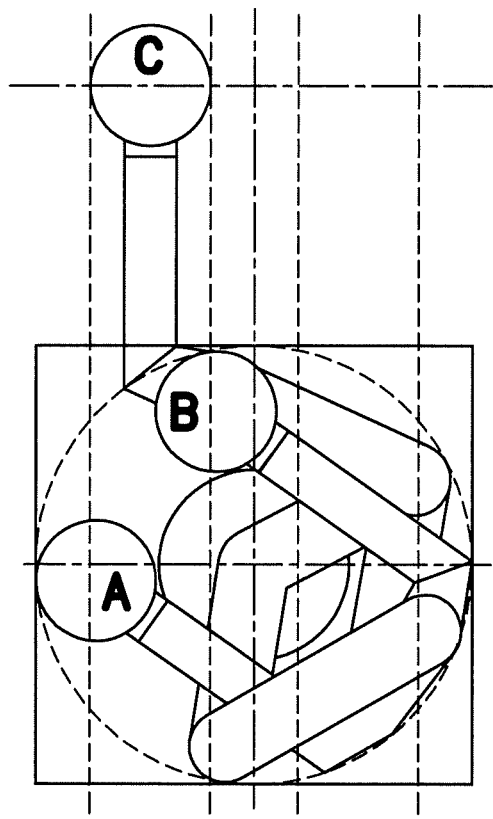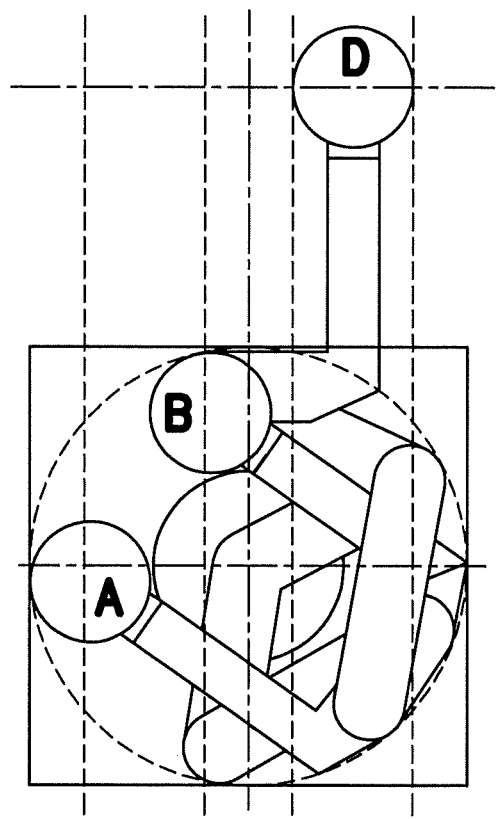
FIG.6C-4          FIG.6C-5

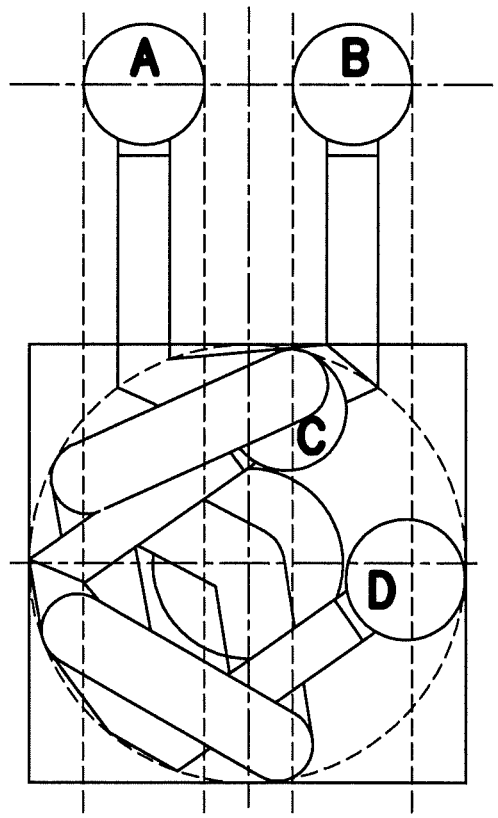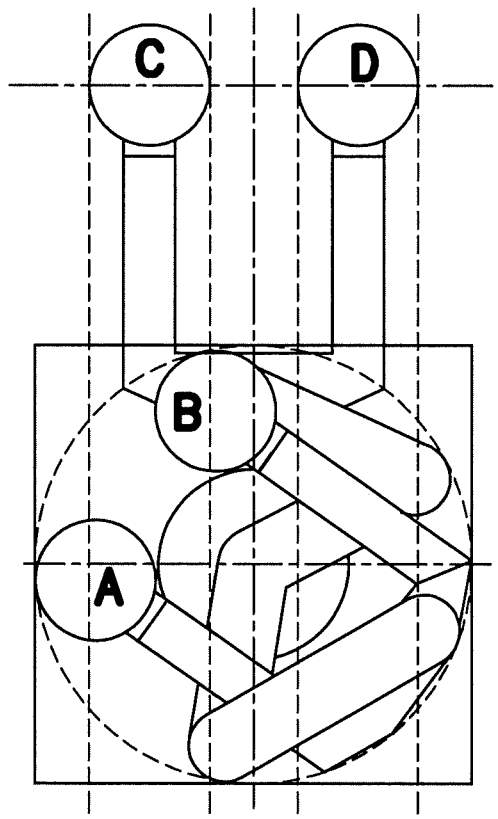
FIG.6C-6  FIG.6C-7

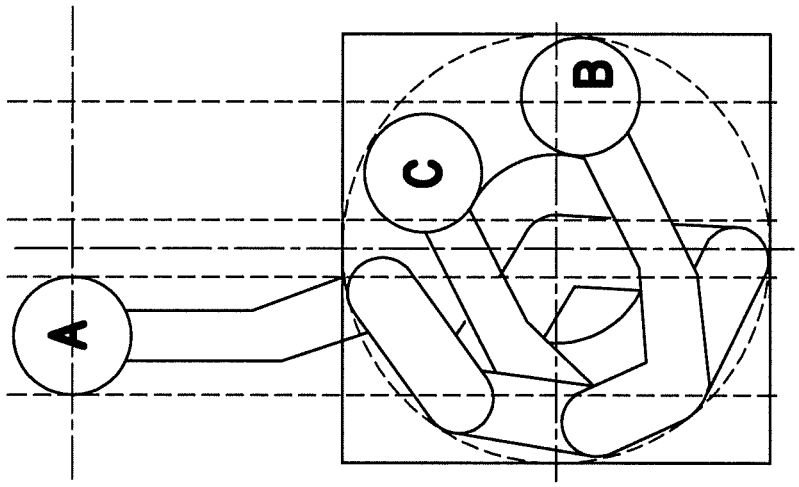
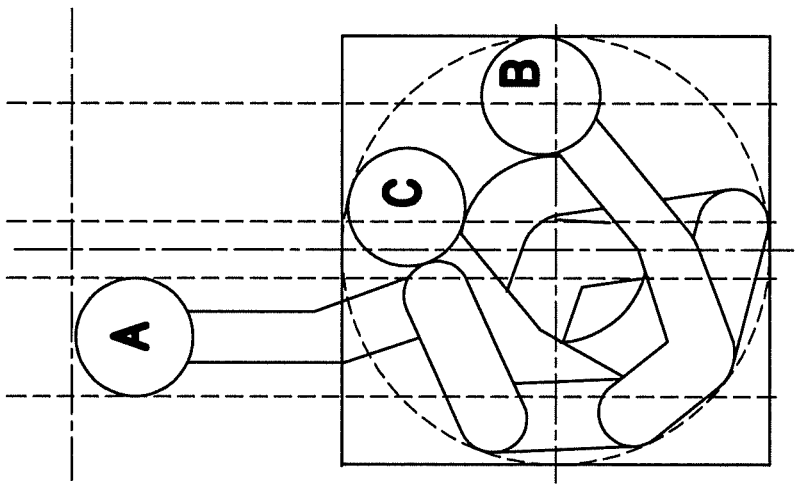
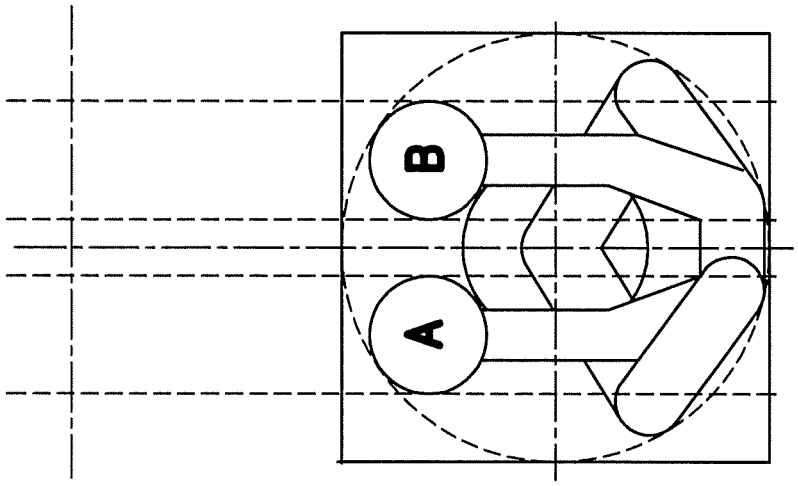

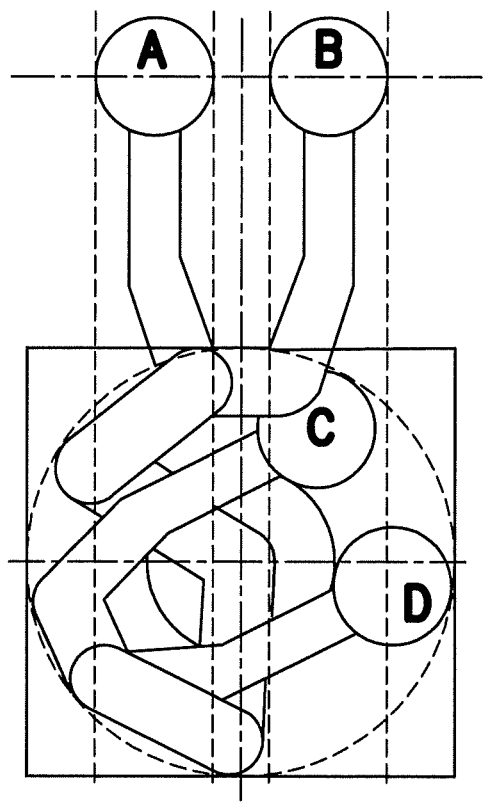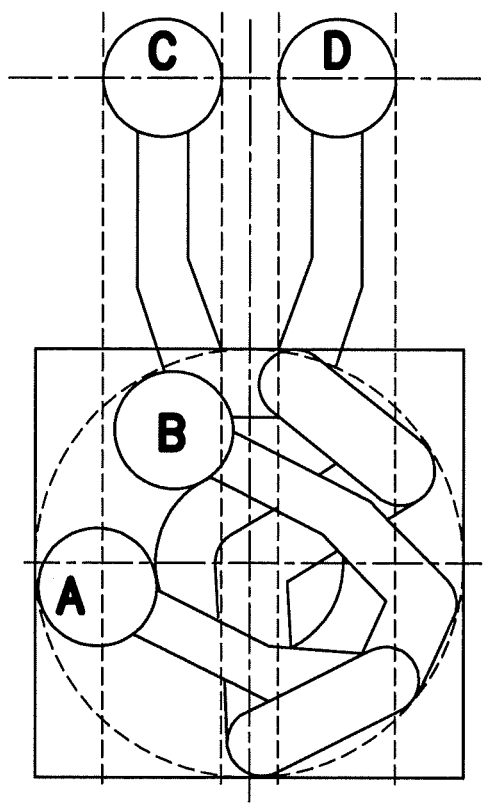
FIG.7C-7      FIG.7C-8

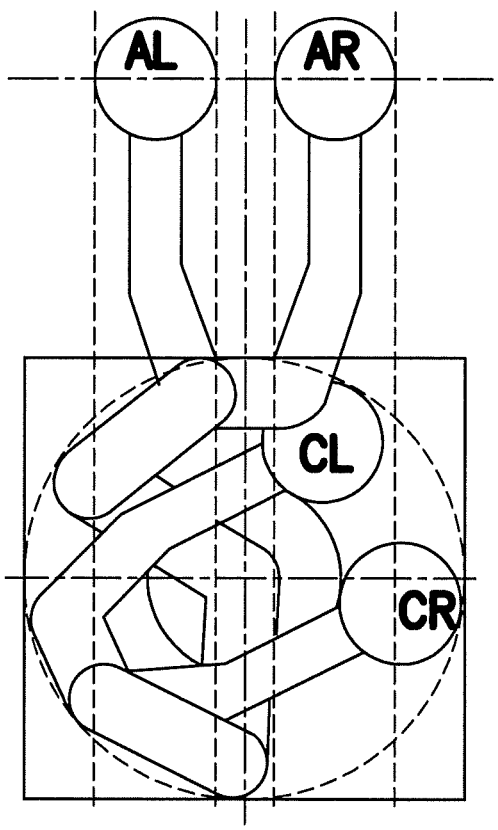
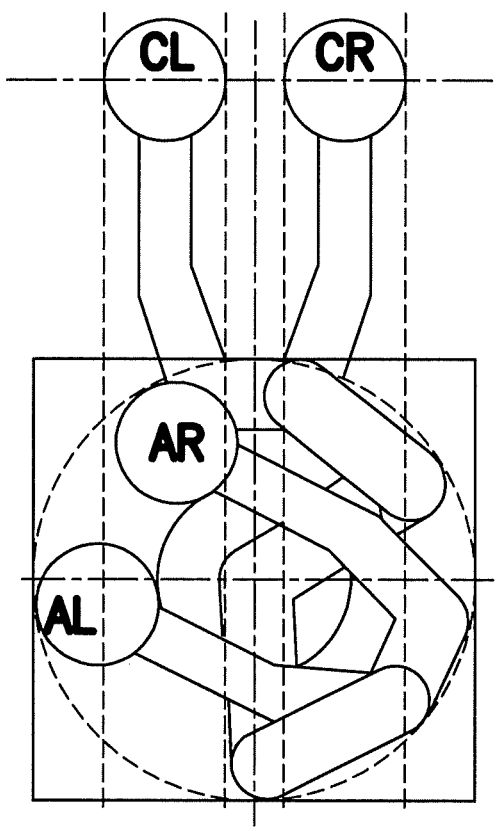
FIG.8C-7　　　　FIG.8C-8

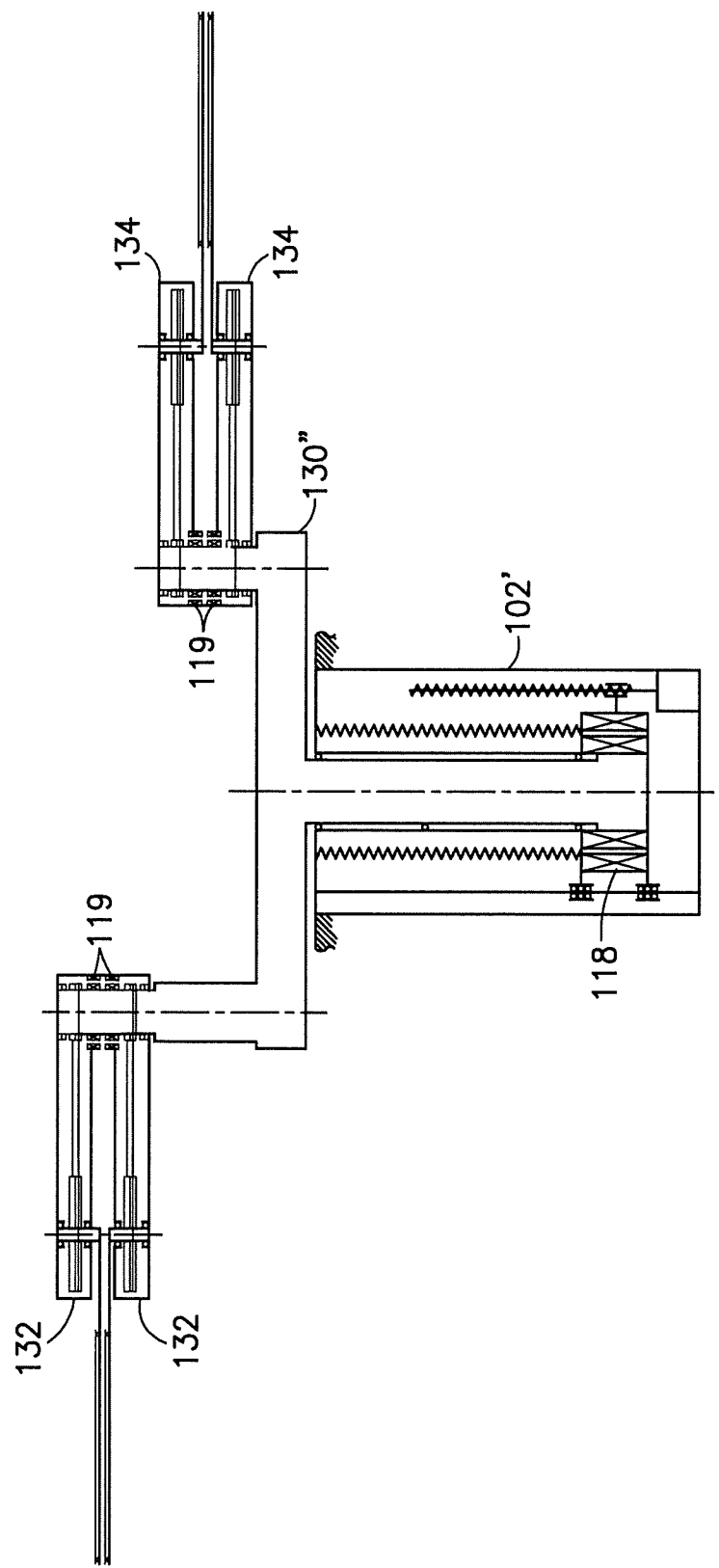

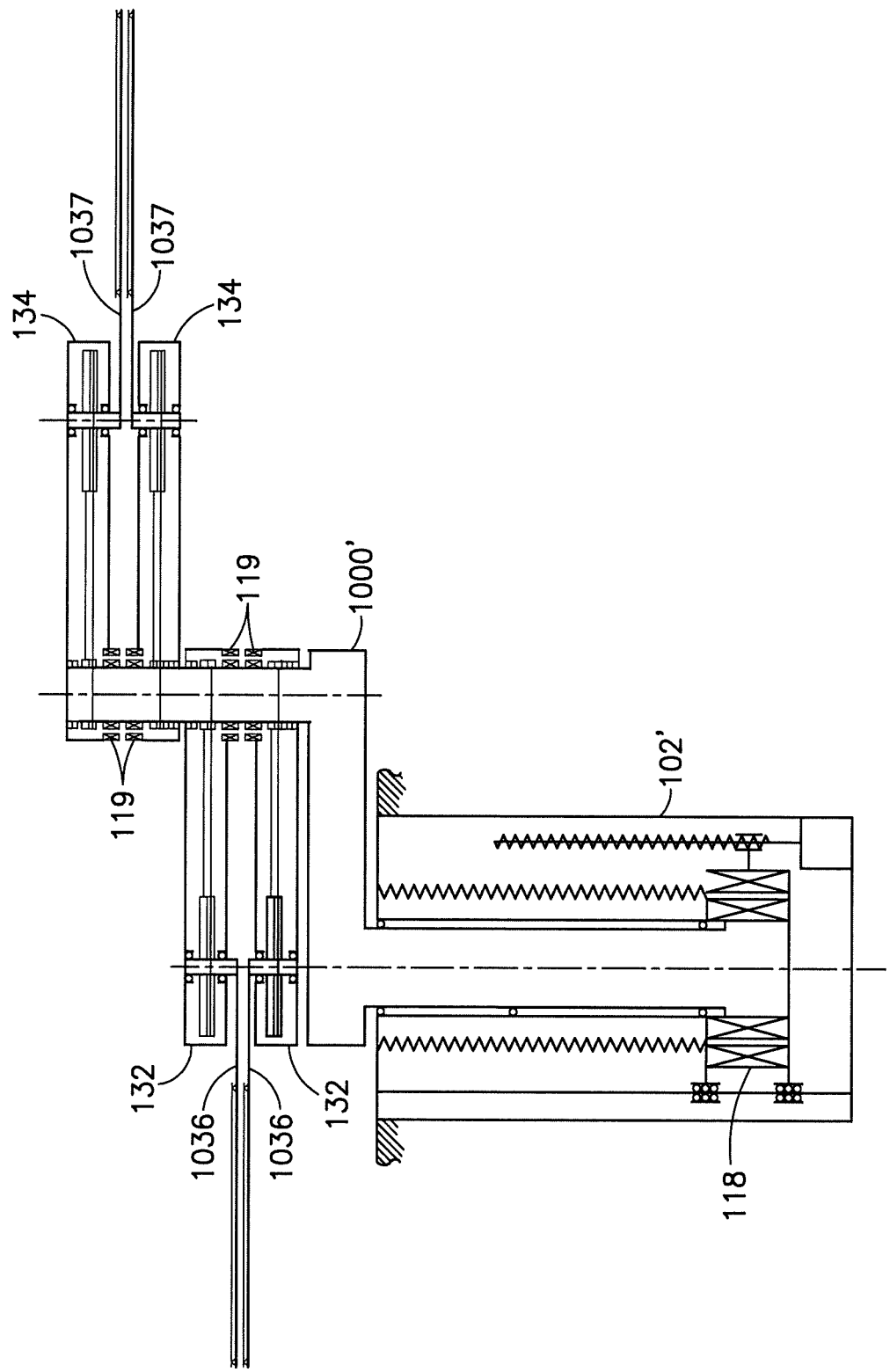

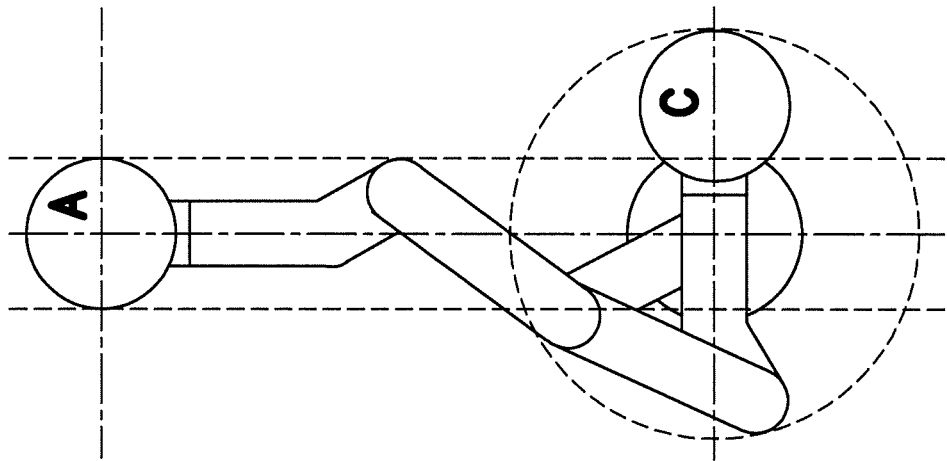
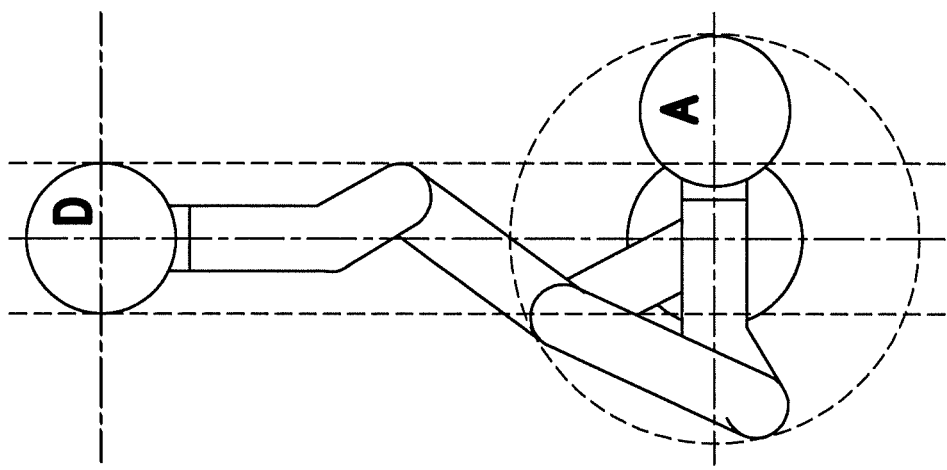
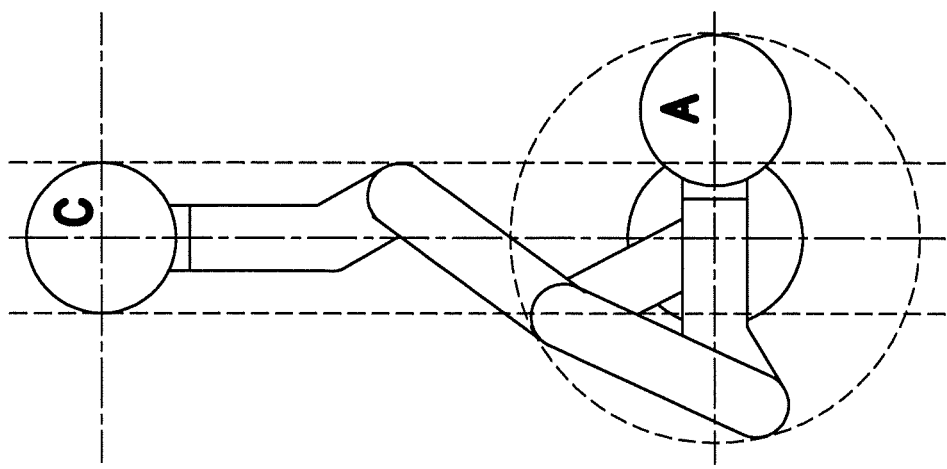

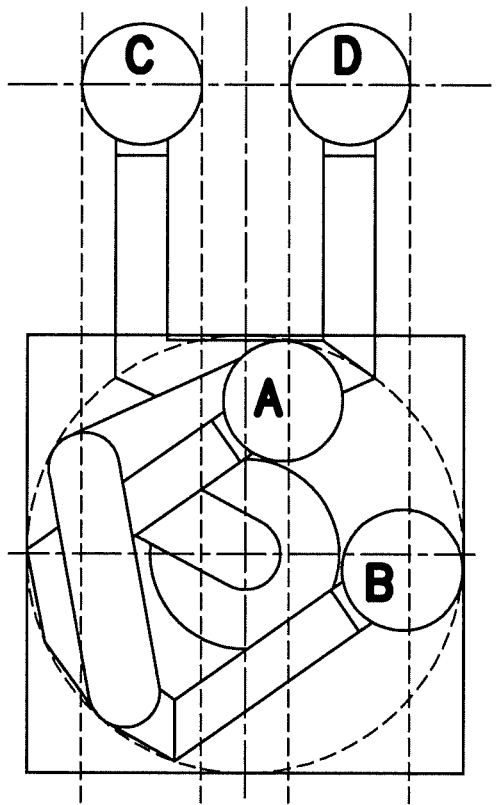
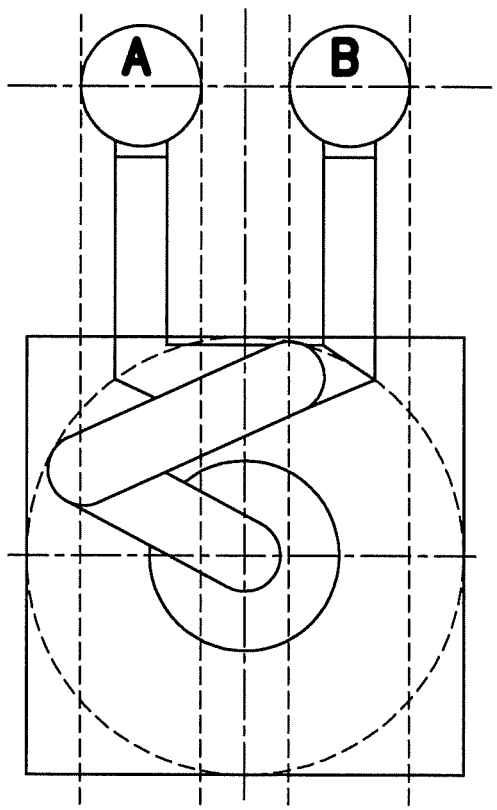
FIG.14C-7  FIG.14C-8

MATERIAL-HANDLING ROBOT WITH MULTIPLE SEMI-INDEPENDENT ARMS

CROSS REFERENCE TO RELATED APPLICATIONS

This application claims priority to U.S. provisional patent application No. 63/048,822 filed Jul. 7, 2020 and U.S. provisional patent application No. 63/060,815 filed Aug. 4, 2020, which are hereby incorporated by reference in their entireties.

BACKGROUND

Technical Field

The example and non-limiting embodiments relate generally to a material-handling robot for manipulating and transferring payloads, such as semiconductor wafers, in semiconductor processing systems using multiple semi-independent arms.

BRIEF DESCRIPTION OF PRIOR DEVELOPMENTS

The following U.S. Patents, which are all hereby incorporated by reference in their entireties, disclose various robot arms and substrate processing and transport apparatus: U.S. Pat. Nos. 9,149,936; 10,224,232; 10,363,665; 10,543,596; 10,580,682; 10,596,710. A robot drive, such as having coaxial drive shafts for example, may drive one or more upper arms, which may drive one or more forearms. One or more end effectors may be attached to an end of each forearm, where the end effectors may support one or more substrates thereon, such as a semi-conductor wafer or flat glass panel for example. The robot may be configured to move the substrates between substrate processing chambers, load locks and/or storage cassettes for example.

SUMMARY

The following summary is merely intended to be an example. The summary is not intended to limit the scope of the claims.

In accordance with one aspect, an apparatus is provide comprising: a drive unit; and an arm assembly connected to the drive unit, where the arm assembly comprises: an upper arm connected to a first drive shaft of the drive unit; a first set of forearms connected to a first end of the upper arm; a second set of forearms connected to a second end of the upper arm, where the second set has a different number of forearms than the first set; and a respective end effector connected to the forearms.

In accordance with another aspect, a method is provide comprising: connecting a first set of forearms to a first end of an upper arm; connecting a second set of forearms to an opposite second end of the upper arm, where the first set of forearms has a different number of the forearms than the second set of forearms; connecting respective end effectors to the forearms, where the end effectors are an odd number, where the second set of forearms comprises a first forearm comprising a bridge structure such that a first end effector on the second set of forearms is configured to move between second and third end effectors of the first set of forearms, and such that the first end effector is configured to move between the first end effector and a portion of the first forearm.

In accordance with another aspect, an apparatus is provided comprising: a drive unit; and an arm assembly connected to the drive unit, where the arm assembly comprises: an upper arm connected to a first drive shaft of the drive unit; a first set of forearms connected to a first end of the upper arm; a second set of forearms connected to an opposite second end of the upper arm, where the second set has a different number of forearms than the first set, where the second set of forearms comprises a bridge structure; and a respective end effector connected to the forearms, where the first set of forearms comprises a first number N of the forearms and the second set of forearms comprises a second number N−1 of the forearms, and where the arm assembly comprises an odd number of end effectors.

BRIEF DESCRIPTION OF THE DRAWINGS

The foregoing aspects and other features are explained in the following description, taken in connection with the accompanying drawings, wherein:

FIGS. 6C-1 to 6C-7 illustrate example positions of the links of the robots shown in FIGS. 6A-6B in a series of diagrams;

FIGS. 7C-1 to 7C-8 illustrate example positions of the links of the robots shown in FIGS. 7A-7B in a series of diagrams;

FIGS. 8C-1 to 8C-8 illustrates example positions of the links of the robots shown in FIGS. 8A-8B in a series of diagrams;

FIG. 9 is a cross sectional view similar to FIG. 3 illustrating features of an alternative embodiment;

FIG. 12 is a cross sectional view of the robot similar to FIG. 11 showing an alternate embodiment;

FIGS. 13A-13H illustrates example positions of the links of the robots shown in FIGS. 10A-10B in a series of diagrams;

FIGS. 14C-1 to 14C-8 illustrate example positions of the links of the robots shown in FIGS. 14A-14B in a series of diagrams;

FIGS. 15C-1 to 15C-9 illustrate example positions of the links of the robots shown in FIGS. 15A-15B in a series of diagrams;

DETAILED DESCRIPTION OF EXAMPLE EMBODIMENTS

Features as described herein may be used to provide a robot capable of a) carrying multiple payloads simultaneously, b) picking, placing and exchanging multiple payloads simultaneously and c) picking, placing and exchanging individual payloads independently. The above capabilities improve productivity by processing multiple payloads concurrently while also providing the flexibility of processing individual payloads sequentially, for example, due to workstation maintenance.

Figure 1A:
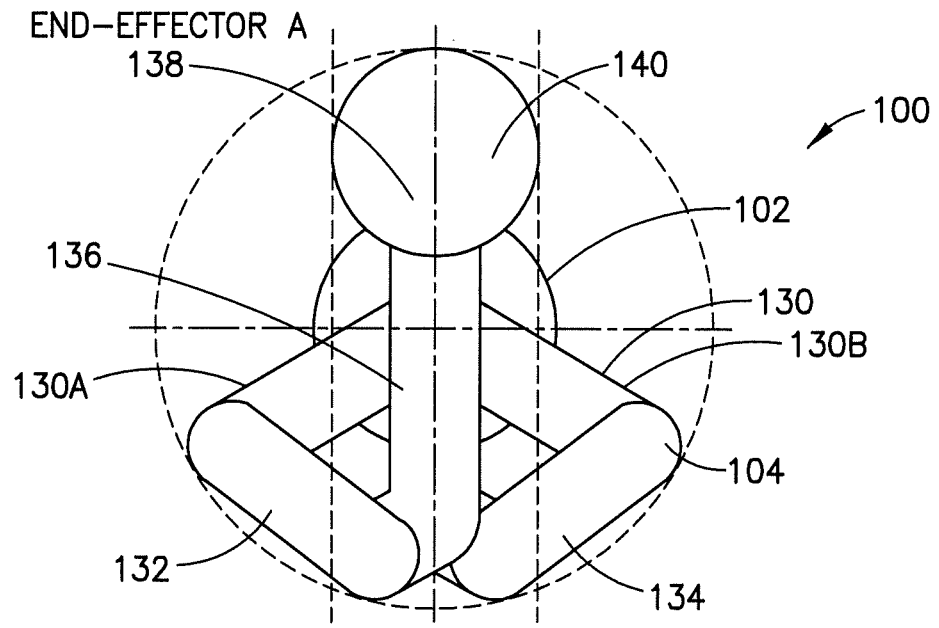
FIG. 1A is a top plan view of a robot comprising features as described herein.
Figure 1B:
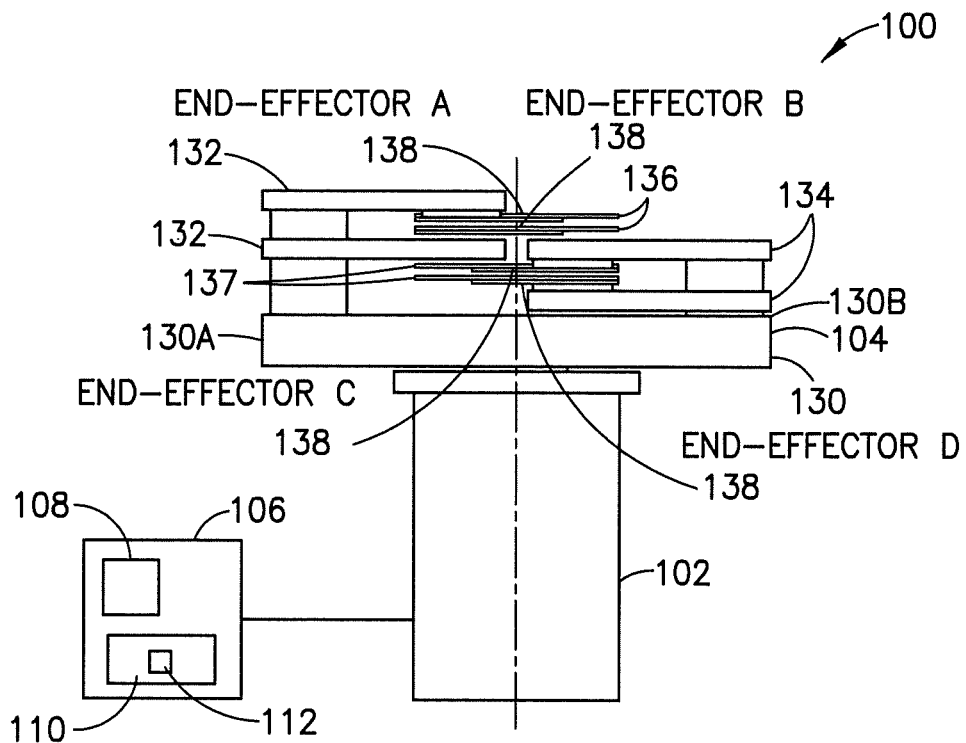
FIG. 1B is a side view of the robot shown in FIG. 1A.

In one example embodiment, a robot 100 may comprise a drive unit 102, a robot arm 104 and a control system including a controller 106, as depicted diagrammatically in FIGS. 1A and 1B, which shows the robot with the forearms folded in the retracted position. A simplified cross-sectional view showing an example internal arrangement of the robot of FIGS. 1A and 1B is provided in a diagrammatic form in FIG. 2, but which shows the robot with the forearms unfolded for clarity of depiction. The control system may comprise a controller 106 comprising one or more processors 108, one or more memories 110 storing code or programs 112 for controlling the drive system, and one or more sensors 114 for sensing positions of members of the drive unit, members of the robot arms, and/or substrates on the end effectors for example (not all the sensors are shown).

Figure 2:
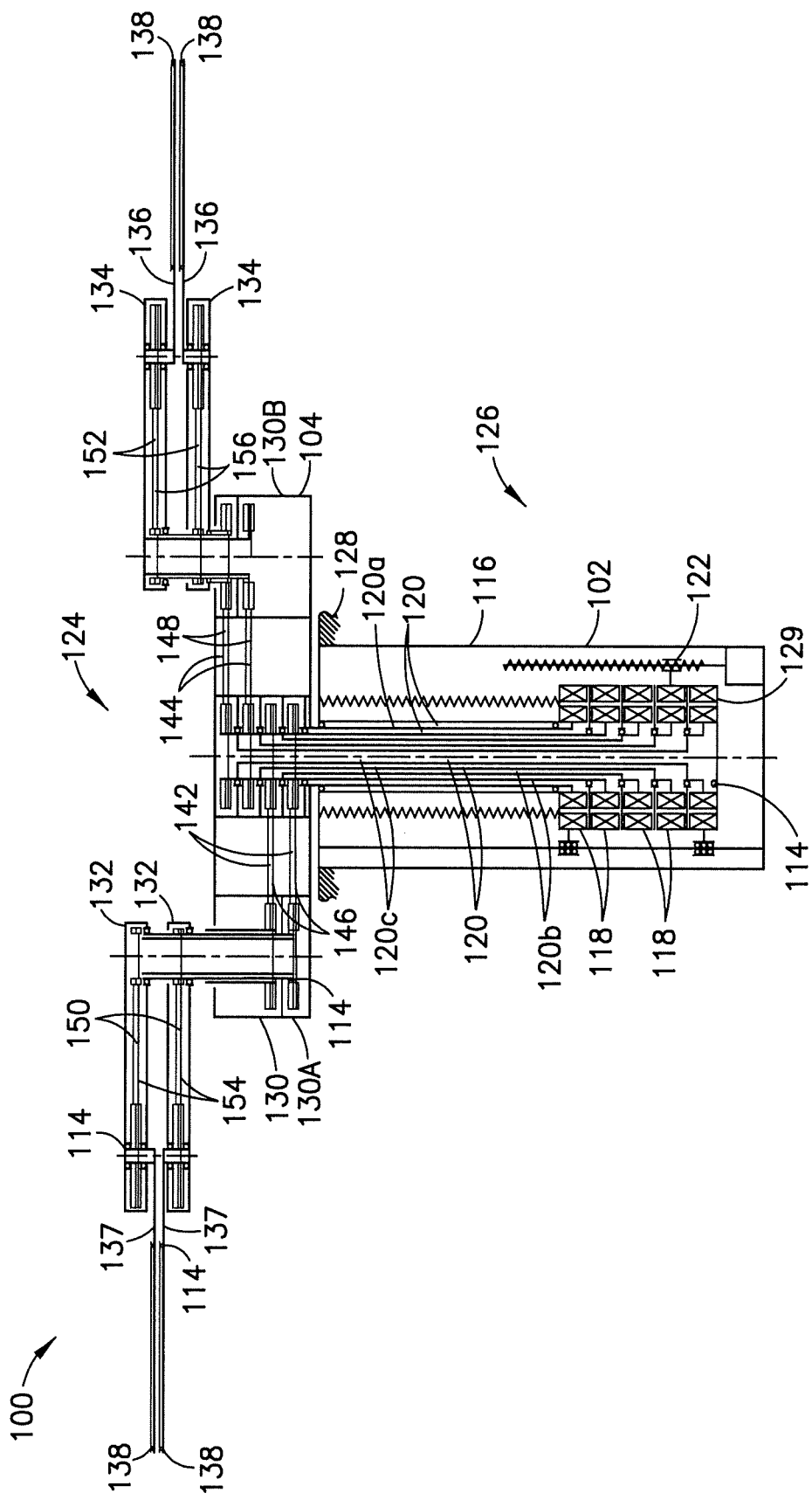
FIG. 2 is a cross sectional view of the robot shown in FIGS. 1A-1B.

The drive unit 102 may include a spindle assembly configured to actuate the robot arm 104. The spindle assembly may consist of a spindle housing 116, one or more motors 118 and one or more drive shafts 120. The example on FIG. 2 shows five (5) motors and five (5) coaxial drive shafts. However, more or less than five motors and coaxial drive shafts could be provided. If so desired, the drive unit may further include a vertical lift mechanism 122, e.g., consisting of one or more linear rail-bearing arrangements and a motor-driven ball-screw, configured to lift the spindle up or down in the vertical direction.

Considering that the robot arm 104 may operate in a vacuum environment 124, the spindle of the drive unit may include sealing and other features that may allow the drive shaft(s) or upper portions of the drive shaft(s) to be in a vacuum environment 124, such as inside a chamber 128. As an example, a substantially cylindrical separation barrier 129 between the rotor(s) of the motor(s) and the stator(s) of the motor(s) may be utilized to contain an external atmospheric environment 126 on the stator side (outer side) of the separation barrier and a vacuum environment 124 on the rotor side (inner side) of the separation barrier, in which case the drive shaft(s) 120 may reside in a vacuum environment 124 in their entirety. As another example, rotary seal(s), such as ferrofluidic seal(s), may be utilized to allow upper portions of the drive shafts to protrude from an atmospheric environment 126 to a vacuum environment 124.

The robot arm 104 may consist of an upper arm link 130, including a left-hand side portion 130A and a right-hand side portion 130B, one or more left forearm links 132, each coupled through a rotary joint to the left-hand side portion 130A of the upper arm link 130, two or more right forearm links 134, each coupled to the right-hand side portion 130B of the upper arm link 130 through a rotary joint, and a plurality of wrist links 136, 137, each coupled to one of the forearm links through another rotary joint. Each of the wrist links 136, 137 may feature an end-effector 138 configured to carry a payload, such as a semiconductor wafer 140.

Figure 6A:
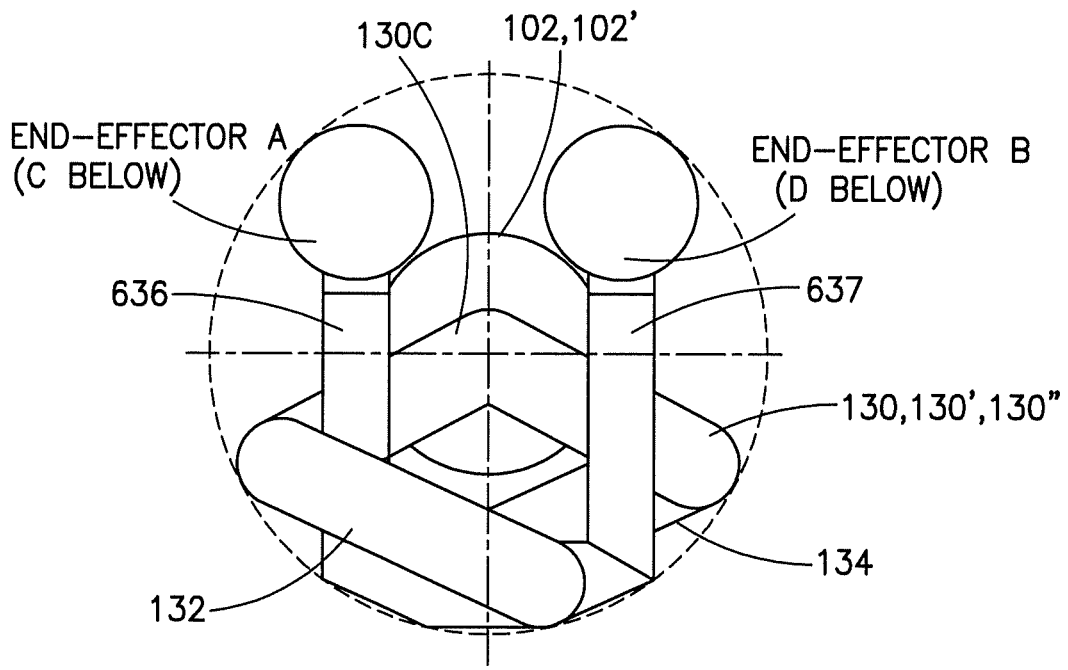
FIG. 6A is a top plan view of an example robot comprising features as described herein.
Figure 6B:
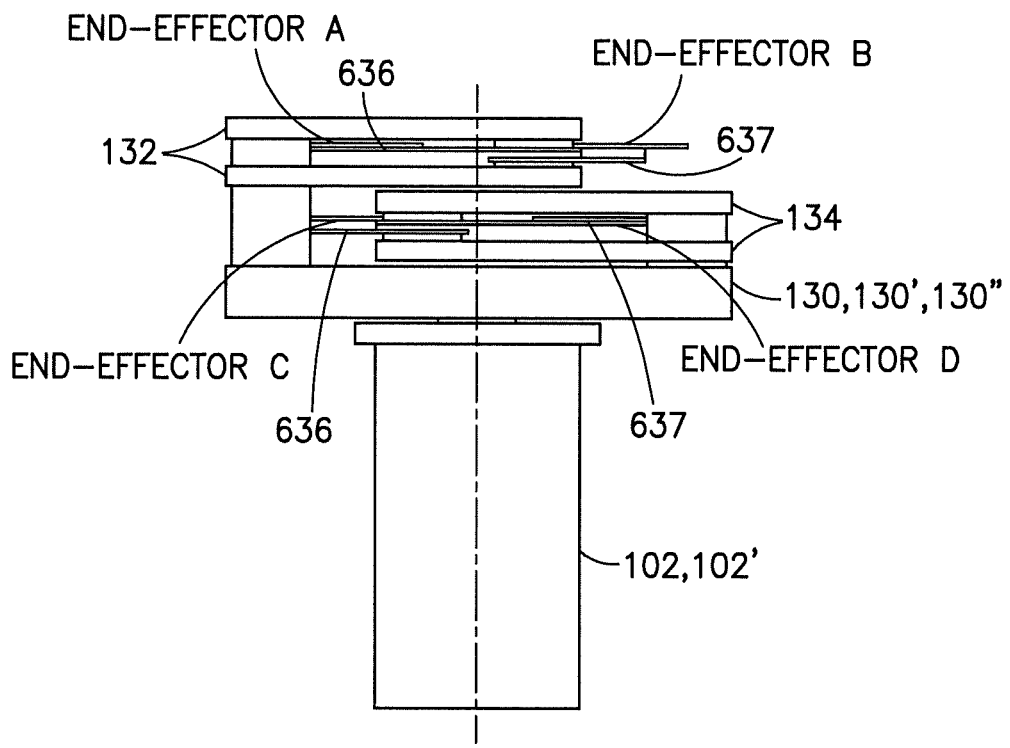
FIG. 6B is a side view of the robot shown in FIG. 6A.
Figures 3, 6C:
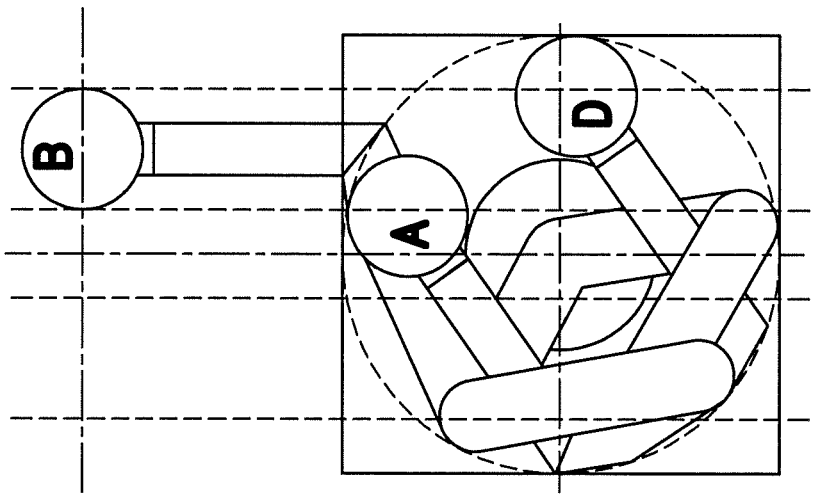
Figures 2, 6C:
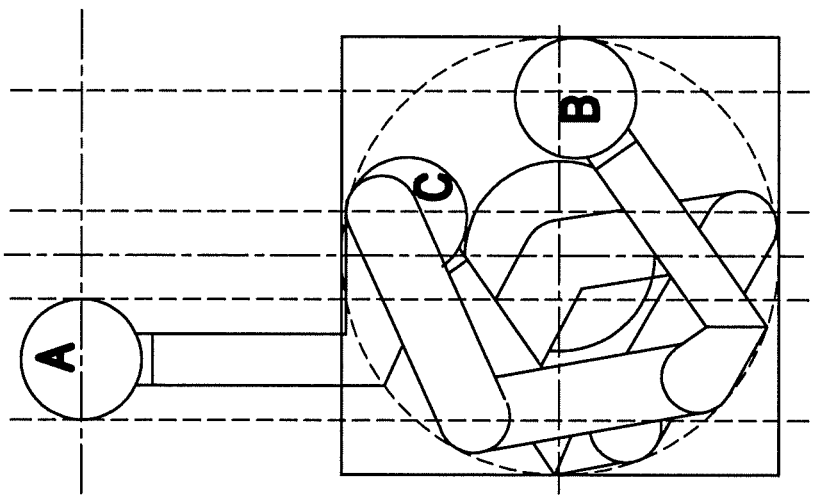
Figures 1, 6C:
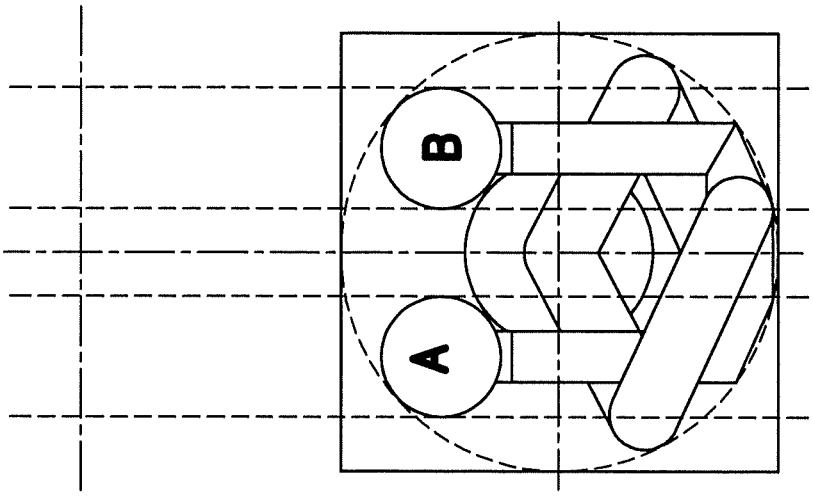

In the example of FIGS. 1-2, two left forearm links, two right forearm links and four wrist links are shown. In this case, the end-effectors may be denoted as end-effectors A, B, C and D from top to bottom.

In FIGS. 1-2, the left-hand side and right-hand side portions of the upper arm link are shown with substantially the same joint-to-joint length. However, the left-hand side and right-hand side portions of the upper arm link may have different joint-to-joint lengths.

As depicted in FIGS. 1-2, the joint-to-joint length of the forearm links may be shorter than the joint-to-joint length of the corresponding portion of the upper arm link. Alternatively, the joint-to-joint length of the forearm links may be the same as or longer than the joint-to-joint length of the corresponding portion of the upper arm link. Furthermore, the forearm links may be of different joint-to-joint lengths, including joint-to-joint lengths that are shorter than, equal to and longer than the joint-to-joint length of the corresponding portion of the upper arm link. As indicated in FIG. 1, in this example the wrist links 136, 137 of the robot arm may be configured so that the end-effectors 138 are stacked on top of each other when the robot arm is in its retracted position.

As indicated in FIG. 2, the upper arm link 130 may be connected to the outer drive shaft 120a of the drive unit. Each of the forearms 132, 134, which may be coupled to the upper arm link 130 via rotary joints as explained earlier, may be actuated by one of the inner shafts 120b, 120c of the drive unit using a respective transmission arrangement 142, 144. The respective transmission arrangements may each comprise a shoulder pulley, which may be attached to the respective drive shaft, an elbow pulley, which may be attached to the respective forearm link 132, 134, and a respective band, belt or cable 146, 148, which may transmit motion between the two pulleys.

Each of the wrist links 136, 137, which may be coupled to the corresponding forearm link 132, 134 via a rotary joint as explained earlier, may be constrained by another transmission arrangement 150, 152. The transmission arrangements 150, 152 may comprise an elbow pulley, which may be attached to the upper arm link, a wrist pulley, which may be attached to the wrist link, and a band, belt or cable 154, 156, which may transmit motion between the two pulleys. The transmission arrangements may be configured to constrain their respective end-effectors 138 so that it points in the radial direction with respect to the axis of rotation of the upper arm link 130 regardless of the positions (orientations) of the upper arm link and the corresponding forearm link of the robot arm.

For example, if the joint-to-joint length of the forearm link is equal to the joint-to-joint length of the corresponding portion of the upper arm link, in order for the end-effector to maintain radial orientation, the effective diameter of the wrist pulley may be twice the effective diameter of the elbow pulley. If the joint-to-joint length of the forearm link is not equal to the joint-to-joint length of the corresponding portion of the upper arm link, at least one of the pulleys, such as the wrist pulley, may feature a non-circular profile to provide the desired position-dependent transmission ratio to maintain radial orientation of the end-effector (reference to Persimmon patent on robot arms with unequal link lengths).

Figure 3:
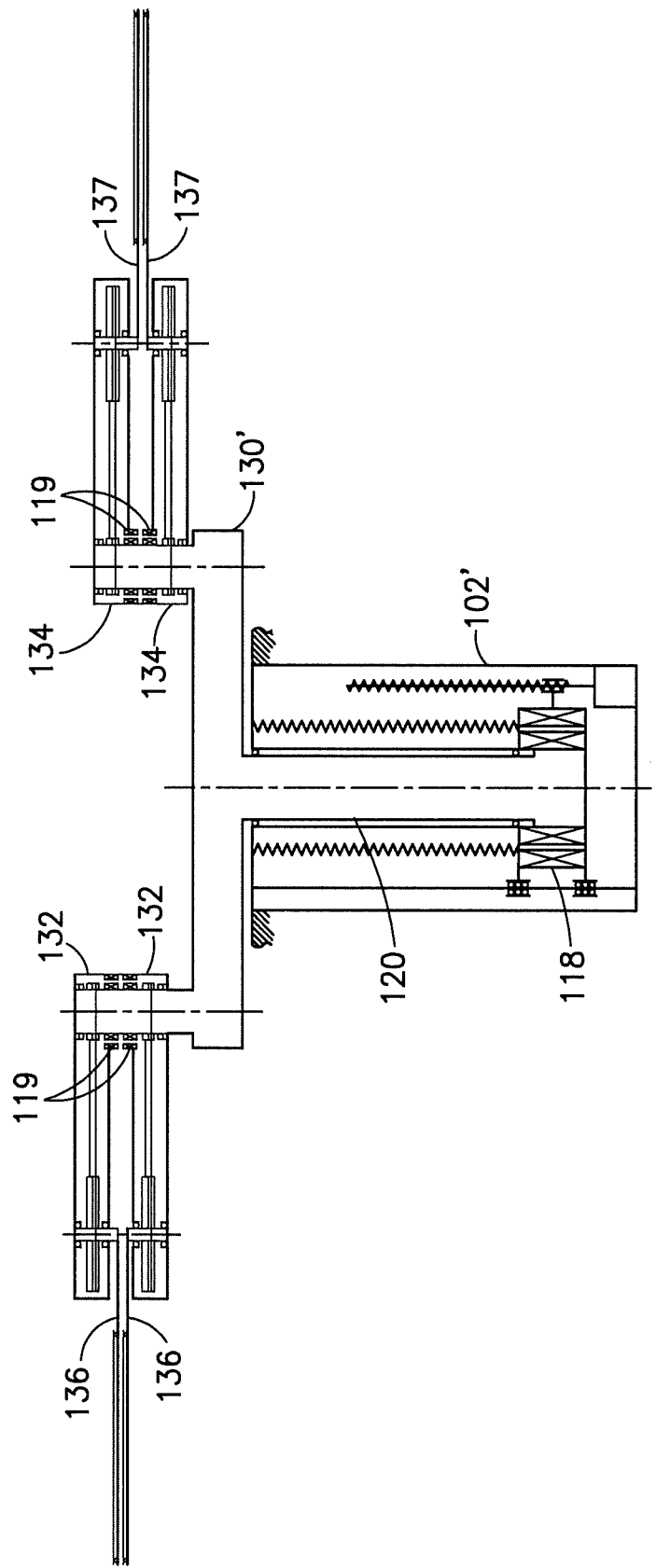
FIG. 3 is a cross sectional view similar to FIG. 2 illustrating features of an alternative embodiment.
Figure 3A:
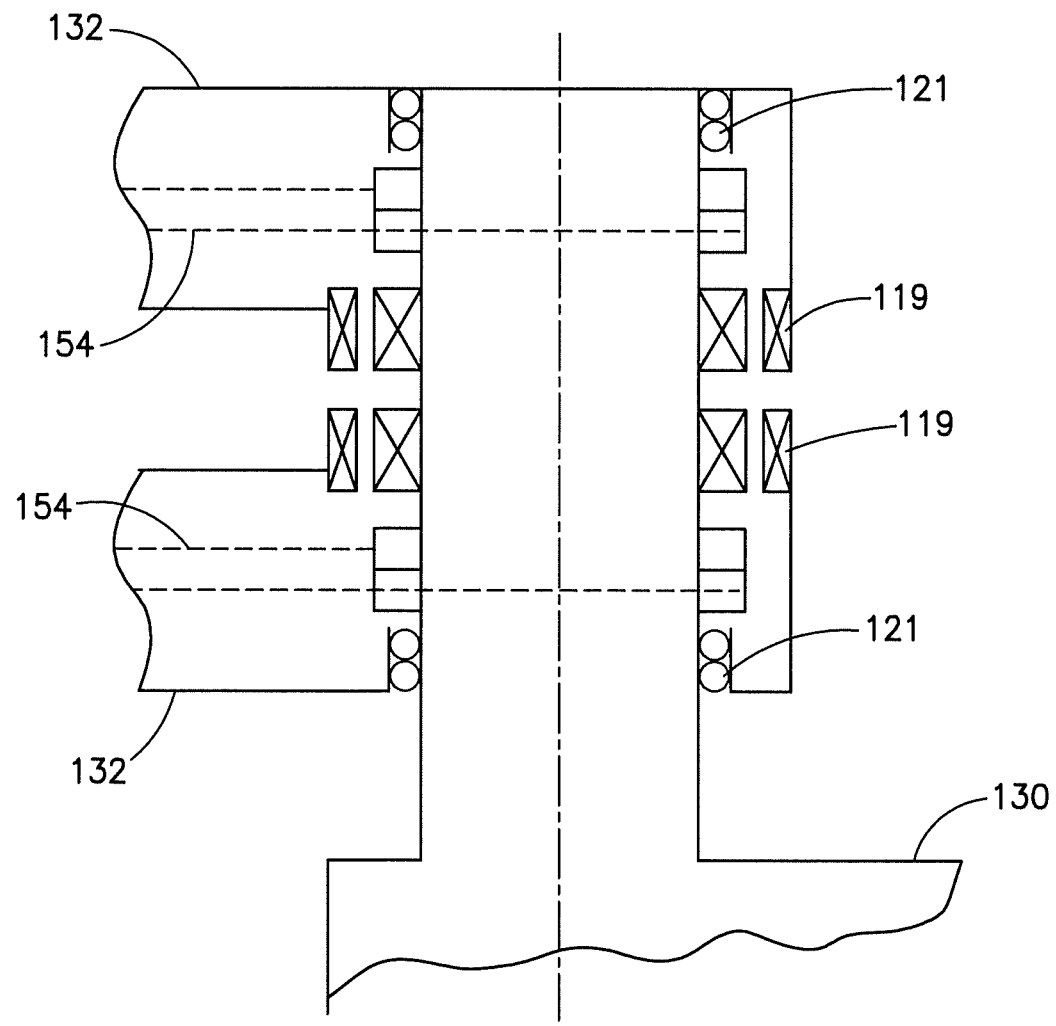
FIG. 3A is an enlarged view of a portion of the robot shown in FIG. 3.

Another example internal arrangement of the robot of FIG. 1 is depicted diagrammatically in FIG. 3. FIG. 3A is an enlarged view of a portion of the robot. Motors 118, 119 are indicated by pairs of boxes with an "X" (for stator and rotor) on shafts, and pulleys are represented by pairs of boxes without the "X" on the shafts. Bearings 121 are also shown. In this example, the spindle assembly of the drive unit may feature a single motor 118 with a single drive shaft 120 connected to the common upper arm link 130' of the robot arm. As indicated in the figure, the forearms 132, 134 of the robot arm may be actuated directly by motors 119 located at the elbows of the robot arm. In the particular example of FIG. 3, the motors 119 are shown in an external-rotor configuration on the upper arm 130'.

Figure 4C:
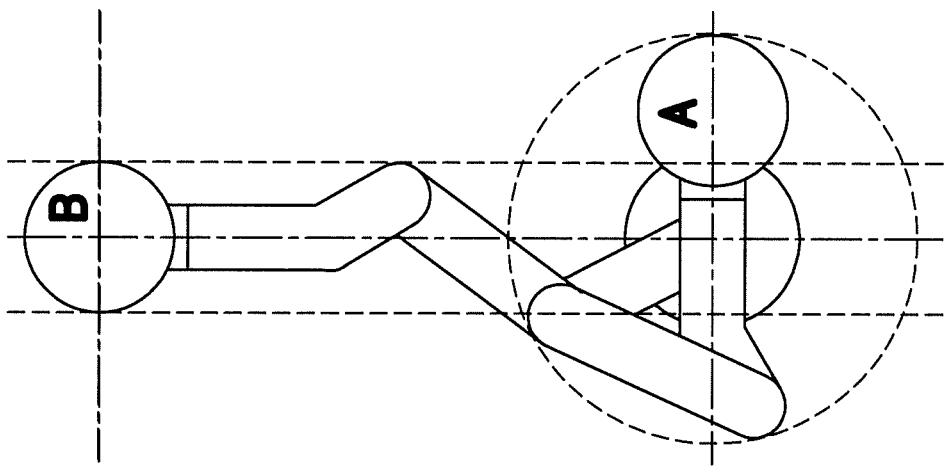
FIGS. 4A-4H illustrates example positions of the links of the robots shown in FIGS. 1A-3A in a series of diagrams.
Figure 4B:
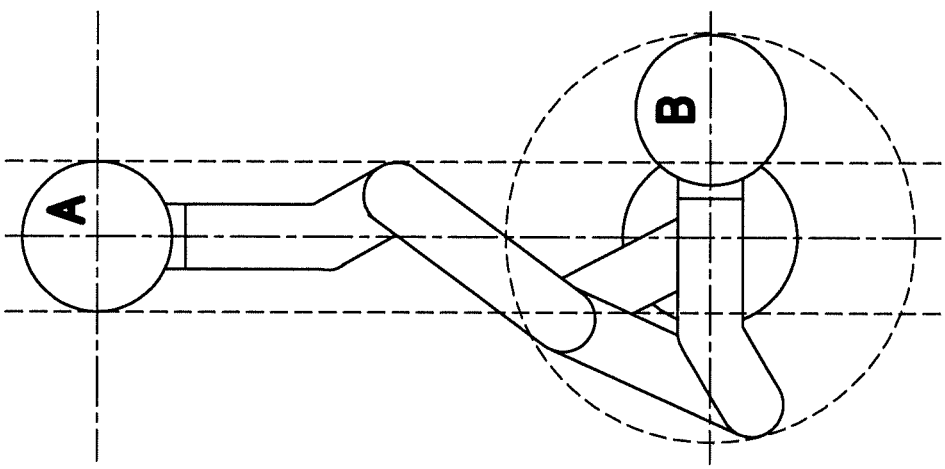
Figure 4A:
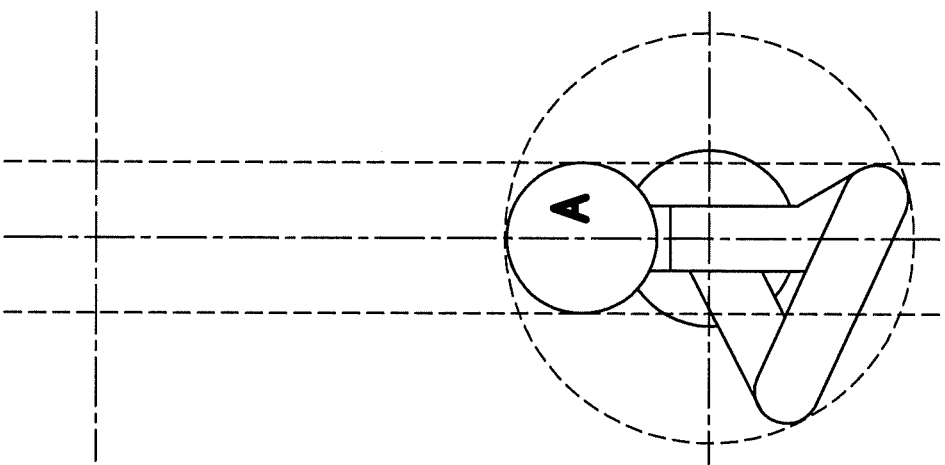
Figure 4F:
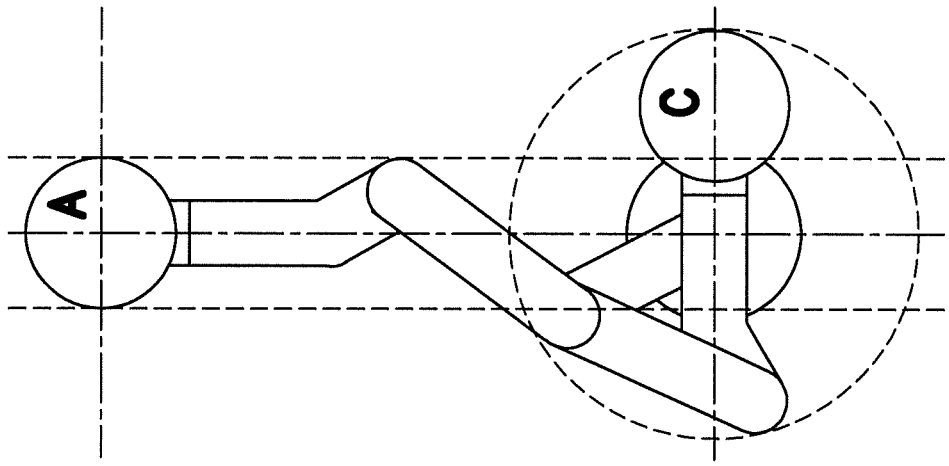
Figure 4E:
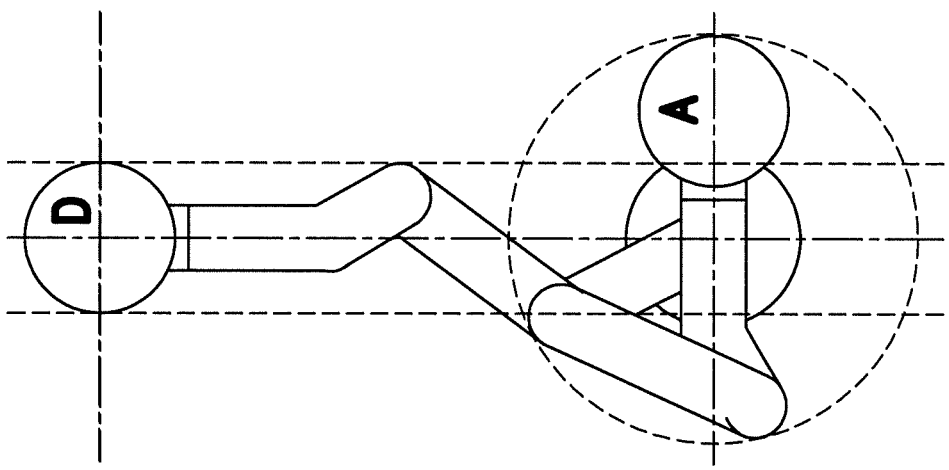
Figure 4D:
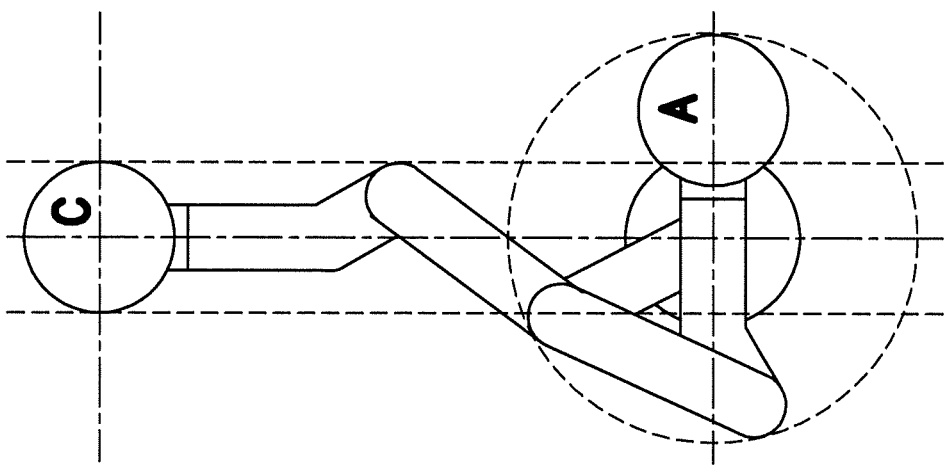
Figure 4G:
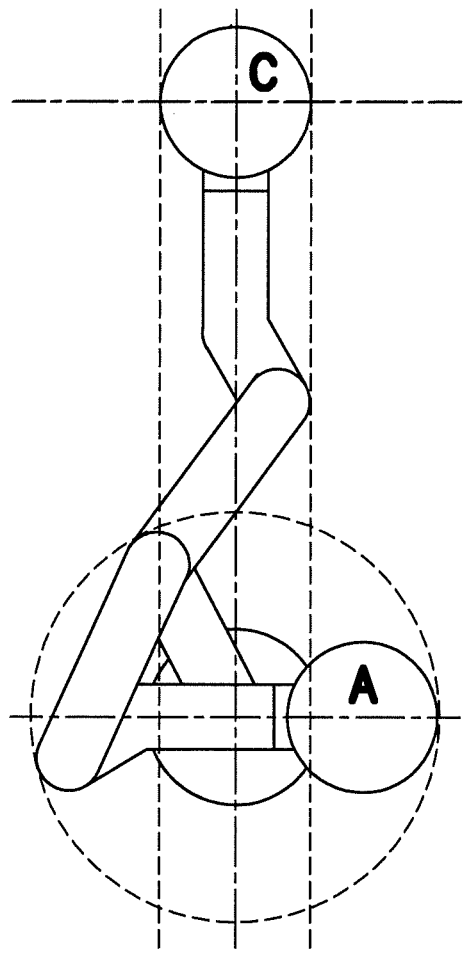
Figure 4H:
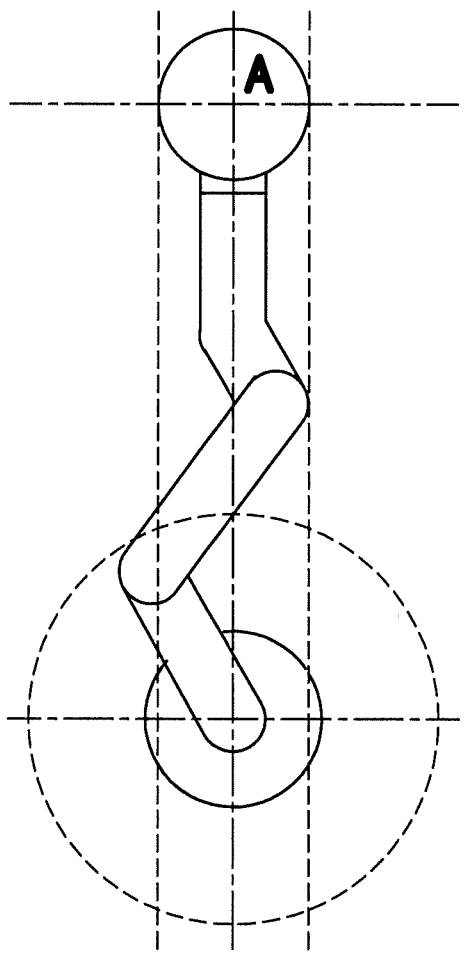

The operation of the robot of FIG. 1 is illustrated in FIGS. 4A-4H. Although the shape of the upper arm shown in FIGS. 4A-4H is different from the shape of the upper arm shown in FIG. 1, the diagrams of FIGS. 4A-4H help to show the different extended and retracted positions of a dual assembly having a common upper arm. FIG. 4A shows all end-effectors retracted. FIG. 4B shows end-effector A partially extended, illustrating that the wrist joint associated with end-effector A does not pass over the payloads on end-effectors B, C and D, thus reducing payload contamination risks. FIGS. 4C-4F show end-effectors A, B, C and D, respectively, extended. FIG. 4G shows end-effectors A and B extended simultaneously. FIG. 4H shows end-effectors C and D extended simultaneously.

The robot may pick or place a single payload, such as a semiconductor wafer, by extending a single end-effector to a workstation according to FIGS. 4C-4F. The robot can rapidly exchange a payload at a workstation by performing a sequence of a pick operation with one end-effector followed by a place operation with another end-effector.

The robot may pick or place a pair of payloads simultaneously by extending a pair of end-effectors to two workstations (or a single two-shelf workstation) according to the diagrams (g) and (h). The robot can rapidly exchange a pair of payloads at a workstation (or a pair of workstations) by performing a sequence of a pick operation with one pair of end-effectors, for example, end-effectors A and B, followed by a place operation with another pair of end-effectors, for example, end-effectors C and D.

Figure 5A:
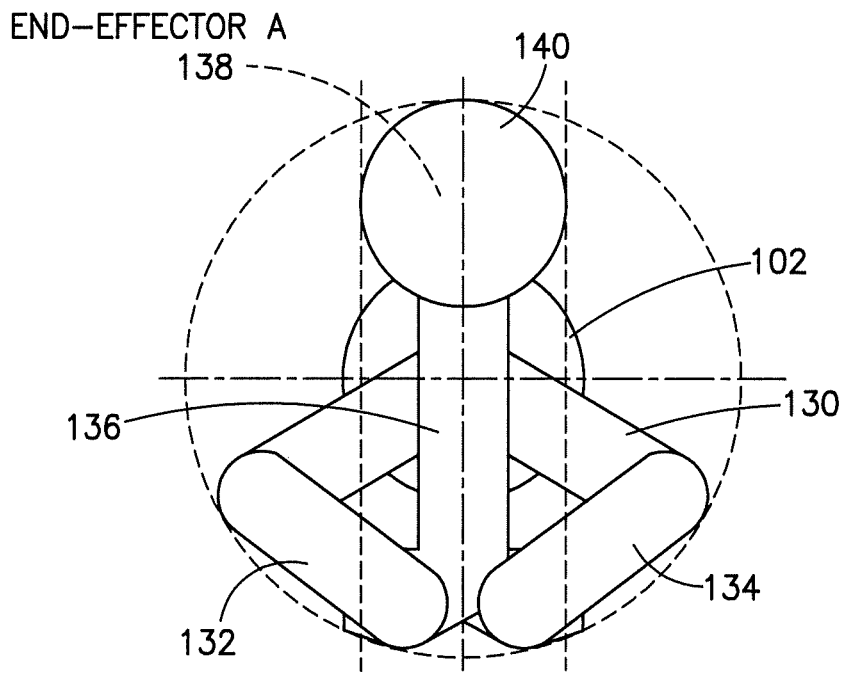
FIG. 5A is a top plan view of an example robot comprising features as described herein.
Figure 5B:
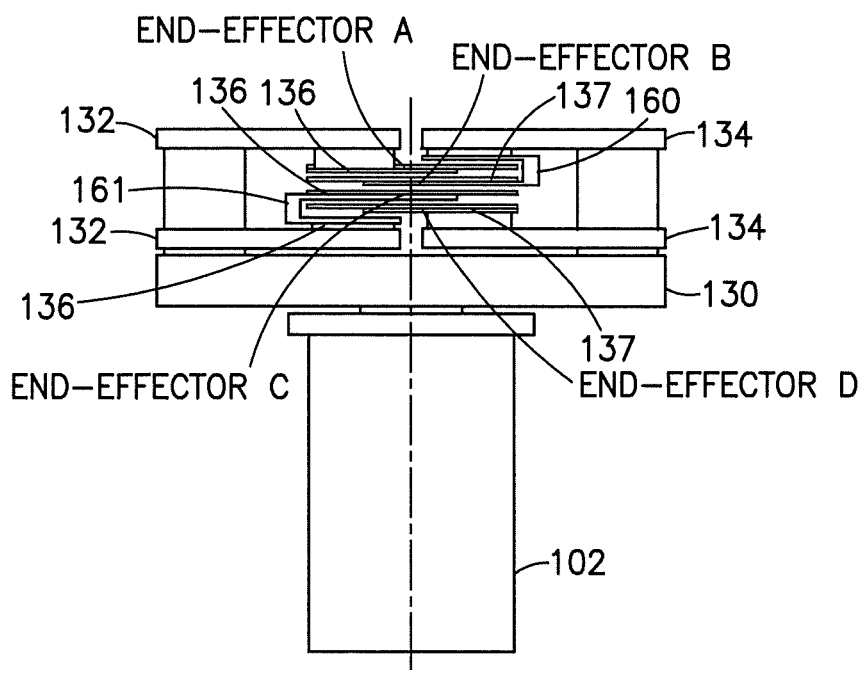
FIG. 5B is a side view of the robot shown in FIG. 5A.

An example robot with an alternative arrangement of the forearms, wrist links and end-effectors is depicted diagrammatically in FIGS. 5A and 5B. As indicated in FIGS. 5A and 5B, the wrist link 137 associated with end-effector B may feature a bridge structure 160 to clear wrist link A when end-effector B extends. Similarly, the wrist link 136 associated with end-effector C may feature a bridge structure 161 to clear wrist link D when end-effector C extends. The example arrangement of forearms, wrist links and end-effectors according to FIGS. 5A and 5B may be utilized to achieve a compact and uniform vertical pitch between the four end-effectors shown in the figures.

It should be noted that the bridge structures 160, 161 shown in FIGS. 5A and 5B may not be needed if the geometry of the robot arm is selected so that the wrist shafts that support the wrist links B and C can clear the wrist links A and D, respectively. The robot of FIGS. 5A and 5B may utilize substantially the same example internal arrangements as described earlier with respect to FIGS. 2 and 3.

Another example robot with an alternative configuration of end-effectors is shown diagrammatically in FIGS. 6A and 6B. In this example, end-effectors A and B on the top two wrist links 636, 637 may be arranged in a side-by-side manner, and the wrist link associated with end-effector B may be stepped up so that end-effectors A and B may be substantially at the same elevation. This is possible because the geometry of the robot arm has been selected so that end-effector B can pass by end-effector A when end-effector B extends. Similarly, end-effectors C and D of the bottom two wrist links 636, 637 may be arranged in a side-by-side manner, and the wrist link associated with end-effector C may be stepped up so that end-effectors C and D may be substantially at the same elevation. In FIGS. 6A-6B, the arm assembly has a single bent upper arm link 130 and multiple forearms 132, 134 attached to opposite ends of the upper arm. A center of the upper arm link 130, at its bend 130c, is attached to a drive shaft of the drive unit 102 such that the drive shaft may rotate the upper arm at the bend 130c. Again, the robot of FIGS. 6A and 6B may utilize the same example internal arrangements as described earlier with respect to FIGS. 2 and 3.

Figure 7A:
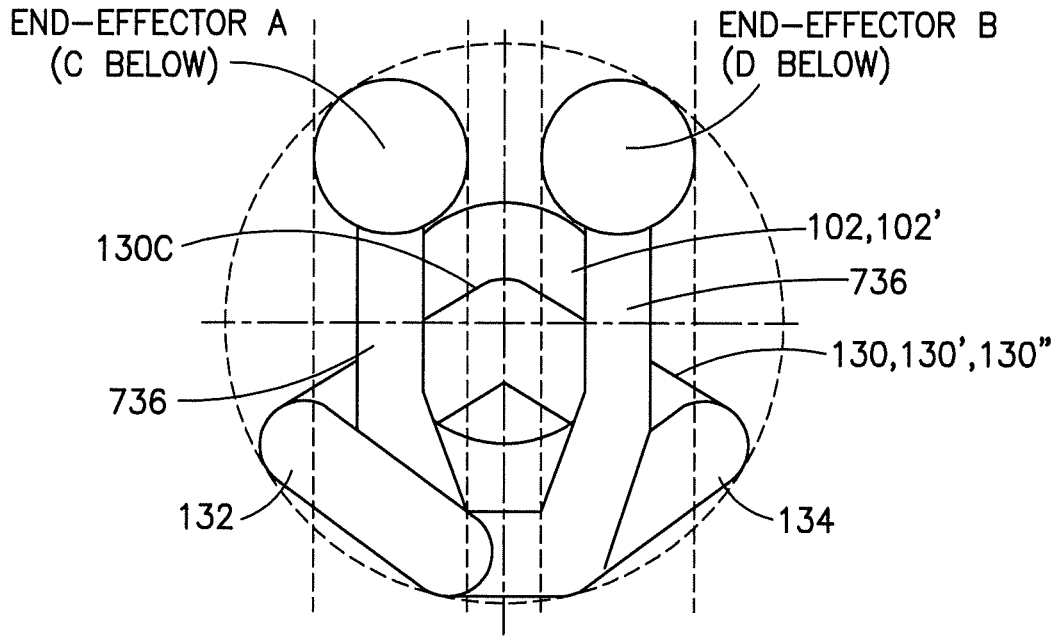
FIG. 7A is a top plan view of an example robot comprising features as described herein.
Figure 7B:
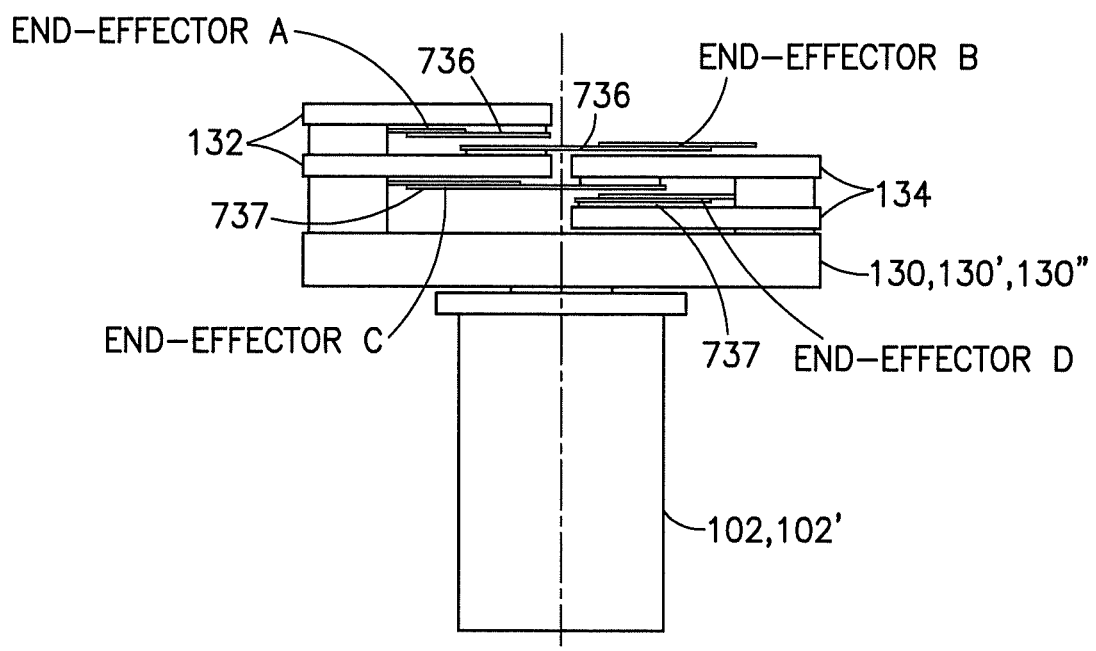
FIG. 7B is a side view of the robot shown in FIG. 7A.
Figures 6, 7C:
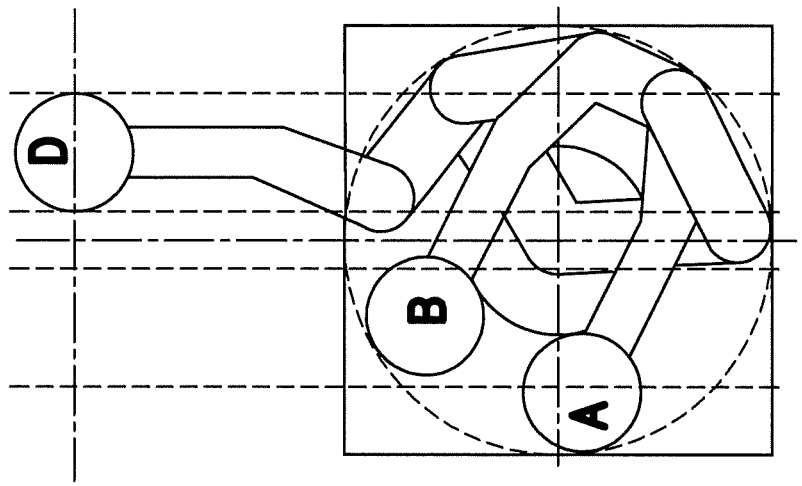
Figure 15A:
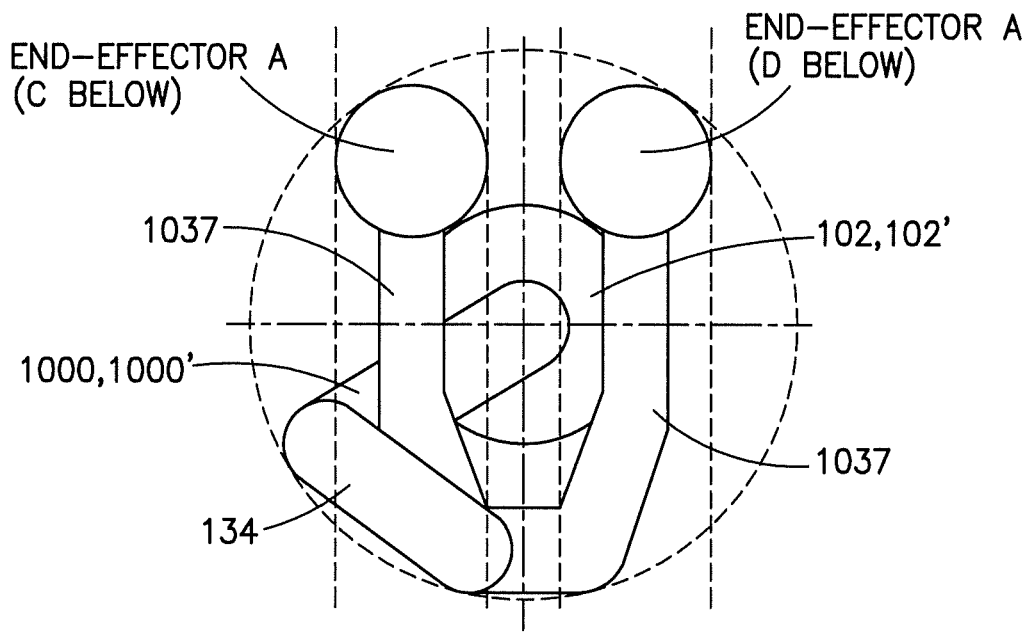
FIG. 15A is a top plan view of an example robot comprising features as described herein.
Figure 15B:
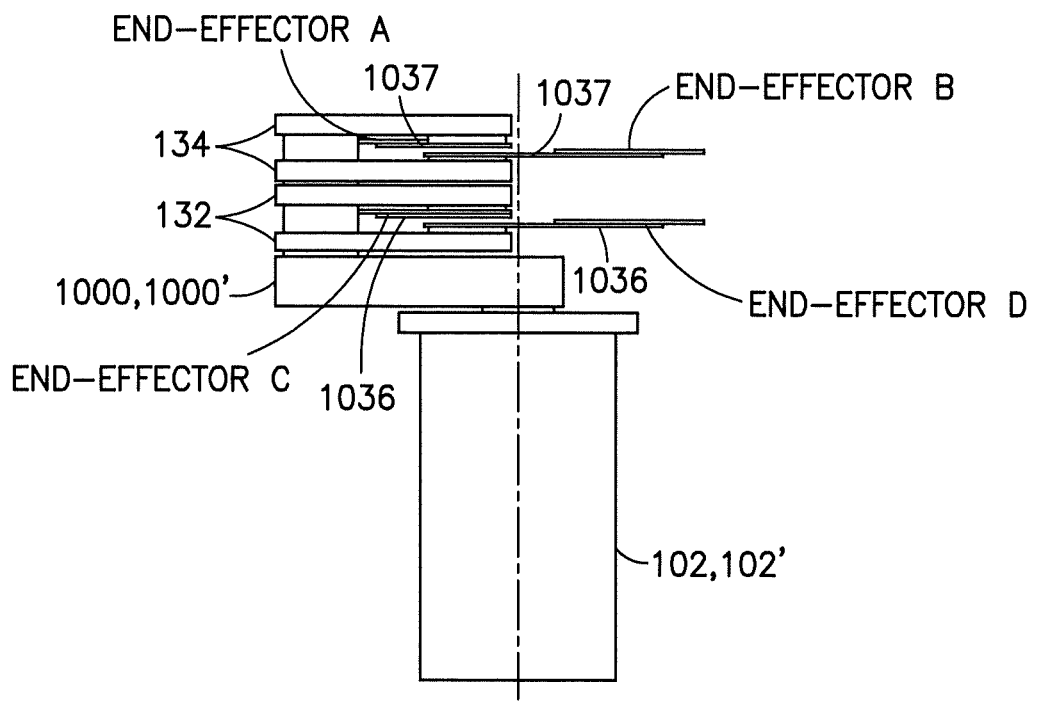
FIG. 15B is a side view of the robot shown in FIG. 15A.
Figures 3, 15C:
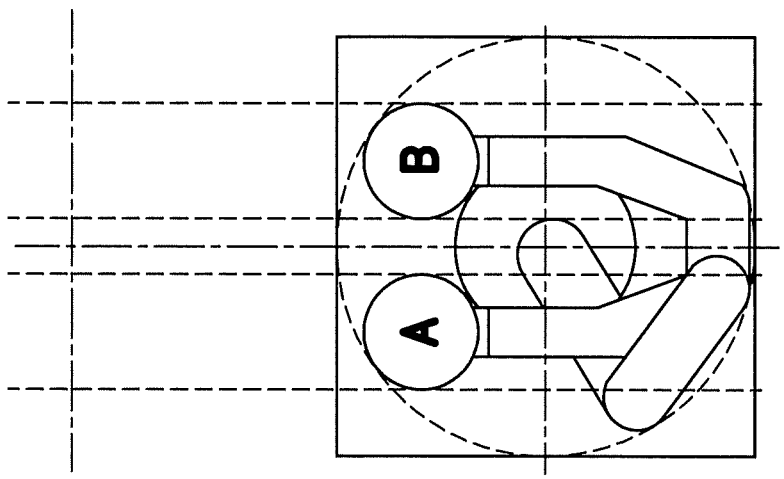
Figures 2, 15C:
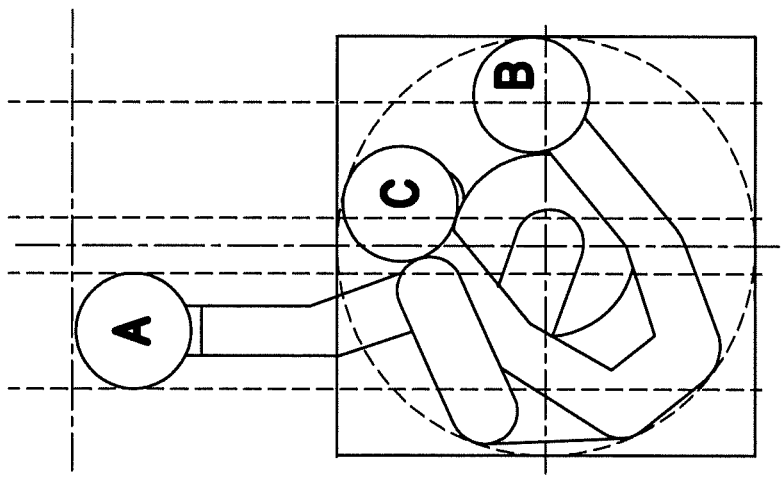
Figures 1, 15C:
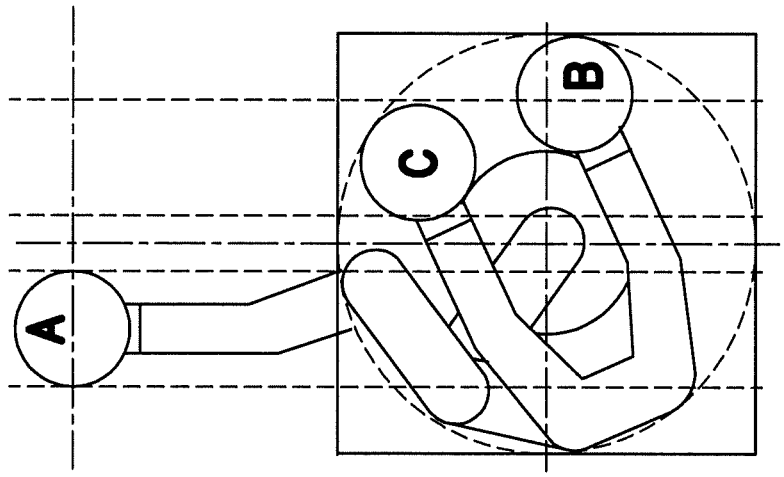
Figures 6, 15C:
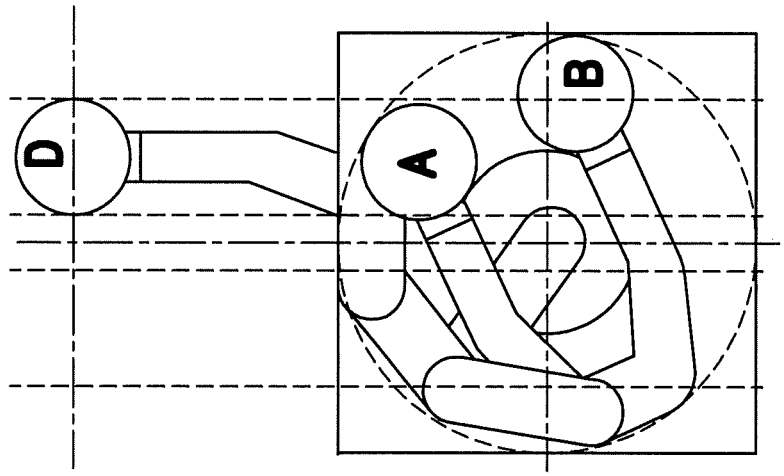
Figures 5, 15C:
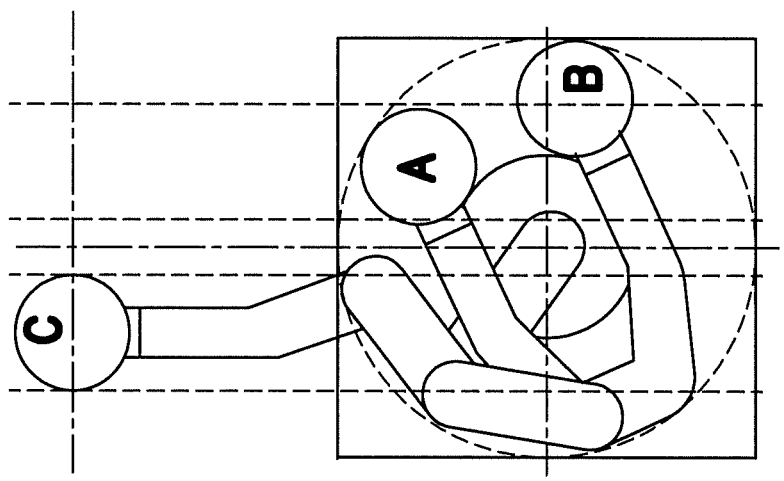
Figures 4, 15C:
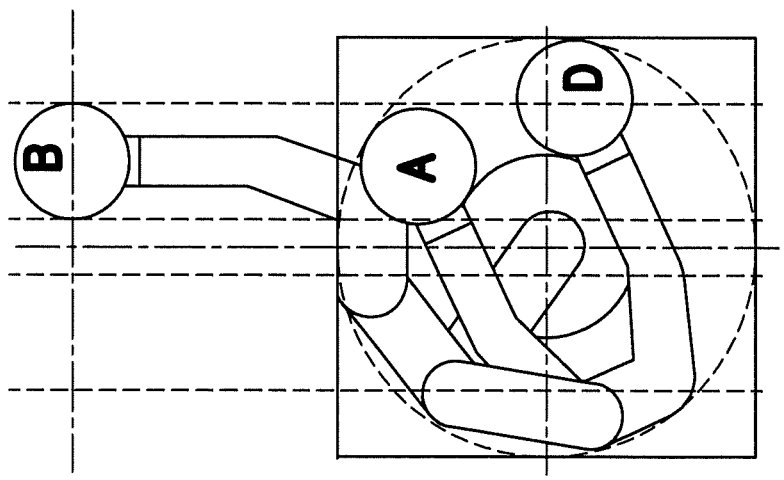
Figures 9, 15C:
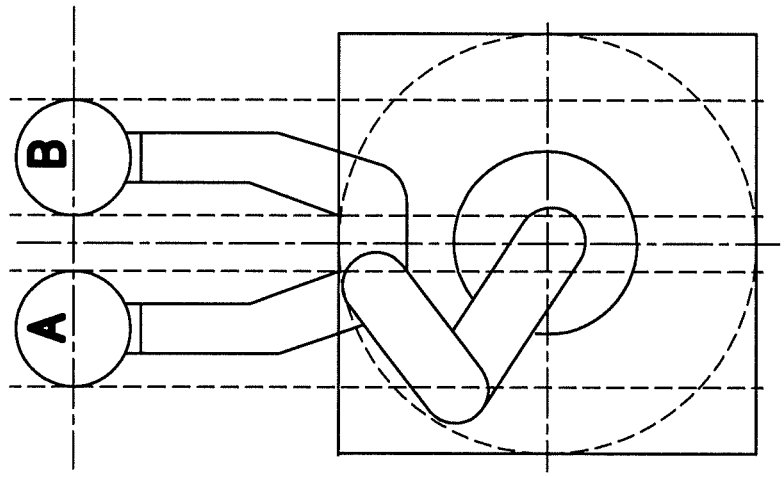
Figures 8, 15C:
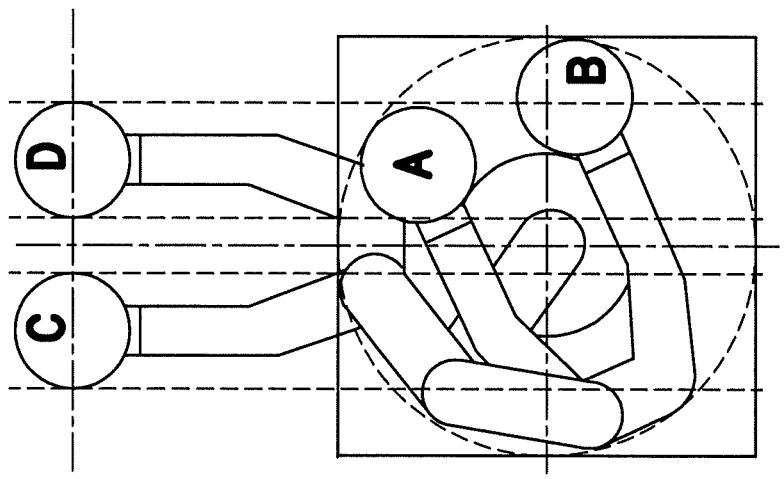
Figures 7, 15C:
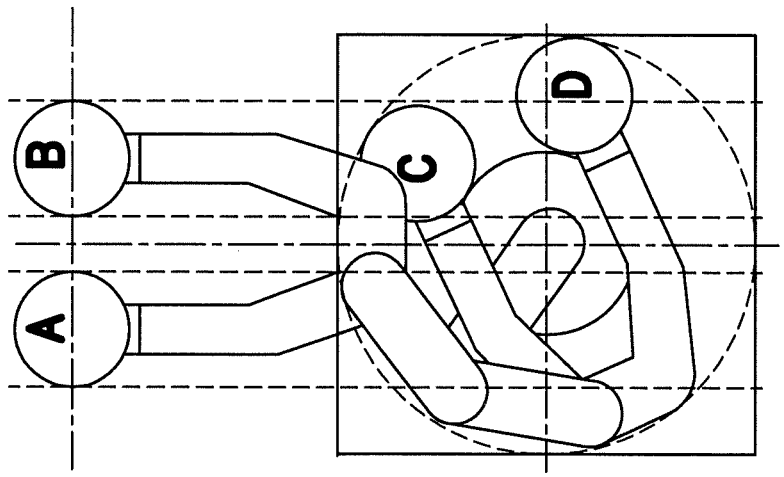

The operation of the robot of FIGS. 6A-6B is illustrated in FIGS. 6C-1 to 6C-7; collectively referred to as FIG. 6C. FIG. 6C-1 shows all end-effectors retracted. FIGS. 6O-2 to 6C-5 show end-effectors A, B, C and D, respectively, extended. FIG. 6C-6 shows end-effectors A and B extended simultaneously. FIG. 6C-7 shows end-effectors C and D extended simultaneously.

The robot may pick or place a single payload, such as a semiconductor wafer, by extending a single end-effector to a workstation according to the FIGS. 6O-1 to 6C-5. The robot can rapidly exchange a payload at a workstation by performing a sequence of a pick operation with one end-effector followed by a place operation with another end-effector.

The robot may pick or place a pair of payloads simultaneously by extending a pair of end-effectors to two workstations (or a single twin-type workstation) according to FIGS. 6C-6 to 6C-7. The robot can rapidly exchange a pair of payloads at a workstation (or a pair of workstations) by performing a sequence of a pick operation with one pair of end-effectors, for example, end-effectors A and B, followed by a place operation with another pair of end-effectors, for example, end-effectors C and D.

Another example robot with an alternative configuration of forearms and end-effectors is shown diagrammatically in FIGS. 7A-7B. In this example, the geometry of the arm has been selected so that the wrist joint associated with end-effector A does not pass over the payload on end-effector C and the wrist joint associated with end-effector B does not pass over the payload on end-effector D, thus reducing payload contamination risks. In FIGS. 7A-7B, similar to FIGS. 6A-6B, the arm assembly has a single bent upper arm 130 and multiple forearms 132, 134 attached to opposite ends of the upper arm 130. A center of the upper arm, at its bend 130c, is attached to a drive shaft of the drive unit 102 such that the drive shaft may rotate the upper arm at the bend.

Although end-effectors A and B are shown at different elevations in FIGS. 7A-7B, the upper wrist link 736 associated with end-effector A may be stepped down so that end-effectors A and B may be substantially at the same elevation (the location of the step should be selected so that end-effector B and its payload can pass under the upper wrist link 736 for end-effector A). Similarly, although end-effectors C and D are shown at different elevations in FIGS. 7A-7B, the lower wrist link 737 associated with end-effector D may be stepped down so that end-effectors C and D may be substantially at the same elevation.

The operation of the robot of FIGS. 7A-7B is illustrated in the diagrams of FIGS. 7C-1 to 7C-8. FIG. 7C-1 shows all end-effectors retracted. FIG. 7C-2 shows end-effector A partially extended, illustrating that the wrist joint associated with end-effector A does not pass over the payload on end-effector C. FIGS. 7C-3 to 7C-6 show end-effectors A, B, C and D, respectively, extended. FIG. 7C-7 shows end-effectors A and B extended simultaneously. FIG. 7C-8 shows end-effectors C and D extended simultaneously.

Figure 8A:
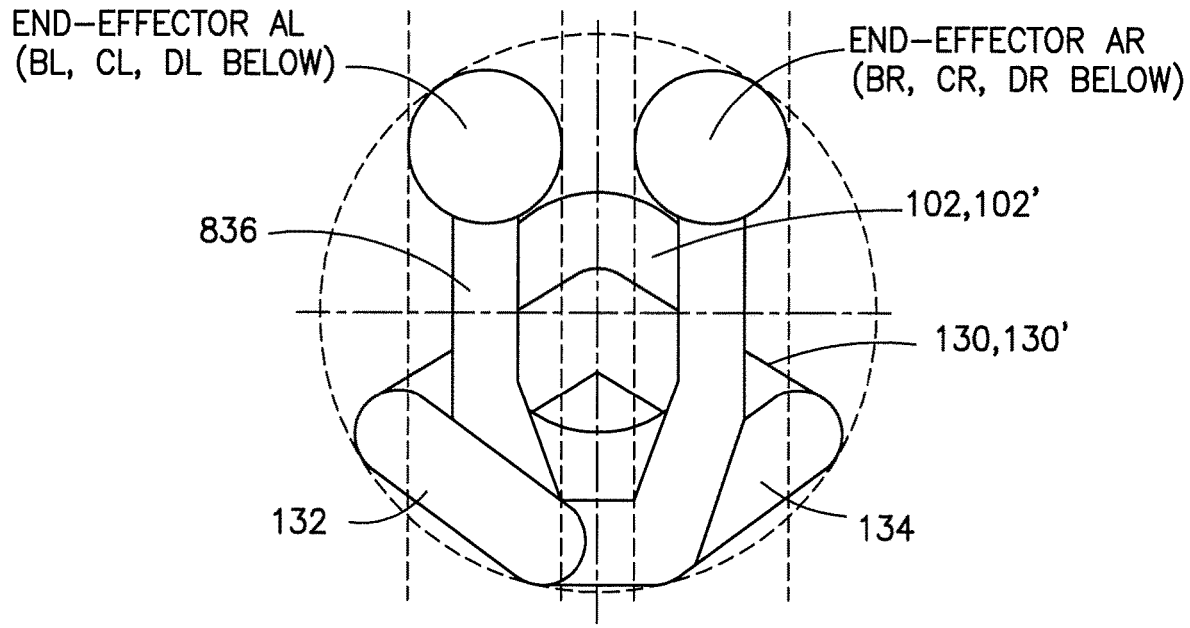
FIG. 8A is a top plan view of an example robot comprising features as described herein.
Figure 8B:
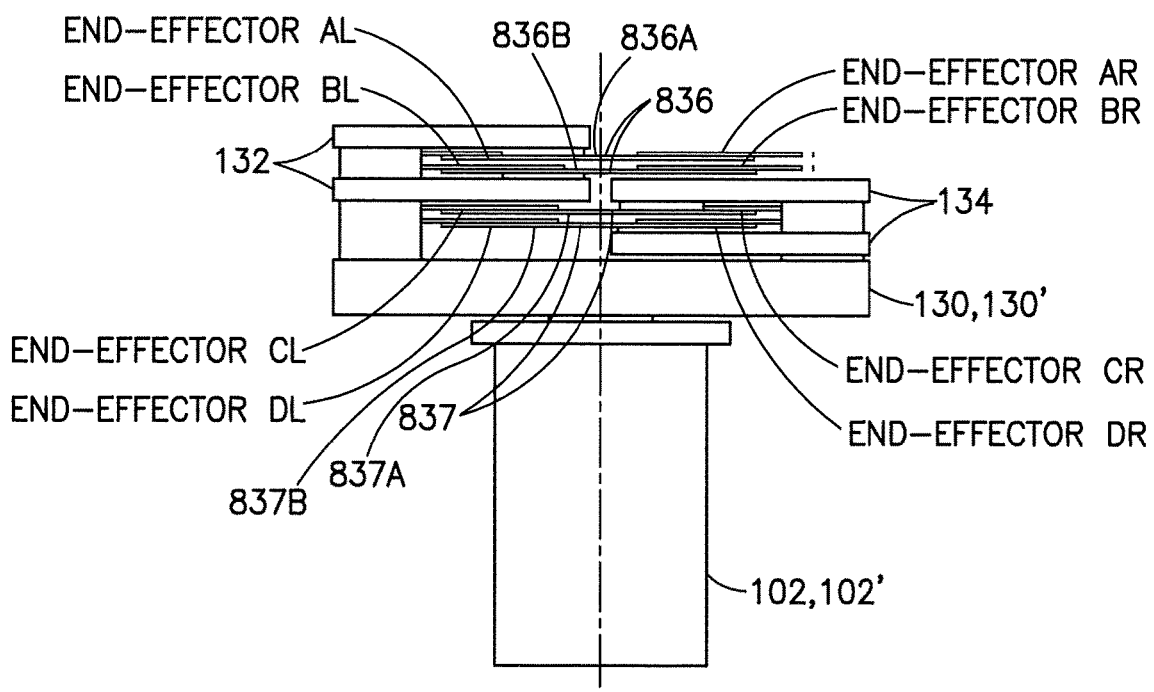
FIG. 8B is a side view of the robot shown in FIG. 8A.

Yet another example robot with an alternative configuration of end-effectors is shown diagrammatically in FIGS. 8A-8B. The robot may also utilize substantially the same example internal arrangements as described earlier with respect to FIGS. 2 and 3. In this example each wrist link 836, 837 has a generally U-shape or V-shape with two laterally spaced end-effectors. The upper left wrist link 836 has left end effector AL and right end-effector AR. The upper left wrist link 836 may be referred to as a first dual end effector 836A. The lower left wrist link 836 has left end-effector BL and right end-effector BR. The lower left wrist link 836 may be referred to as a second dual end effector 836B. The upper right wrist link 837 has left end-effector CL and right end-effector CR. The upper right wrist link 837 may be referred to as a third dual end effector 837A. The lower right wrist link 837 has left end-effector DL and right end-effector DR. The lower right wrist link 837 may be referred to as a fourth dual end effector 837B.

Figures 3, 8C:
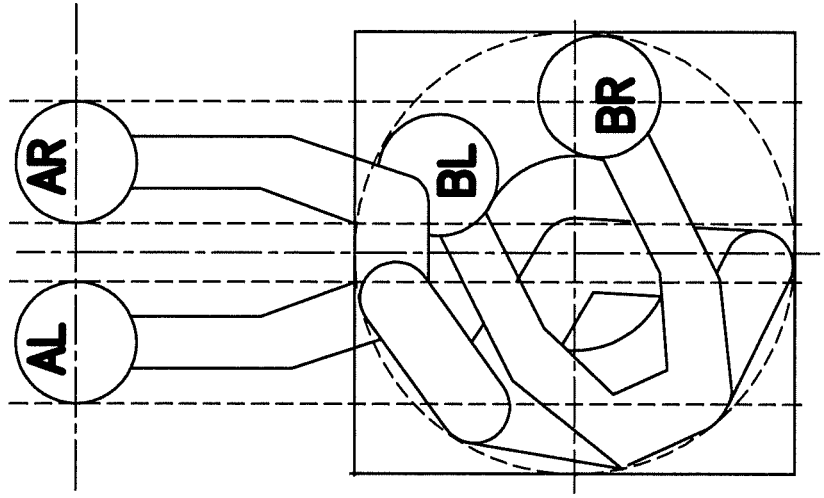
Figures 2, 8C:
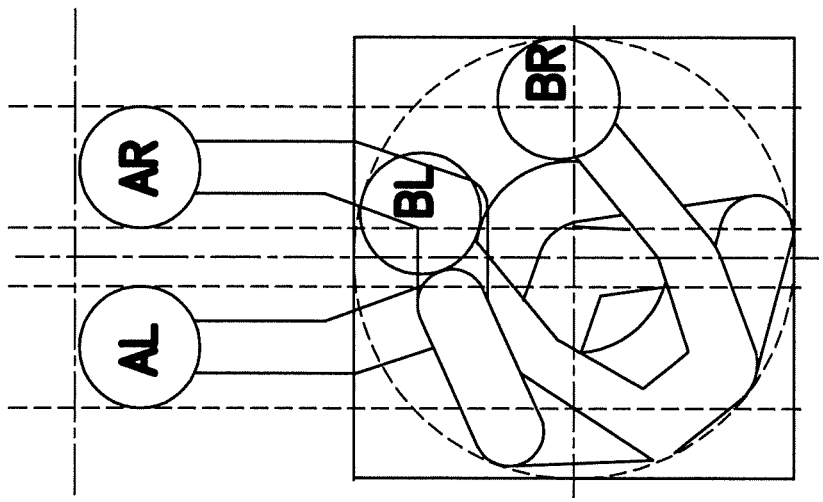
Figures 1, 8C:
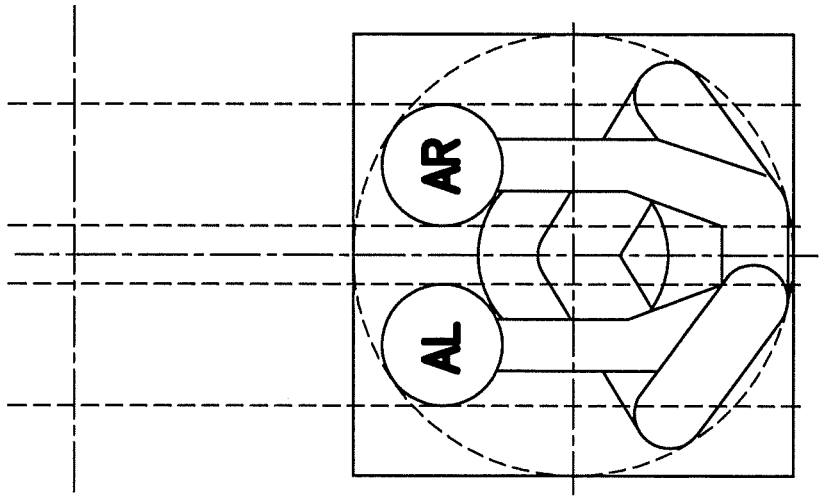
Figures 6, 8C:
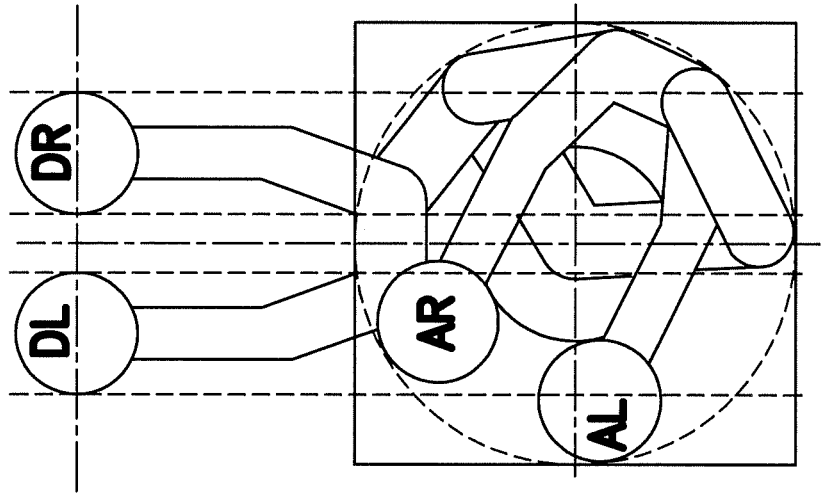
Figures 5, 8C:
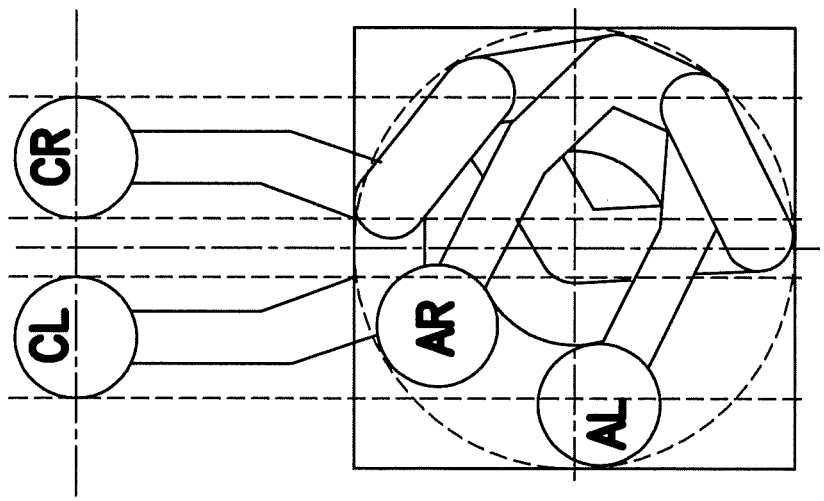
Figures 4, 8C:
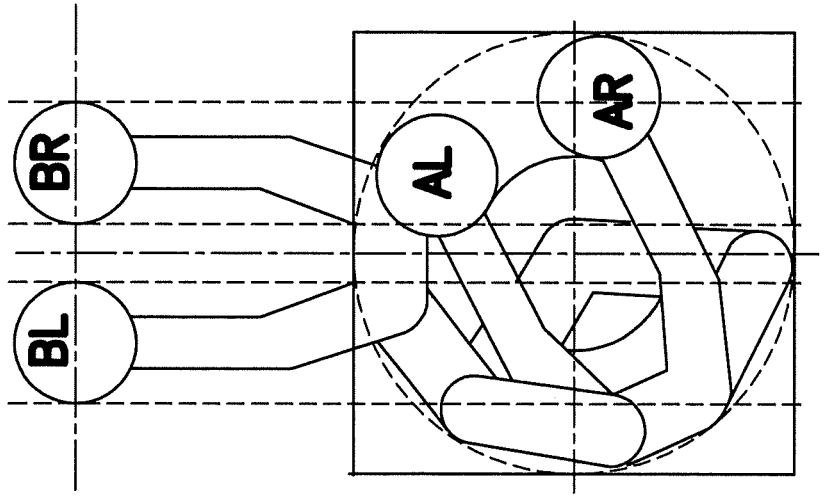

The operation of the robot of FIGS. 8A-8B is illustrated in FIGS. 8C-1 to 8C-8. FIG. 8C-1 shows all end-effectors retracted. FIG. 8C-2 shows end-effectors AL-AR partially extended, illustrating that the wrist joint associated with end-effectors AL-AR does not pass over the payload on end-effectors BL, CL and DL. FIGS. 8C-3 to 8C-show end-effectors AL-AR, BL-BR, CL-CR, and DL-DR, respectively, extended. FIG. 8C-7 shows end-effectors AL-AR and BL-BR extended simultaneously. FIG. 8C-8 shows end-effectors CL-CR and DL-DR extended simultaneously.

The robot may pick or place a pair of payloads, such as semiconductor wafers, by extending a pair of end-effectors to two workstations (or a single twin-type workstation) according to FIG. 8C-3 to 8C-6. The robot can rapidly exchange a pair of payloads at a pair of workstations by performing a sequence of a pick operation with one end-effector pair followed by a place operation with another end-effector pair.

The robot may pick or place four payloads simultaneously by extending four end-effectors to four workstations (or a pair of twin-type workstations) according to FIG. 8C-7 to 8C-8. The robot can rapidly exchange four payloads at four workstations by performing a sequence of a pick operation with one set of four end-effectors, for example, end-effectors AL-AR and BL-BR, followed by a place operation with another set of four end-effectors, for example, end-effectors CL-CR and DL-DR.

Figure 8D:
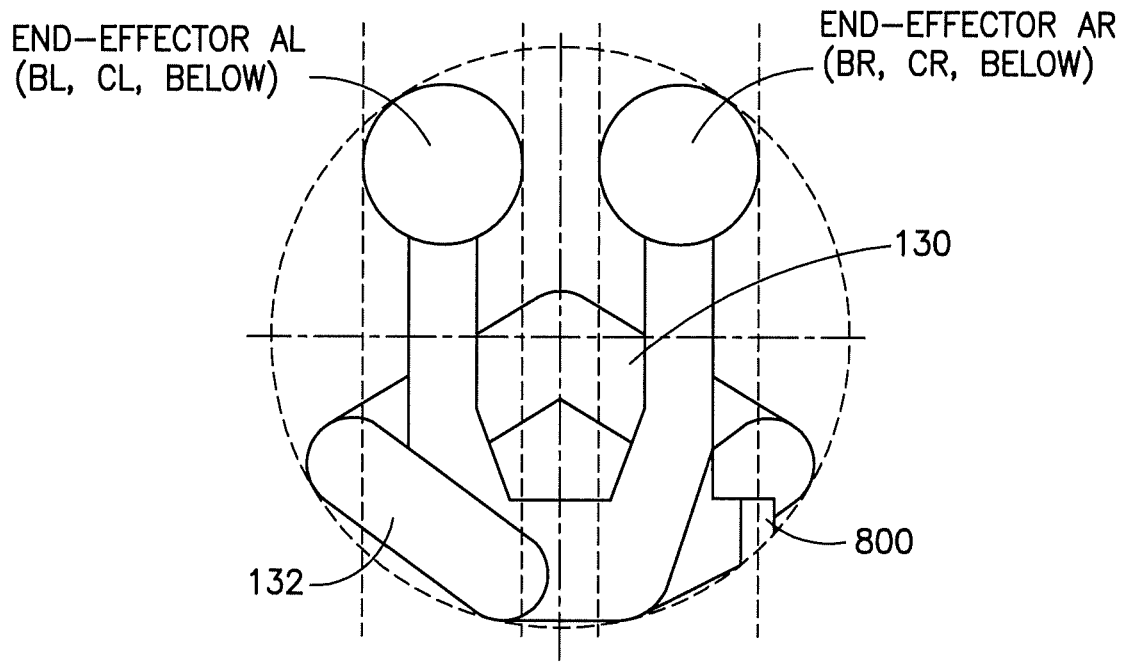
FIG. 8D is a top plan view of an example robot comprising features as described herein.
Figure 8E:
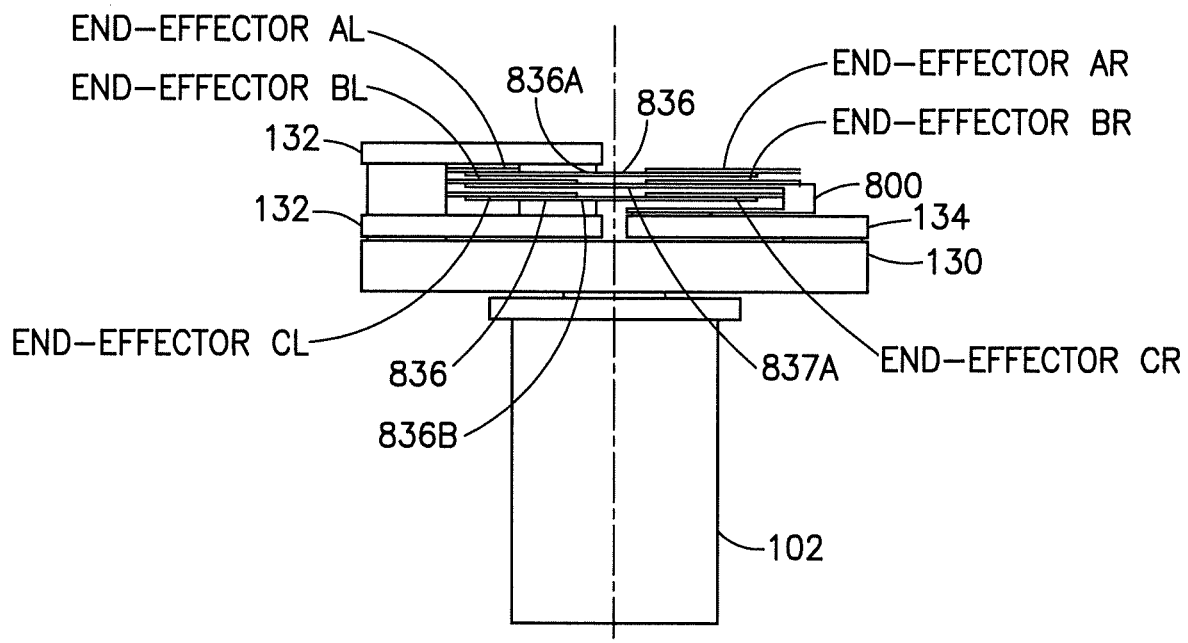
FIG. 8E is a side view of the robot shown in FIG. 8A.

An example robot with an alternative arrangement of the forearms and end-effectors is depicted diagrammatically in FIGS. 8D-8E. In this example, a bridge structure 800 may be utilized on one of the wrist links to achieve a compact and uniform vertical pitch between the three pairs of end-effectors shown in the figure. In this example two left side forearms 132 are provided and only one right side forearm 134 is provided. Each of the two left side forearms has a respective wrist link 836 connected thereto. The upper left wrist link 836 may be referred to as a first dual end effector 836A. The lower left wrist link 836 may be referred to as a second dual end effector 836B. The sole right side forearm has a single wrist link 837 connected thereto via the bridge 800. The sole right wrist link may be referred to as a third dual end effector 837A. In this example embodiment the third dual end effector 837 is carried on the right forearm having the bridge structure 800.

In FIGS. 8D-8E, similar to FIGS. 6A-6B, the arm assembly has a single bent upper arm 130 and multiple forearms attached to opposite ends of the upper arm. A center of the upper arm, at its bend, is attached to a drive shaft of the drive unit such that the drive shaft may rotate the upper arm at the bend. In this example, the drive unit 102, 102' may be of the similar to the configurations as shown in FIGS. 2 and 3 with either all the motors in the drive 102 or only some of the motors in the drive and some of the motors in the arm assembly.

In accordance with an example embodiment, such as that shown in FIGS. 8D-8E for example, an apparatus may be provide comprising: a drive unit; and an arm assembly connected to the drive unit, where the arm assembly comprises: an upper arm connected to a first drive shaft of the drive unit; a first set of forearms connected to a first end of the upper arm; a second set of forearms connected to a second end of the upper arm, where the second set has a different number of forearms than the first set; and a respective end effector connected to the forearms.

As illustrated with FIGS. 8D-8E the above described example embodiment may comprise the following features. The drive unit may comprise a first motor for rotating the first drive shaft and the arm assembly comprises motors for rotating the forearms. The drive unit may comprise a first motor for rotating the first drive shaft and additional motors for rotating the forearms, where the drive unit comprises coaxial drive shafts including the first drive shaft. The upper arm may comprise a general V-shape or U-shape with a center of the upper arm connected to the first drive shaft. The first set of forearms may comprise a first number N of the forearms and the second set of forearms comprises a second number N−1 of the forearms. The first set of forearms may have two forearms and the second set of forearms has one forearm. The second set of forearms may comprise a bridge structure. The arm assembly may comprise an odd number of end effectors. The arm assembly may comprise only three end effectors. The end effectors may be dual end-effectors having side-by-side spaced substrate support areas. At least one of the end effectors may be a dual end-effector having side-by-side spaced substrate support areas, and at least one of the forearms may be connected to the dual end-effector at an off-center location of the dual end effector. A first one of the end effectors may be connected to the second set of forearms located in a first horizontal plane between second and third horizontal planes of two of the end effectors connected to the first set of forearms.

An example method may be provided comprising: connecting a first set of forearms to a first end of an upper arm; connecting a second set of forearms to an opposite second end of the upper arm, where the first set of forearms has a different number of the forearms than the second set of forearms; connecting respective end effectors to the forearms, where the end effectors are an odd number, where the second set of forearms comprises a first forearm comprising a bridge structure such that a first end effector on the second set of forearms is configured to move between second and third end effectors of the first set of forearms, and such that the first end effector is configured to move between the first end effector and a portion of the first forearm.

An example embodiment may be provided with an apparatus comprising: a drive unit; and an arm assembly connected to the drive unit, where the arm assembly comprises: an upper arm connected to a first drive shaft of the drive unit; a first set of forearms connected to a first end of the upper arm; a second set of forearms connected to an opposite second end of the upper arm, where the second set has a different number of forearms than the first set, where the second set of forearms comprises a bridge structure; and a respective end effector connected to the forearms, where the first set of forearms comprises a first number N of the forearms and the second set of forearms comprises a second number N−1 of the forearms, and where the arm assembly comprises an odd number of end effectors.

The drive unit may comprise a first motor for rotating the first drive shaft and the arm assembly comprises motors for rotating the forearms. The drive unit may comprise a first motor for rotating the first drive shaft and additional motors for rotating the forearms, where the drive unit comprises coaxial drive shafts including the first drive shaft. The upper arm may comprise a general V-shape or U-shape with a center of the upper arm connected to the first drive shaft. The first set of forearms may have two forearms and the second set of forearms may have only one forearm. The arm assembly may comprise only three end effectors. At least one of the end effectors may be a dual end-effector having side-by-side spaced substrate support areas, and at least one of the forearms may be connected to the dual end-effector at an off-center location of the dual end effector. A first one of the end effectors may be connected to the second set of forearms located in a first horizontal plane between second and third horizontal planes of two of the end effectors connected to the first set of forearms.

In accordance with another example embodiment, an example method may comprise rotating an upper arm in a first direction to extend two first forearms connected to a first end of the upper arm, where respective end effectors are connected to the two first forearms; and rotating the upper arm in an opposite second direction to extend a second forearm connected to an opposite second end of the upper arm, where a respective end effector is connected to the second forearm, and where the number of forearms connected to the first end of the upper arm is different from the number of forearms connected to the second end of the upper arm.

In accordance with another example embodiment, an apparatus may be provided comprising a non-transitory program storage device readable by a machine, tangibly embodying a program of instructions executable by the machine for performing operations, the operations comprising: causing rotating of an upper arm in a first direction to extend two first forearms connected to a first end of the upper arm, where respective end effectors are connected to the two first forearms; and causing rotating of the upper arm in an opposite second direction to extend a second forearm connected to an opposite second end of the upper arm, where a respective end effector is connected to the second forearm, and where the number of forearms connected to the first end of the upper arm is different from the number of forearms connected to the second end of the upper arm. The apparatus may also cause rotating of the end effectors on the forearms by motors in either the forearms or in the drive unit.

An alternative example internal arrangement to that of FIG. 3 is provided in the diagram of FIG. 9. Utilizing this example internal arrangement, the robot of FIGS. 6A-6B may feature additional motors 119 on the upper arm link 103" and, therefore, two additional degrees of freedom, for instance, the orientation of the wrist link associated with end-effector B and the orientation of the wrist link associated with end-effector C.

The additional degree of freedom associated with end-effector B may allow the robot of FIGS. 6A-6B to position end-effectors A and B independently in a horizontal plane and, as an example, to place two payloads simultaneously to two independently adjusted locations. In other words, end-effector A can be used to place a payload to a location defined by coordinates xA, yA, and end-effector B can be used to place another payload simultaneously to a location defined by coordinates xB, yB. Such an operation requires four degrees of freedom, which can be facilitated via independent control of the orientation of the upper arm, orientation of forearm A, orientation of forearm B and orientation of wrist link B.

Similarly, the additional degree of freedom associated with end-effector C may allow the robot of FIGS. 6A-6B to position end-effectors C and D independently in a horizontal plane and, as an example, to place two payloads simultaneously to two independently adjusted locations. In other words, end-effector C can be used to place a payload to a location defined by coordinates xC, yC, and end-effector D can be used to place another payload simultaneously to a location defined by coordinates xD, yD. Such an operation requires four degrees of freedom, which can be facilitated via independent control of the orientation of the upper arm, orientation of forearm C, orientation of wrist link C and orientation of forearm D.

The ability of the robot to place simultaneously two payloads to independently adjusted locations may be conveniently utilized in an adaptive placement scheme, such as, for example, as described in U.S. Pat. Nos. 9,196,518, 9,548,231 and 9,842,757 which are hereby incorporated by reference in their entireties. A simultaneous placement operation enabled by the additional degrees of freedom may result in a higher a throughput when compared to a sequential placement mode of operation, which would be necessary in the absence of the additional degrees of freedom.

Similarly to the robot of FIGS. 6A-6B, the robot of FIGS. 7A-7B may also utilize the example internal arrangement of FIG. 9 and benefit from two additional degrees of freedom, for instance, the orientation of the wrist link associated with end-effector A and the orientation of the wrist link associated with end-effector D.

The additional degree of freedom associated with end-effector A may allow the robot of FIGS. 7A-7B to position end-effectors A and B independently in a horizontal plane and, as an example, place two payloads simultaneously to two independently adjusted locations. Similarly, the additional degree of freedom associated with end-effector D may allow the robot of FIGS. 7A-7B to position end-effectors C and D independently in a horizontal plane and, as an example, place two payloads simultaneously to two independently adjusted locations using these end-effectors.

Figure 10A:
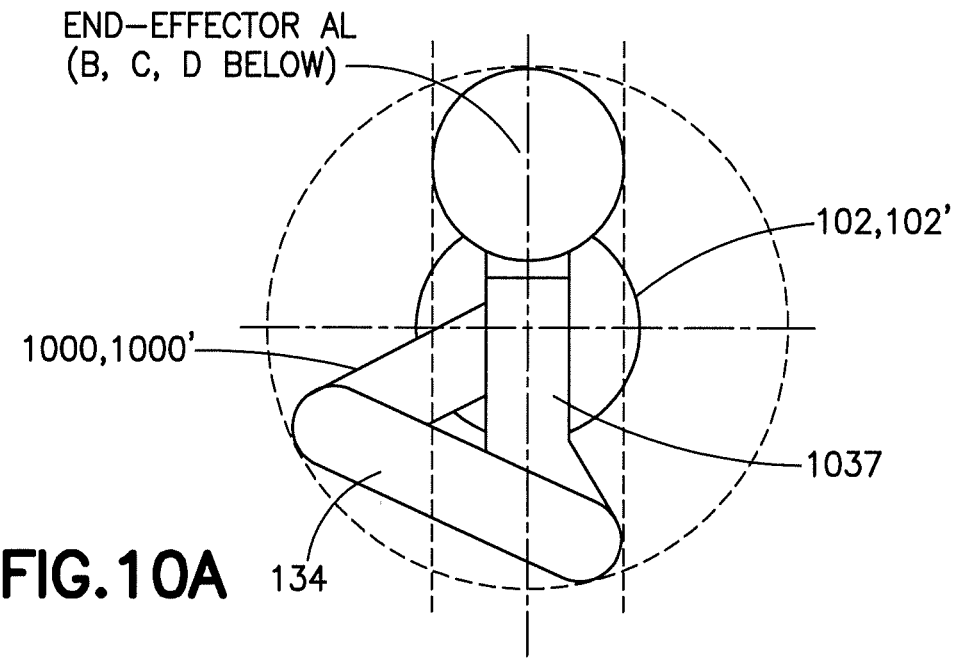
FIG. 10A is a top plan view of a robot comprising features as described herein.
Figure 10B:
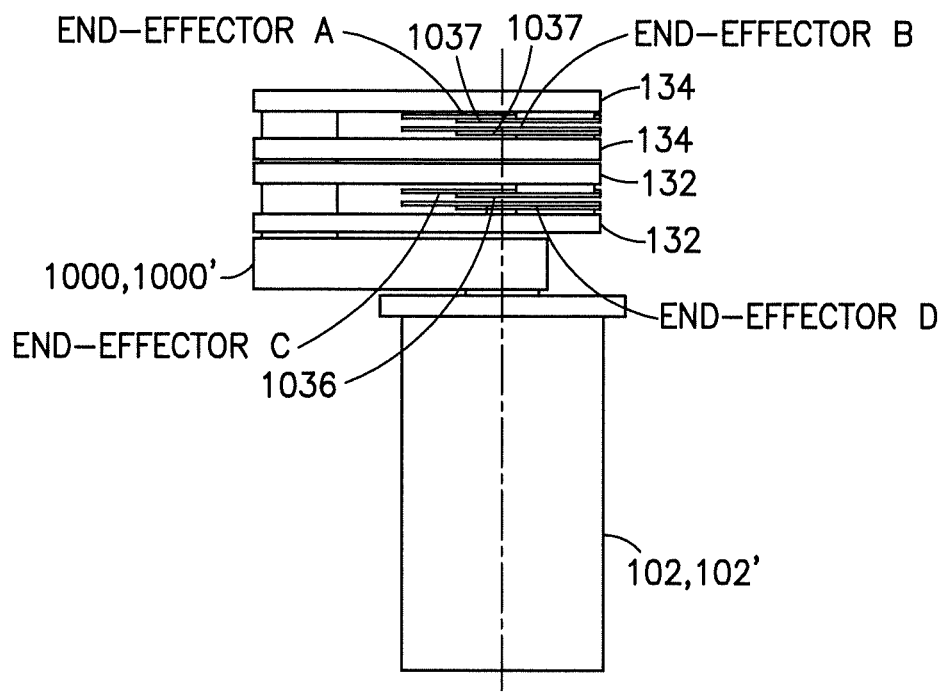
FIG. 10B is a side view of the robot shown in FIG. 10A.

Another example embodiment of the robot according to the present invention is depicted diagrammatically in FIGS. 10A-10B, which shows the robot with the forearms folded in the retracted position. A simplified cross-sectional view showing an example internal arrangement of the robot of FIGS. 10A-10B is provided in a diagrammatic form in FIG. 11, which shows the robot with some of the forearms unfolded for clarity of depiction. The two forearms link 134 each have a respective wrist link 1037. The two forearm links 132 each have a respective wrist link 1036.

Figure 11:
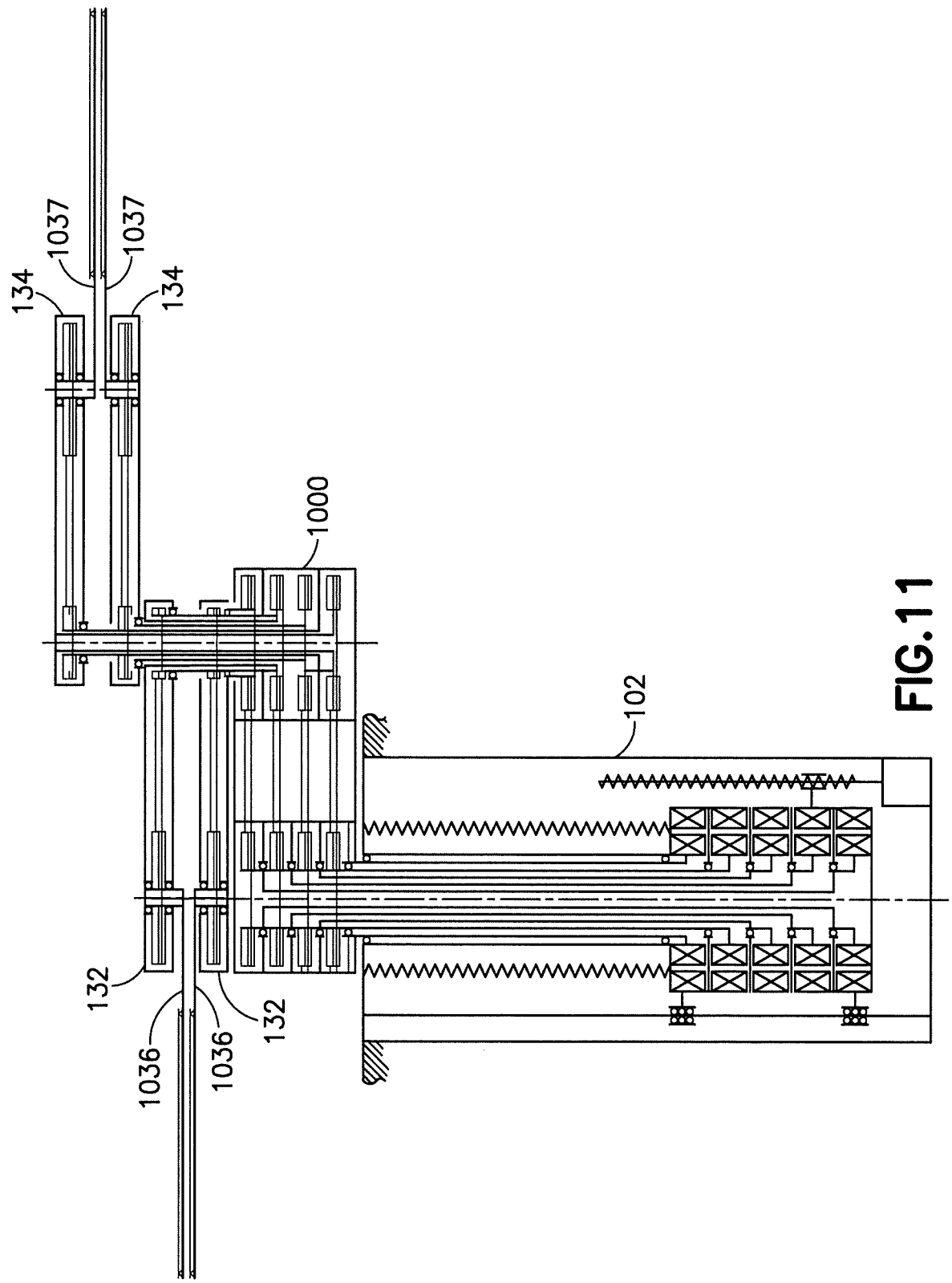
FIG. 11 is a cross sectional view of the robot shown in FIGS. 10A-10B.

As indicated in FIG. 11, the drive unit 102 may be the same as that of FIG. 2. The robot arm may consist of an upper arm link 1000, a plurality of forearm links 132, 134, each of them coupled to the upper arm link 1000 via a rotary joint, and a plurality of wrist links 1036, 1037, each of them coupled to one of the forearm links via a rotary joint. Each of the wrist links may feature an end-effector configured to carry a payload, such as a semiconductor wafer. In the example of FIGS. 10A, 10B and 11, four forearm links and four wrist links are shown.

As depicted in FIGS. 10A, 10B and 11, the joint-to-joint length of the forearm links may be longer than the joint-to-joint length of the upper arm link. Alternatively, the joint-to-joint length of the forearm links may be the same as or shorter than the joint-to-joint length of the upper arm link. Furthermore, the forearm links may be of different joint-to-joint lengths, including joint-to-joint lengths that are shorter than, equal to and longer than the joint-to-joint length of the upper arm link.

As indicated in FIGS. 10A-10B, the wrist links of the robot arm may be configured so that the end-effectors are stacked on top of each other when the robot arm is in its retracted position.

As indicated in FIG. 11, the upper arm link may be connected to the outer drive shaft of the drive unit. Each of the forearms, which may be coupled to the upper arm via a rotary joint as explained earlier, may be actuated by one of the inner shafts of the drive unit using a transmission arrangement. The transmission arrangement may comprise a shoulder pulley, which may be attached to the drive shaft, an elbow pulley, which may be attached to the forearm link, and a band, belt or cable, which may transmit motion between the two pulleys.

Each of the wrist links, which may be coupled to the corresponding forearm link via a rotary joint as explained earlier, may be constrained by another transmission arrangement. The transmission arrangement may comprise an elbow pulley, which may be attached to the upper arm link, a wrist pulley, which may be attached to the wrist link, and a band, belt or cable, which may transmit motion between the two pulleys. The transmission arrangement may be configured to constrain the end-effector so that it points in the radial direction with respect to the axis of rotation of the upper arm link regardless of the positions (orientations) of the upper arm link and the corresponding forearm link of the robot arm.

For example, if the joint-to-joint length of the forearm link is equal to the joint-to-joint length of the upper arm link, in order for the end-effector to maintain radial orientation, the effective diameter of the wrist pulley may be twice the effective diameter of the elbow pulley. If the joint-to-joint length of the forearm link is not equal to the joint-to-joint length of the upper arm link, at least one of the pulleys, such as the wrist pulley, may feature a non-circular profile to provide the desired position-dependent transmission ratio to maintain radial orientation of the end-effector.

Figure 12A:
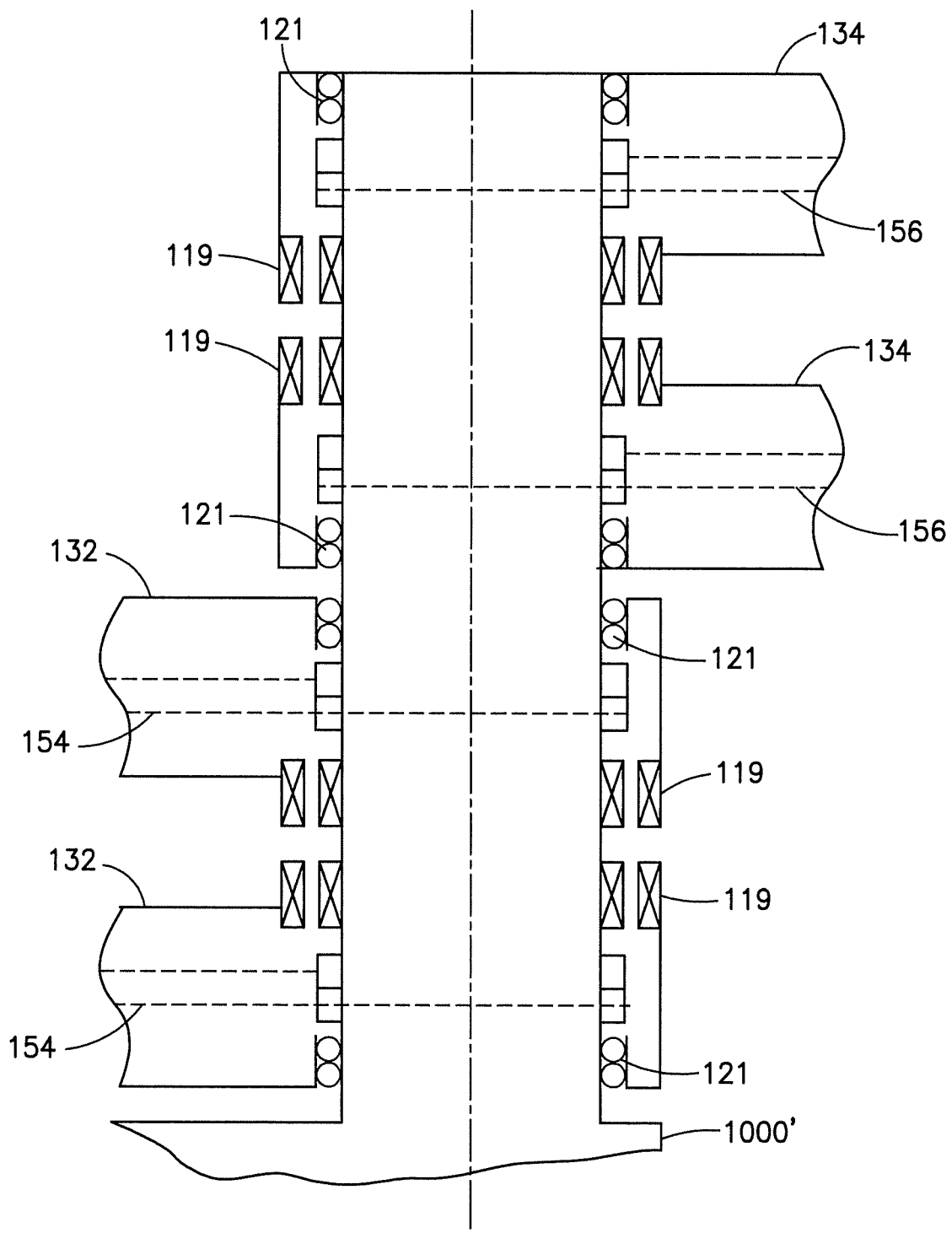
FIG. 12A is an enlarged view of a portion of the robot shown in FIG. 12.

Another example internal arrangement of the robot of FIGS. 10A, 10B and 11 is depicted diagrammatically in FIGS. 12 and 12A. In this example, the drive unit 102' may be of the same configuration as that of FIG. 3. As indicated in FIGS. 12 and 12A, the forearms 132, 134 on the upper arm 1000' of the robot arm may be actuated directly by motors 119 located at the elbow of the robot arm. In the particular example of FIGS. 12 and 12A, the motors 119 are shown in an external-rotor configuration.

Figure 13C:
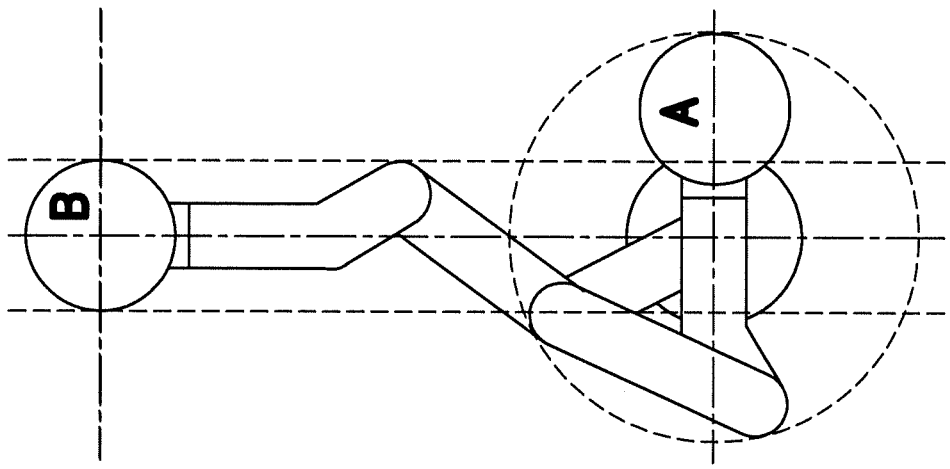
Figure 13B:
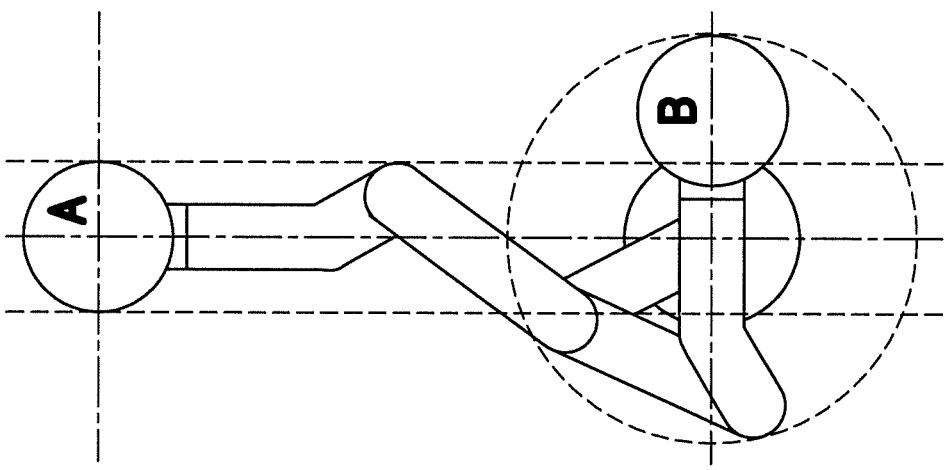
Figure 13A:
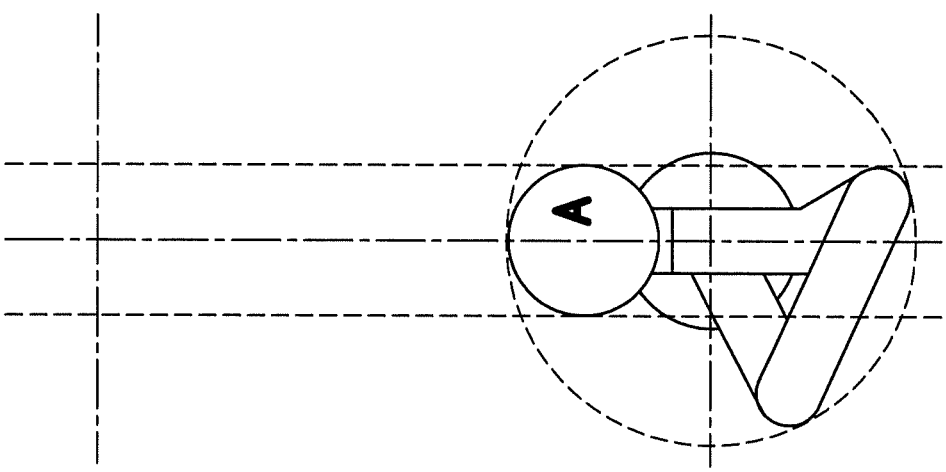
Figure 13G:
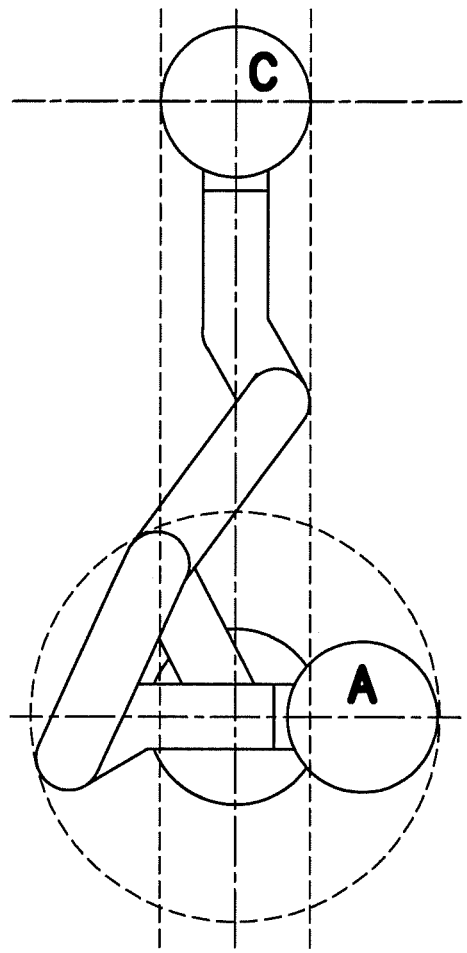
Figure 13H:
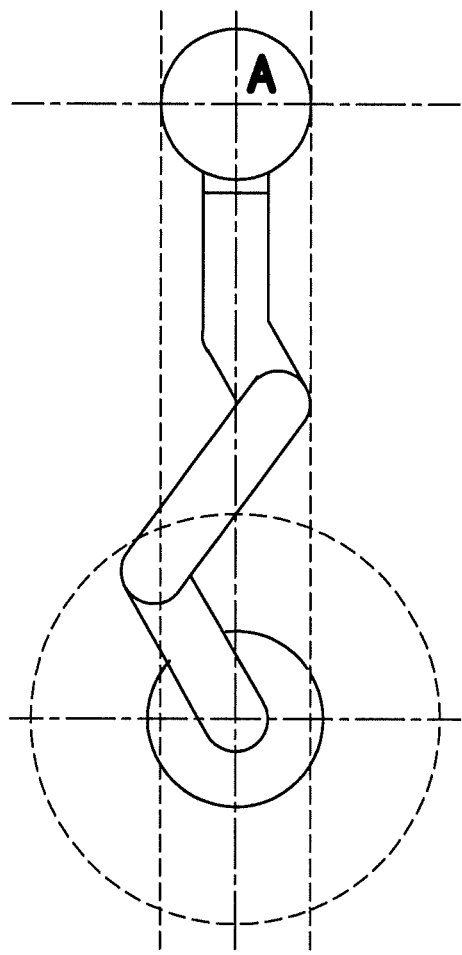

The operation of the robot of FIGS. 10A-10B is illustrated in FIGS. 13A-13H. FIG. 13A shows all end-effectors retracted. FIGS. 13B-13E show end-effectors A, B, C and D, respectively, extended. FIG. 13F shows end-effectors A and B extended simultaneously. FIG. 13G shows end-effectors C and D extended simultaneously. FIG. 13H shows all end-effectors, i.e., end-effectors A, B, C and D, extended.

The robot may pick or place a single payload, such as a semiconductor wafer, by extending a single end-effector to a workstation according to FIGS. 13B-13E. The robot can rapidly exchange a payload at a workstation by performing a sequence of a pick operation with one end-effector followed by a place operation with another end-effector.

The robot may pick or place a pair of payloads simultaneously by extending a pair of end-effectors to two workstations (or a single two-shelf workstation) according to FIGS. 13F-13G. The robot can rapidly exchange a pair of payloads at a workstation (or a pair of workstations) by performing a sequence of a pick operation with one pair of end-effectors, for example, end-effectors A and B, followed by a place operation with another pair of end-effectors, for example, end-effector C and D.

The robot may also pick or place four payloads simultaneously by extending all end-effectors to four workstations (or a single four-shelf workstation) according to FIG. 13H.

Figure 14A:
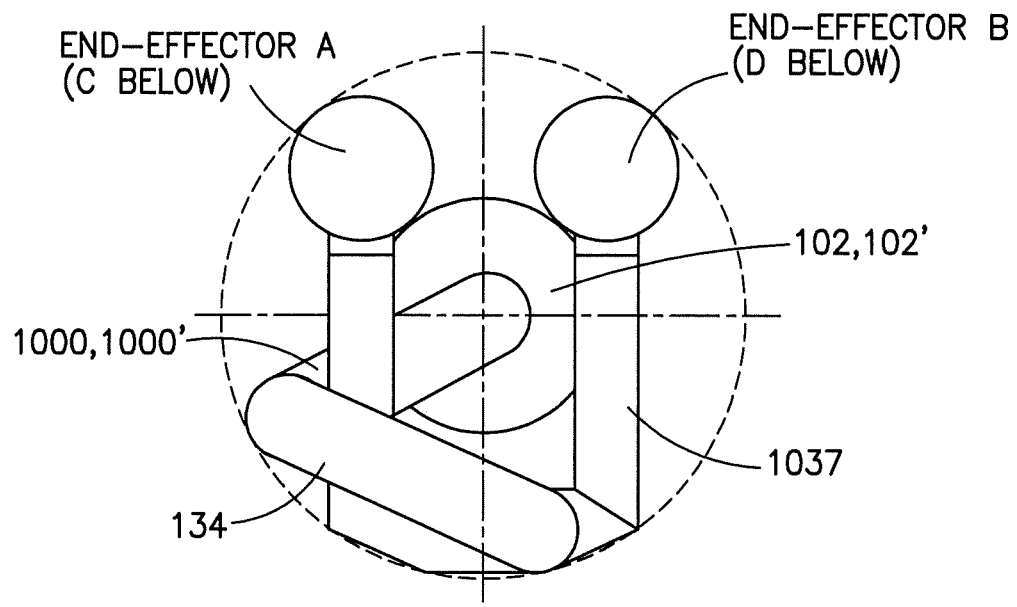
FIG. 14A is a top plan view of an example robot comprising features as described herein.
Figure 14B:
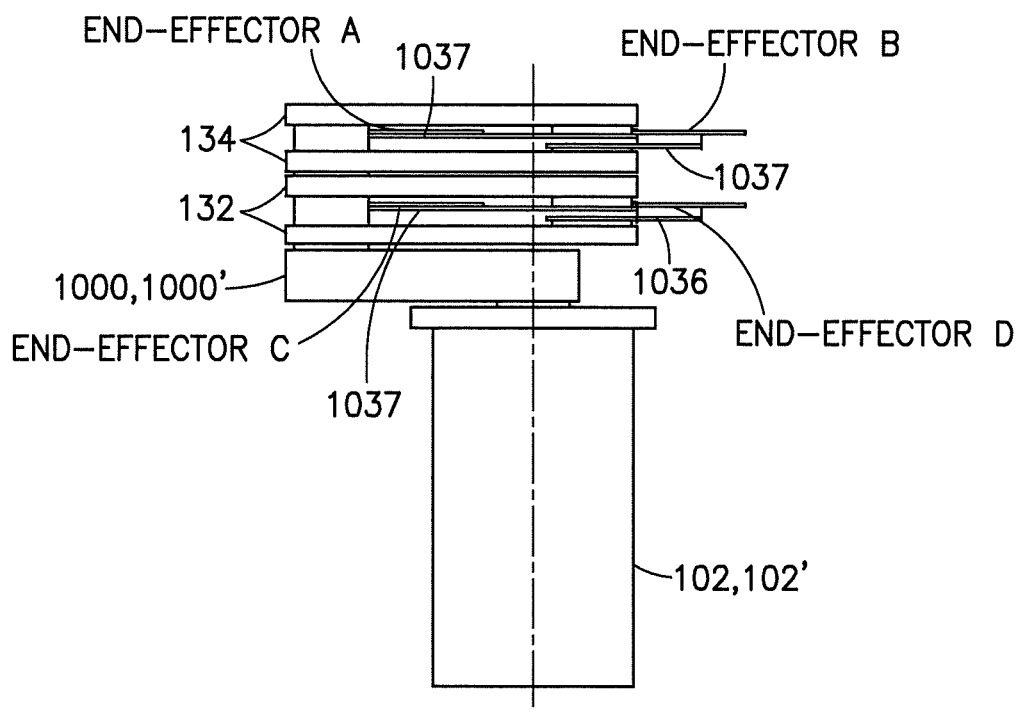
FIG. 14B is a side view of the robot shown in FIG. 14A.

Another example robot with an alternative configuration of end-effectors is shown diagrammatically in FIGS. 14A-14B. In this example, end-effectors A and B may be arranged in a side-by-side manner, and the wrist link associated with end-effector B may be stepped up so that end-effectors A and B may be substantially at the same elevation. This is possible because the geometry of the robot arm has been selected so that end-effector B can pass by end-effector A when end-effector B extends. Similarly, end-effectors C and D may be arranged in a side-by-side manner, and the wrist link associated with end-effector D may be stepped up so that end-effectors C and D may be substantially at the same elevation. In FIGS. 14A-14B, the arm assembly has a single straight upper arm, such as 1000 or 1000' for example, and multiple forearms 132, 134 attached to a distal end of the upper arm. A proximal end of the upper arm is attached to a drive shaft of the drive unit, such as 102 or 102' for example, such that the drive shaft may rotate the upper arm at the proximal end.

The robot of FIGS. 14A-14B may utilize the same example internal arrangements as described earlier with respect to FIGS. 11 and 12.

Figures 5, 7C:
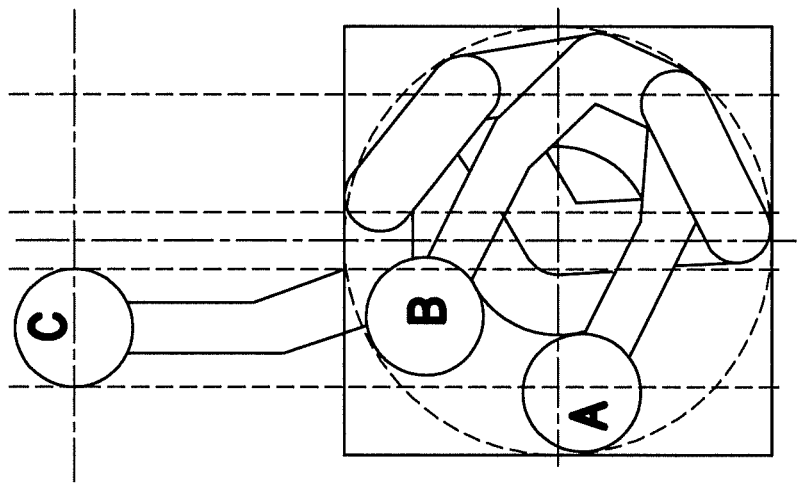
Figures 4, 7C:
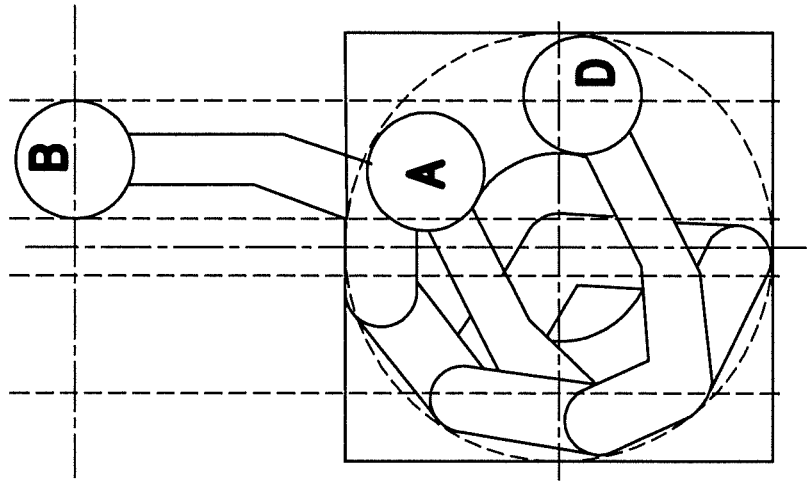
Figures 3, 14C:
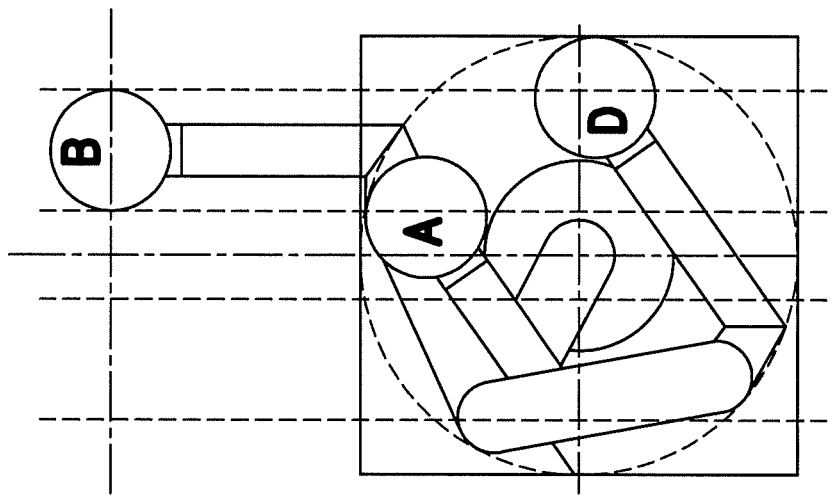
Figures 2, 14C:
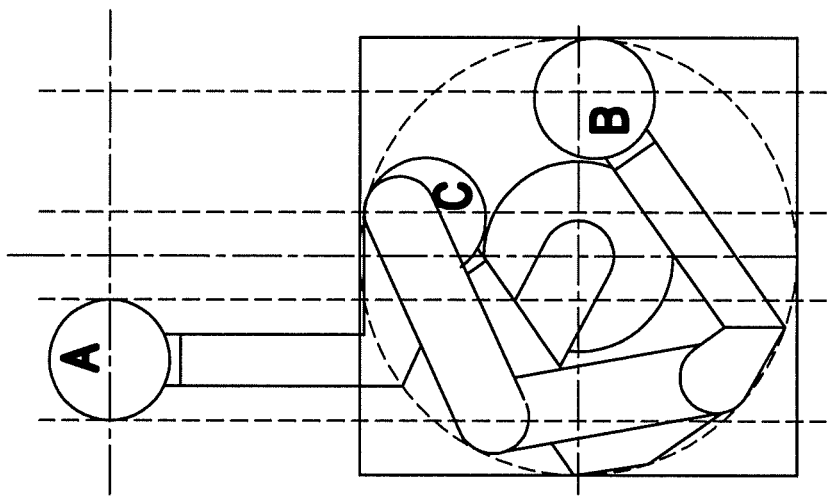
Figures 1, 14C:
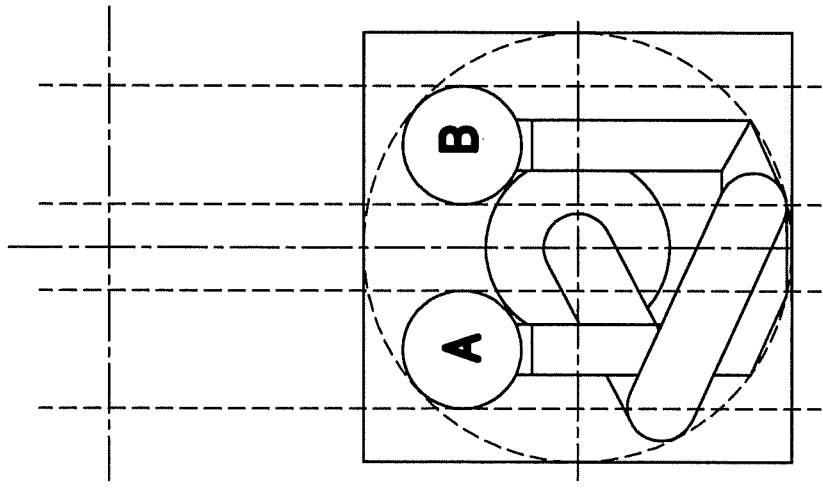
Figures 6, 14C:
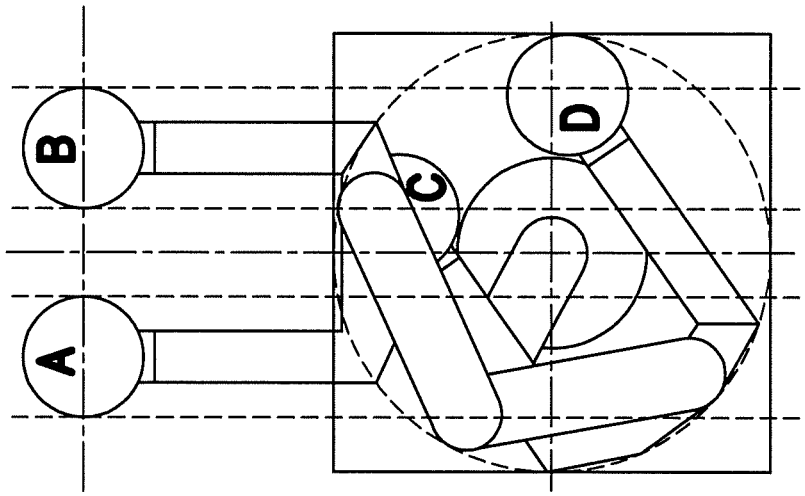
Figures 5, 14C:
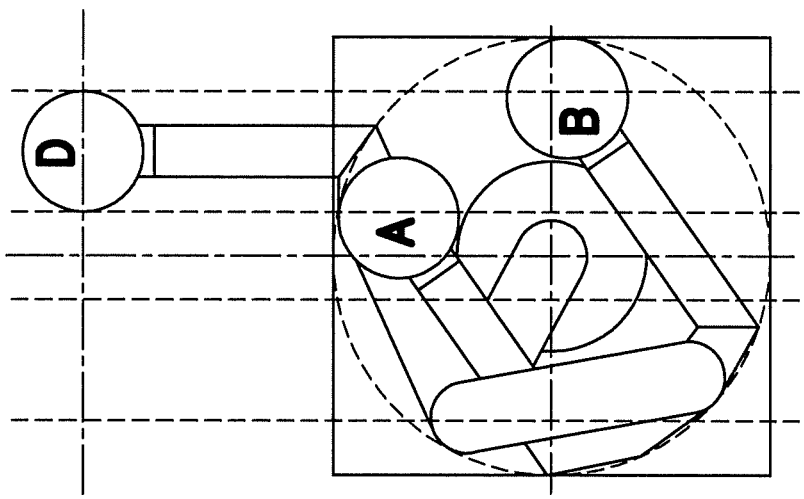
Figures 4, 14C:
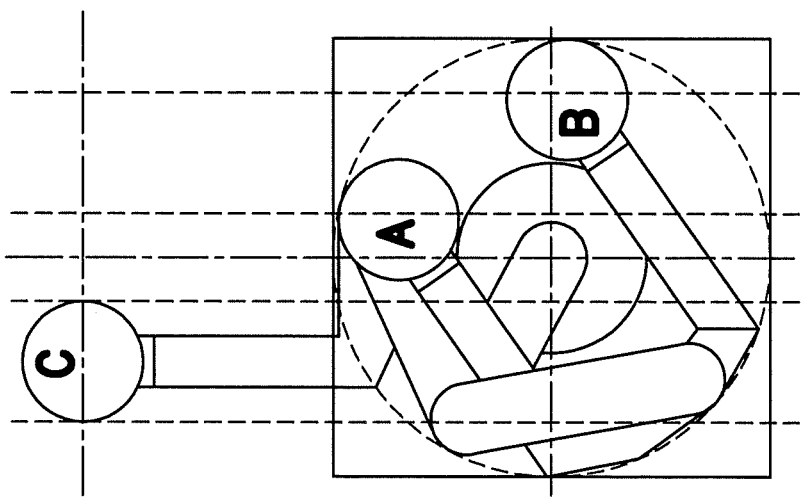

The operation of the robot of FIGS. 14A-14B is illustrated in FIGS. 14C-1 to 14C-8. FIG. 14C-1 shows all end-effectors retracted. FIG. 14C-2 to 14C-5 show end-effectors A, B, C and D, respectively, extended. FIG. 14C-shows end-effectors A and B extended simultaneously. FIG. 14C-7 shows end-effectors C and D extended simultaneously. FIG. 14C-8 shows all end-effectors, i.e., end-effectors A, B, C and D, extended.

The robot may pick or place a single payload, such as a semiconductor wafer, by extending a single end-effector to a workstation according to FIG. 14C-2 to 14C-5. The robot can rapidly exchange a payload at a workstation by performing a sequence of a pick operation with one end-effector followed by a place operation with another end-effector.

The robot may pick or place a pair of payloads simultaneously by extending a pair of end-effectors to two workstations (or a single twin-type workstation) according to FIG. 14C-6 to 14C-7. The robot can rapidly exchange a pair of payloads at a workstation (or a pair of workstations) by performing a sequence of a pick operation with one pair of end-effectors, for example, end-effectors A and B, followed by a place operation with another pair of end-effectors, for example, end-effector C and D.

The robot may also pick or place four payloads simultaneously by extending all end-effectors to four workstations (or a pair of stacked twin-type workstations or a single two-shelf twin-type workstation) according to FIG. 14C-8.

Although FIGS. 14A-14B show the wrist links associated with end-effectors B and D stepped up, wrist links associated with end-effectors A and C may be stepped down instead. Alternatively, any suitable combination of upward and downward elevation adjustment of the wrist links may be used.

Another example robot with an alternative configuration of forearms and end-effectors is shown diagrammatically in FIGS. 15A-15B. In this example, the geometry of the arm has been selected so that the wrist joint associated with end-effector A does not pass over the payload on end-effector C; thus reducing payload contamination risks.

The operation of the robot of FIGS. 15A-15B is illustrated in FIGS. 15C-1 to 15C-9. FIG. 15C-1 shows all end-effectors retracted. FIG. 15C-2 shows end-effector A partially extended, illustrating that the wrist joint associated with end-effector A does not pass over the payload on end-effector C. FIGS. 15C-3 to 15C-6 show end-effectors A, B, C and D, respectively, extended. FIG. 15C-shows end-effectors A and B extended simultaneously. FIG. 15C-8 shows end-effectors C and D extended simultaneously. FIG. 15C-9 shows all end-effectors, i.e., end-effectors A, B, C and D, extended simultaneously.

Figure 16A:
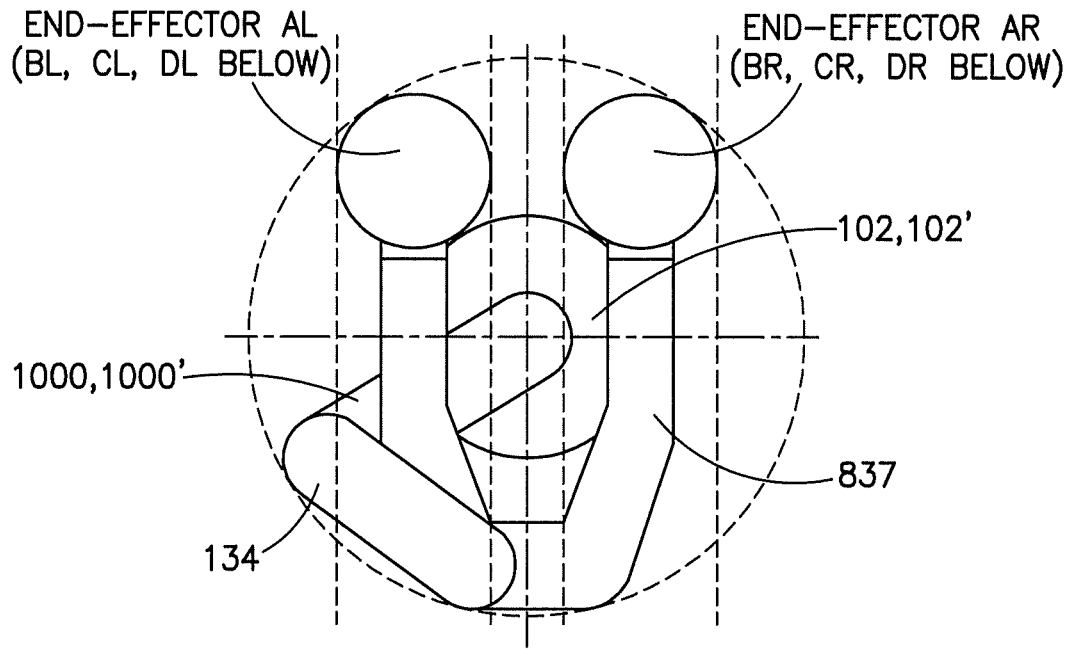
FIG. 16A is a top plan view of an example robot comprising features as described herein.
Figure 16B:
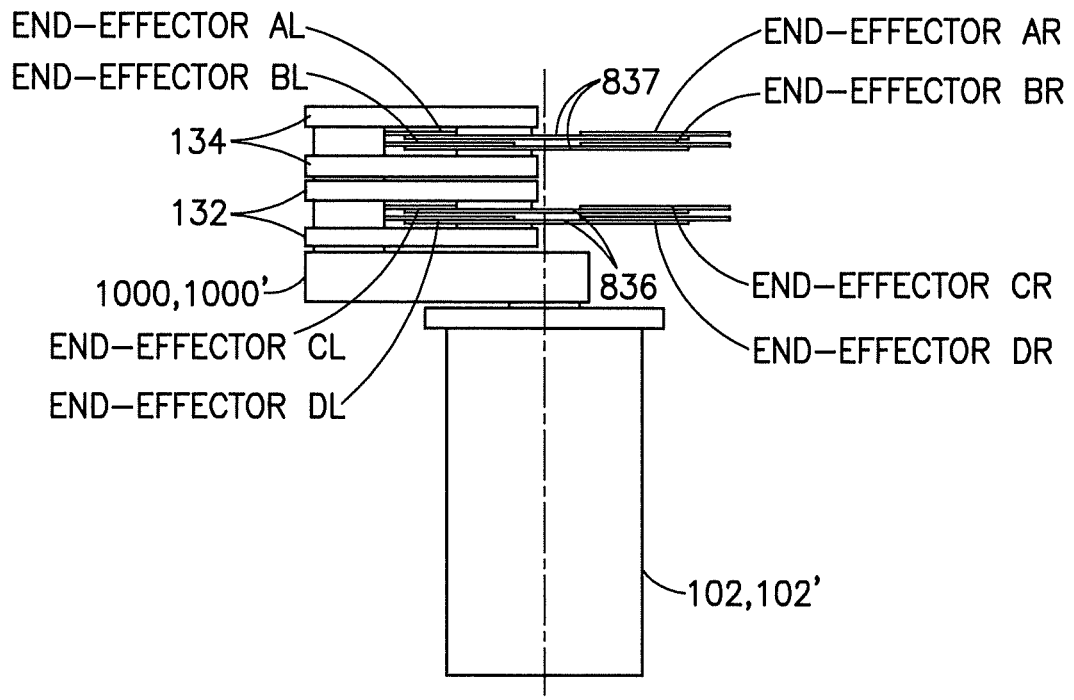
FIG. 16B is a side view of the robot shown in FIG. 16A.

Yet another example robot with an alternative configuration of end-effectors is shown diagrammatically in of FIGS. 16A-16B. In this example, a pair of end-effectors in a side-by-side configuration may be attached to each of the wrist links. For instance, left end-effector AL and right end-effector AR may be attached to the top wrist link, left end-effector BL and right end-effector BR may be attached to the wrist link below the top wrist link, left end-effector CL and right end-effector CR may be attached to the wrist link above the bottom wrist link, left end-effector DL and right end-effector DR may be attached to the bottom wrist link. In FIGS. 16A-16B, similar to FIGS. 14A-14B, the arm assembly has a single straight upper arm and multiple forearms attached to a distal end of the upper arm. A proximal end of the upper arm is attached to a drive shaft of the drive unit such that the drive shaft may rotate the upper arm at the proximal end.

The robot of FIGS. 16A-16B may also utilize the same example internal arrangements as described earlier with respect to FIGS. 11 and 12.

Figure 17C:
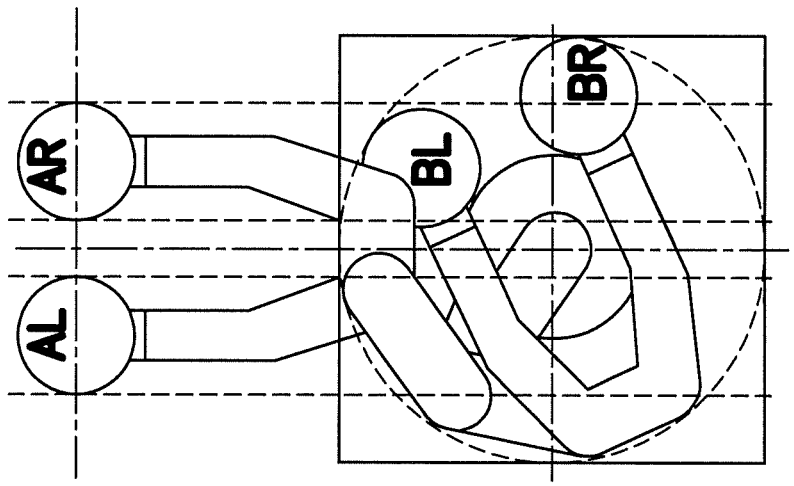
FIGS. 17A-17I illustrate example positions of the links of the robots shown in FIGS. 16A-16B in a series of diagrams.
Figure 17B:
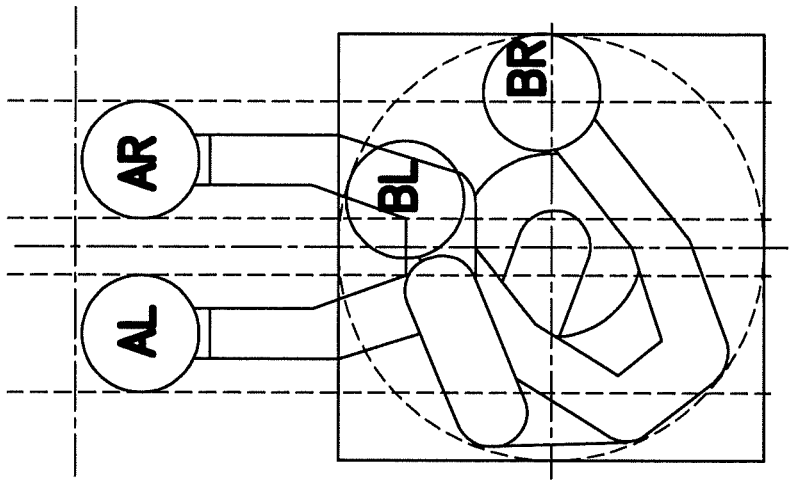
Figure 17A:
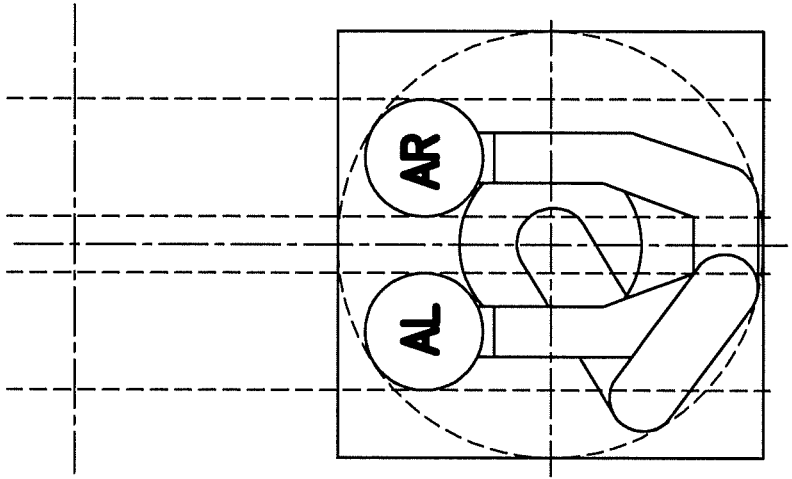
Figure 17F:
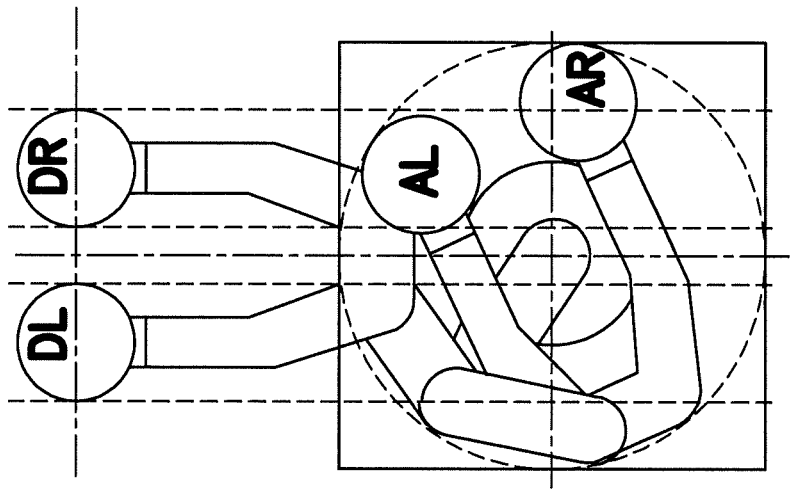
Figure 17E:
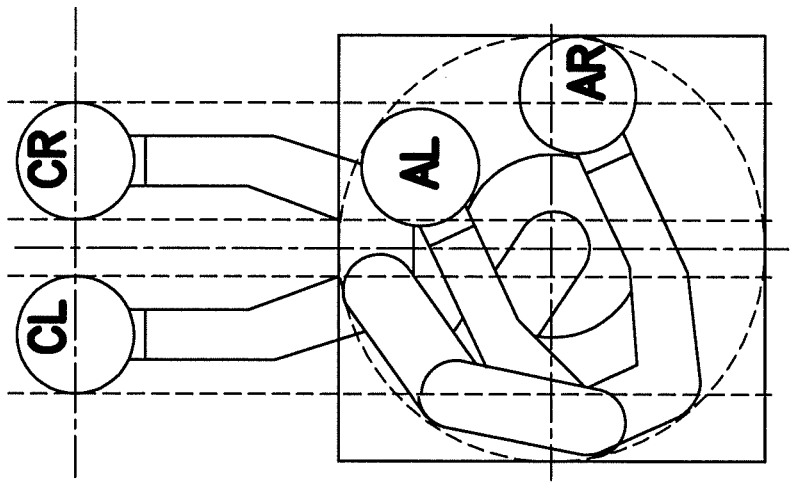
Figure 17D:
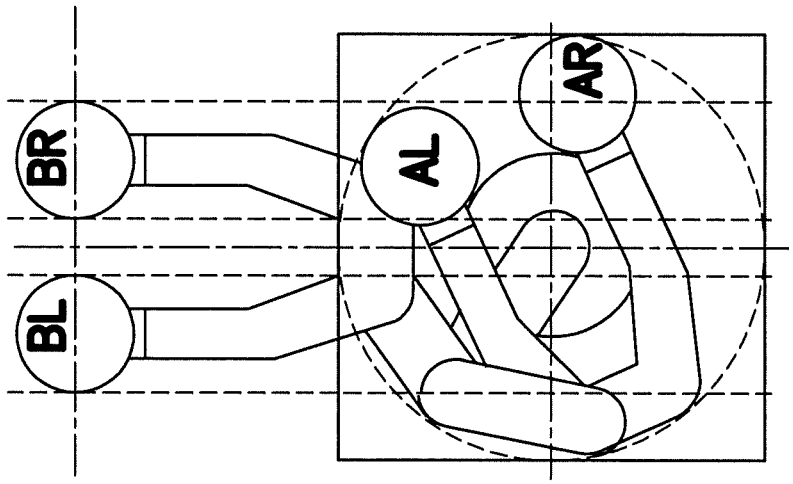
Figure 17I:
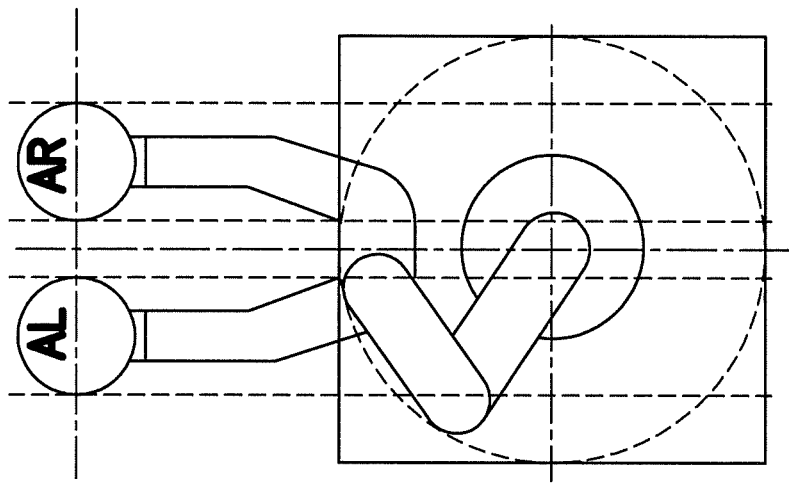
Figure 17H:
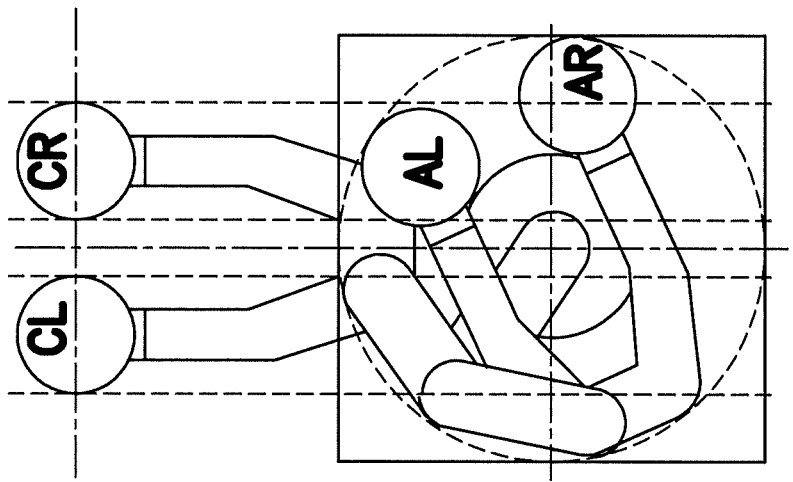
Figure 17G:
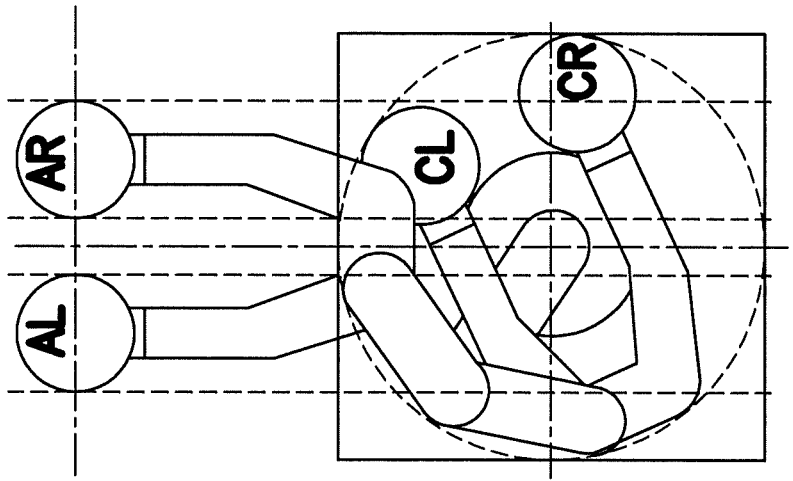

The operation of the robot of FIGS. 16A-16B is illustrated in FIGS. 17A-17I. FIG. 17A shows all end-effectors retracted. FIG. 17B shows end-effectors AL-AR partially extended, illustrating that the wrist joint associated with end-effectors AL-AR does not pass over the payloads on end-effectors BL, CL and DL; thus reducing payload contamination risks. FIGS. 17C-17F show end-effectors AL-AR, BL-BR, CL-CR, and DL-DR, respectively, extended. FIG. 17G shows end-effectors AL-AR and BL-BR extended simultaneously. FIG. 17H shows end-effectors CL-CR and DL-DR extended simultaneously. FIG. 17I shows all end-effectors, i.e., end-effectors AL-AR, BL-BR, CL-CR, and DL-DR, extended simultaneously.

The robot may pick or place a pair of payloads, such as semiconductor wafers, by extending a pair of end-effectors to two workstations (or a single twin-type workstation) according to FIGS. 17C to 17F. The robot can rapidly exchange a pair of payloads at a pair of workstations by performing a sequence of a pick operation with one end-effector pair followed by a place operation with another end-effector pair.

The robot may pick or place four payloads simultaneously by extending four end-effectors to four workstations (or a pair of twin-type workstations or a single tow-shelf twin-type workstation) according to FIGS. 17G-17H. The robot can rapidly exchange four payloads at four workstations by performing a sequence of a pick operation with one set of four end-effectors, for example, end-effectors AL-AR and BL-BR, followed by a place operation with another set of four end-effectors, for example, end-effectors CL-CR and DL-DR.

The robot may also pick or place eight payloads simultaneously by extending all end-effectors to eight workstations (or four twin-type workstations or a single four-shelf twin-type workstation) according to FIG. 17I.

Figure 18:
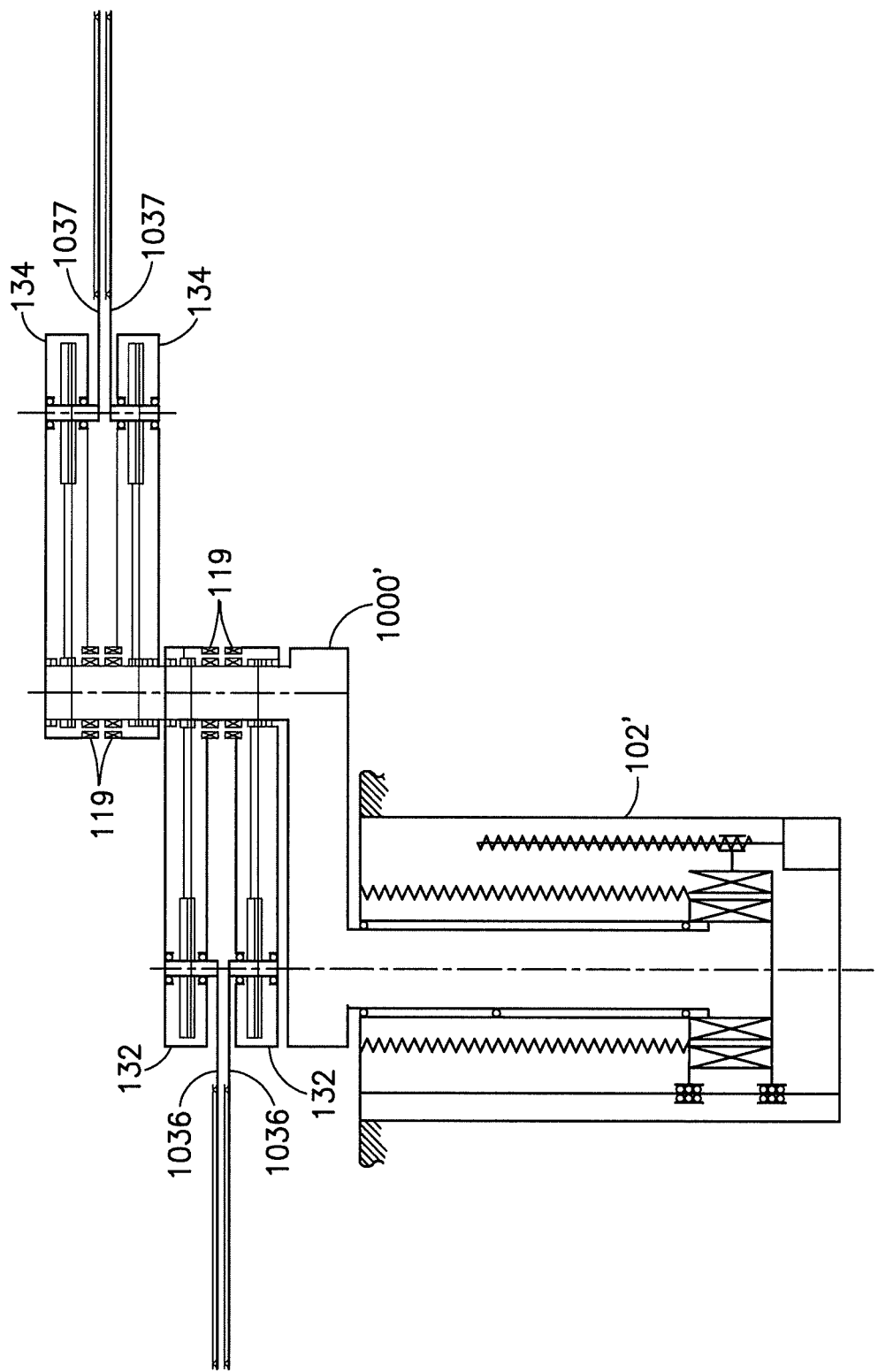
FIG. 18 is a cross sectional view similar to FIG. 12 showing an alternate embodiment.
Figure 18A:
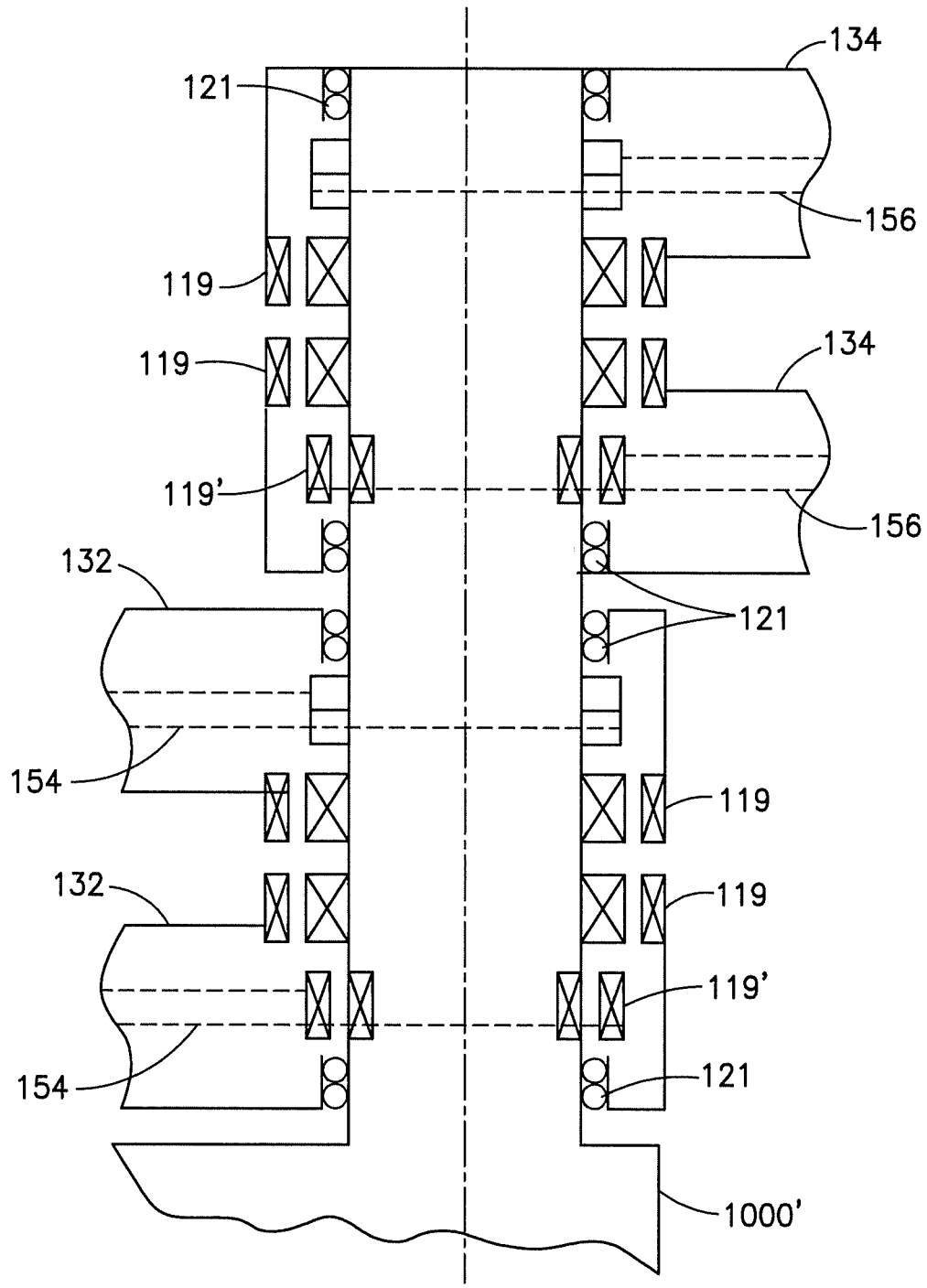
FIG. 18A is an enlarged view of a portion of the robot shown in FIG. 18.

An alternative example internal arrangement to that of FIGS. 12 and 12A is provided in the diagram of FIGS. 18 and 18A. Utilizing this example, the robot of FIGS. 14A-14B may feature two additional motors 119' to drive two of the belts 154, 156 and, therefore, two additional degrees of freedom, namely the orientation of the wrist link associated with end-effector B and the orientation of the wrist link associated with end-effector D. The other belts 154, 156 are on pulleys similar to that shown in FIG. 12A.

The additional degree of freedom associated with end-effector B may allow the robot of FIGS. 14A-14B to position end-effectors A and B independently in a horizontal plane and, as an example, to place two payloads simultaneously to two independently adjusted locations. In other words, end-effector A can be used to place a payload to a location defined by coordinates xA, yA, and end-effector B can be used to place another payload simultaneously to a location defined by coordinates xB, yB. Such an operation requires four degrees of freedom, which can be facilitated via independent control of the orientation of the upper arm, orientation of forearm A, orientation of forearm B and orientation of wrist link B.

Similarly, the additional degree of freedom associated with end-effector D may allow the robot of FIGS. 14A-14B to position end-effectors C and D independently in a horizontal plane and, as an example, to place two payloads simultaneously to two independently adjusted locations. In other words, end-effector C can be used to place a payload to a location defined by coordinates xC, yC, and end-effector D can be used to place another payload simultaneously to a location defined by coordinates xD, yD. Such an operation requires four degrees of freedom, which can be facilitated via independent control of the orientation of the upper arm, orientation of forearm C, orientation of forearm D and orientation of wrist link D.

The ability of the robot to place simultaneously two payloads to independently adjusted locations may be conveniently utilized in an adaptive placement scheme. A simultaneous placement operation enabled by the additional degrees of freedom may result in a higher throughput when compared to a sequential placement mode of operation, which would be necessary in the absence of the additional degrees of freedom.

Similarly to the robot of FIGS. 14A-14B, the robot of FIGS. 15A-15B may also utilize the example internal arrangement of FIG. 18 and benefit from two additional degrees of freedom, for instance, the orientation of the wrist link associated with end-effector A and the orientation of the wrist link associated with end-effector C.

The additional degree of freedom associated with end-effector A may allow the robot of FIGS. 15A-15B to position end-effectors A and B independently in a horizontal plane and, as an example, place two payloads simultaneously to two independently adjusted locations. Similarly, the additional degree of freedom associated with end-effector C may allow the robot of FIGS. 15A-15B to position end-effectors C and D independently in a horizontal plane and, as an example, place two payloads simultaneously to two independently adjusted locations using these end-effectors.

Figure 19A:
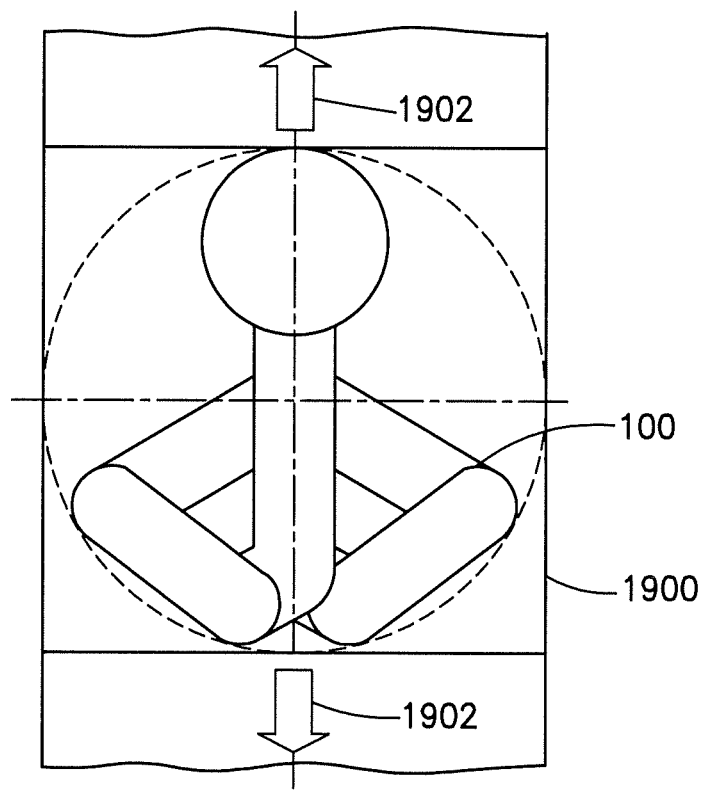
FIG. 19A is a top plan view of an example robot comprising features as described herein.
Figure 19B:
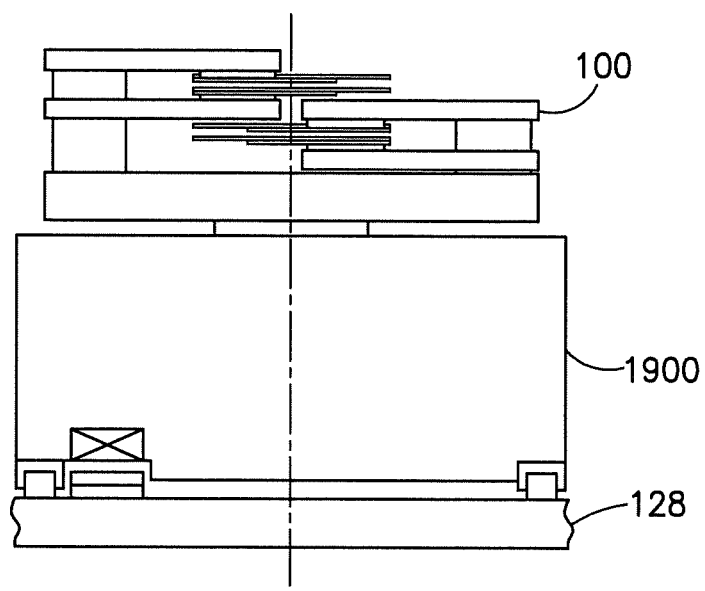
FIG. 19B is a side view of the robot shown in FIG. 19A.

In any of the above example embodiments, the drive unit may be arranged on a traverser unit 1900, which may be configured to move the drive unit in a translational manner as illustrated by arrows 1902, as depicted diagrammatically in FIGS. 19A-19B. Examples of a traverser unit or shuttle are described in U.S. Pat. Nos. 10,424,498, 10,569,430, 10,742,070 and US patent publication No. 2020-0262660-A1 which are hereby incorporated by reference in their entireties.

In the above example embodiments, the rotary joints at the elbow(s) of the robot arms are arranged in a coaxial manner. However, the axes of rotations of the rotary joints may be offset from each other. Alternatively, any combination of coaxial and offset arrangements may be used.

In the above example embodiments, some end-effectors are mounted above the corresponding forearms and other end-effectors are mounted below the corresponding forearms. However, the end-effectors may be arranged above and below the corresponding forearms in any suitable scheme.

It should be noted that the bearing arrangements in the simplified diagrams of the above example embodiments are for illustrative purposes only, primarily to provide examples how individual components of the robot may be constrained with respect to each other. Any suitable bearing locations and bearing types may be used.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    a drive unit; and
    an arm assembly connected to the drive unit, where the arm assembly comprises:
        an upper arm connected to a first drive shaft of the drive unit;
        a first set of forearms connected to a first end of the upper arm;
        a second set of forearms connected to a second end of the upper arm, where the second set has a different number of forearms than the first set, and where the forearms of the second set of forearms are independently rotatable relative to each other and to the forearms of the first set of forearms; and
        a respective end effector connected to the forearms, the respective end effectors being single end-effectors having one substrate support area or being dual end-effectors having two support areas;
        where the second set of forearms comprises a bridge structure arranged such that the end effector on the second set of forearms is positioned between at least one upper end effector and at least one lower end effector of the end effectors respectively connected to the first set of forearms to provide a uniform vertical pitch between the at least one upper end effector and the at least one lower end effector on the first set of forearms relative to the end effector on the second set of forearms.

2. The apparatus as claimed in claim 1 where the drive unit comprises a first motor for rotating the first drive shaft and the arm assembly comprises motors for rotating the forearms.

3. The apparatus as claimed in claim 1 where the drive unit comprises a first motor for rotating the first drive shaft and additional motors for rotating the forearms, where the drive unit comprises coaxial drive shafts including the first drive shaft.

4. The apparatus as claimed in claim 1 where the upper arm comprises a general V-shape or U-shape with a center of the upper arm connected to the first drive shaft.

5. The apparatus as claimed in claim 1 where the first set of forearms comprises a first number N of the forearms and the second set of forearms comprises a second number N−1 of the forearms.

6. The apparatus as claimed in claim 5 where the first set of forearms has two forearms and the second set of forearms has one forearm.

7. The apparatus as claimed in claim 1 where the arm assembly comprises an odd number of end effectors.

8. The apparatus as claimed in claim 7 where the arm assembly comprises only three end effectors.

9. The apparatus as claimed in claim 8 where the end effectors are dual end-effectors having side-by-side spaced substrate support areas.

10. The apparatus as claimed in claim 1 where at least one of the end effectors is a dual end-effector having side-by-side spaced substrate support areas, and where at least one of the forearms is connected to the dual end-effector at an off-center location of the dual end effector.

11. The apparatus as claimed in claim 1 where a first one of the end effectors connected to the second set of forearms is located in a first horizontal plane between second and third horizontal planes of two of the end effectors connected to the first set of forearms.

12. A method comprising:
    connecting a first set of forearms to a first end of an upper arm;
    connecting a second set of forearms to an opposite second end of the upper arm, where the first set of forearms has a different number of the forearms than the second set of forearms;
    connecting respective end effectors to the forearms, where the end effectors are an odd number,
    where the second set of forearms comprises a first forearm comprising a bridge structure such that a first end effector on the second set of forearms is configured to move between second and third end effectors of the first set of forearms, and such that the second end effector of the first set of forearms is configured to move between the first end effector and a portion of the first forearm, and where the forearms of the second set of forearms are independently rotatable relative to each other and to the forearms of the first set of forearms; and where the bridge structure is arranged such that the first end effector on the second set of forearms is vertically positioned between the second and third end effectors on the first set of forearms to provide a uniform vertical pitch between the second end effector on the first set of forearms and the third end effector on the first set of forearms relative to the first end effector on the second set of forearms.

13. An apparatus comprising:

a drive unit; and an arm assembly connected to the drive unit, where the arm assembly comprises:

an upper arm connected to a first drive shaft of the drive unit;

a first set of forearms connected to a first end of the upper arm;

a second set of forearms connected to an opposite second end of the upper arm, where the second set has a different number of forearms than the first set, where the forearms of the second set of forearms are independently rotatable relative to each other and to the forearms of the first set of forearms, and where the second set of forearms comprises a bridge structure; and a respective end effector connected to the forearms such that an end effector of the first set of forearms is configured to move between an end effector of the second set of forearms and a portion of the first forearm, where the first set of forearms comprises a first number N of the forearms and the second set of forearms comprises a second number N−1 of the forearms, and where the arm assembly comprises an odd number of end effectors;

where the bridge structure is arranged such that the end effector of the second set of forearms is positioned under a first end effector of the first set of forearms and over a second end effector of the first set of forearms to provide a uniform vertical pitch between the first end effector of the first set of forearms and the second end effector of the first set of forearms relative to the end effector of the second set of forearms.

14. The apparatus as claimed in claim 13 where the drive unit comprises a first motor for rotating the first drive shaft and the arm assembly comprises motors for rotating the forearms.

15. The apparatus as claimed in claim 14 where the drive unit comprises a first motor for rotating the first drive shaft and additional motors for rotating the forearms, where the drive unit comprises coaxial drive shafts including the first drive shaft.

16. The apparatus as claimed in claim 14 where the upper arm comprises a general V-shape or U-shape with a center of the upper arm connected to the first drive shaft.

17. The apparatus as claimed in claim 14 where the first set of forearms has two forearms and the second set of forearms has one forearm.

18. The apparatus as claimed in claim 14 where the arm assembly comprises only three end effectors.

19. The apparatus as claimed in claim 14 where at least one of the end effectors is a dual end-effector having side-by-side spaced substrate support areas, and where at least one of the forearms is connected to the dual end-effector at an off-center location of the dual end effector.

20. The apparatus as claimed in claim 14 where a first one of the end effectors connected to the second set of forearms is located in a first horizontal plane between second and third horizontal planes of two of the end effectors connected to the first set of forearms.

21. An apparatus comprising:

a drive unit; and an arm assembly connected to the drive unit, where the arm assembly comprises:

an upper arm connected to a first drive shaft of the drive unit;

a first set of forearms connected to a first end of the upper arm, where the first set has at least one forearm;

a second set of forearms connected to a second end of the upper arm, where the second set has at least two forearms, and where the forearms of the second set of forearms are independently rotatable relative to the forearms of the first set of forearms; and at least one respective end effector connected to each of the forearms;

where the first set of forearms comprises a bridge structure arranged such that the end effectors on the first set of forearms are positioned between at least one upper end effector and at least one lower end effector of the end effectors on the second set of forearms to provide a uniform vertical pitch between the at least one upper end effector on the second set of forearms and the at least one lower end effector on the second set of forearms relative to the end effectors on the first set of forearms.

22. The apparatus as claimed in claim 21 where the first set of forearms has at least one less forearm than the second set of forearms.

23. The apparatus as claimed in claim 22 where the end effectors comprise an odd number of end effectors.

* * * * *